(12) United States Patent
Chilson

(10) Patent No.: US 8,591,165 B2
(45) Date of Patent: Nov. 26, 2013

(54) FLOATING FORKS FOR LIFT VEHICLES

(75) Inventor: Gerald E. Chilson, Alanson, MI (US)

(73) Assignee: Jervis B. Webb Company, Farmington Hills, MI (US)

( * ) Notice: Subject to any disclaimer, the term of this patent is extended or adjusted under 35 U.S.C. 154(b) by 942 days.

(21) Appl. No.: 12/429,090

(22) Filed: Apr. 23, 2009

(65) Prior Publication Data
US 2009/0271058 A1 Oct. 29, 2009

Related U.S. Application Data

(60) Provisional application No. 61/047,174, filed on Apr. 23, 2008.

(51) Int. Cl.
*B66F 9/18* (2006.01)
(52) U.S. Cl.
USPC ............................ 414/607; 414/785; 187/237
(58) Field of Classification Search
USPC ............................ 414/785, 607, 686; 187/237
See application file for complete search history.

(56) References Cited

U.S. PATENT DOCUMENTS

| | | | |
|---|---|---|---|
| 2,710,464 A | 6/1955 | Husting | |
| 3,567,054 A * | 3/1971 | Emke | 414/639 |
| 3,790,013 A * | 2/1974 | Smith | 414/636 |
| 3,845,577 A | 11/1974 | Naymik | |
| 3,982,647 A * | 9/1976 | Teutsch | 414/785 |
| 4,050,599 A * | 9/1977 | Bender | 414/659 |
| 4,130,212 A * | 12/1978 | Gatilao | 414/621 |
| 4,355,947 A | 10/1982 | Wiblin | |
| 4,688,981 A * | 8/1987 | Ravnsborg et al. | 414/607 |
| 4,699,565 A * | 10/1987 | Seaberg | 414/785 |
| 4,961,681 A * | 10/1990 | Threatt | 414/607 |
| 5,044,098 A | 9/1991 | Berghefer | |
| 6,068,086 A * | 5/2000 | Bushong et al. | 187/237 |
| 7,980,808 B2 * | 7/2011 | Chilson et al. | 414/809 |
| 2002/0025247 A1 * | 2/2002 | Lindgren et al. | 414/785 |
| 2009/0065308 A1 * | 3/2009 | Bolzoni | 187/237 |

OTHER PUBLICATIONS

AIM Attachments; Quality Machinery Attachments; Log & Lumber Forks, 2"x6"×48"×48"; 1 page; http://www.aimattachments.com/ProductsDescript . . . &MachineTypes=1004&Models=1863&Start=11&End=20.
Anderson, M., Buying File: 100-200-HP Wheel Loaders—Utility Wheel Loaders Remain Market Mainstays, Apr. 1, 2007, Construction Equipment, Apr. 2007 issue (Desription as listed in PCT ISR).
AIM Attachments Worldwide Log & Lumber Forks product description (Description as listed in PCT ISR).

* cited by examiner

*Primary Examiner* — Joshua Rudawitz
(74) *Attorney, Agent, or Firm* — Dickinson Wright PLLC

(57) ABSTRACT

A material handling vehicle, such as an AGV, for loading and unloading a transport and wherein the vehicle includes a pair of freely floating forks. The forks are freely moveable in the vertical direction as well as capable of pivoting or tilting about an axis relative to a fork carriage, however when a load is applied, the forks are locked are prevented from such free floating movement.

20 Claims, 45 Drawing Sheets

FLOATING FORKS FOR LIFT VEHICLES

CROSS REFERENCE TO RELATED APPLICATION

This utility patent application claims the benefit of U.S. Provisional Patent Application Ser. No. 61/047,174 filed Apr. 23, 2008, entitled "Floating Forks For Lift Vehicles," the entire disclosure of the application being considered part of the disclosure of this application, and hereby incorporated by reference.

BACKGROUND OF THE INVENTION

1. Technical Field

This present invention is generally directed to material handling vehicles and, more particularly, to automatic guided vehicles that are capable of automatically loading and unloading a transport, including in particular, loads near the end of the transport with minimal interference.

2. Discussion

Automatic guided vehicles (AGVs) are used throughout the material handling industry to transport loads. The term AGV is commonly used to refer to robust vehicle designs having any of a number of available automated guidance systems. Automatic guided carts (AGCs) is a term commonly used to refer to a less robust vehicle used for similar but less complicated applications. Throughout this application, including the claims, the term AGV shall mean and include both AGV's and AGC's, as well as any other vehicle that is automatically guided.

Current lighter duty AGV designs generally include a frame with swivel castors located at the four corners of the frame. Other features may include a drive wheel assembly and rigid castors for directional control of the cart. In one current design, two rigid castors are fixed to the frame and located approximately midway between the swivel castors on each side of the cart frame. The two pair of swivel castor axes and the rigid castor axis are generally parallel to each other. The steerable driving unit is attached to the cart frame, generally by way of a plate that is hinged and spring loaded from the cart frame to ensure that the steerable drive wheel maintains adequate traction with the support surface. In another embodiment, a fixed drive wheel propels the AGV and a steerable castor wheel directs the movement of the AGV. Heavy duty AGV designs generally include a heavy duty frame and at least three wheels, with at least one of the wheels being a drive wheel and at least one wheel being a steering wheel directed by a guidance system. Many of these AGV designs are similar to existing vehicles for moving loads in a manufacturing or distribution setting but are automatically guided.

Difficulties are associated with automatic loading and unloading of transports when the transport varies in relation to the loading dock. Transports are usually positioned manually against a loading bay by a driver. This manual positioning results in an unknown variability in the position of the transport. As a driver positions a transport, such as a semi-trailer at the loading dock, he or she may be unable to perfectly square the trailer with the loading bay door. As a transport is generally positioned within a transport loading area outside the loading bay door, many variances in the position of the transport as well as between the transport and the loading dock may occur. These variances may cause difficulties in the AGV loading or unloading the transport and, in particular, the AGV loading or unloading loads near the end of the transport. Loading and unloading may also be difficult even for human operators near the end of the transport. One such difficulty associated with automatic loading and unloading of a transport is that the AGV must be able to overcome the difference in height between the transport, specifically the floor of the transport, and the loading bay, specifically the floor of the loading bay. Different types, styles, and models of transports as well as variances, such as how well the suspension has been maintained will cause transports to vary in height. Furthermore, as a transport is loaded or unloaded, the height of the transport is typically not static as the suspension will compress or uncompress as weight is added or taken off the transport. The change in weight will change the height of the transport causing the height of the transport to vary relative to the height of the loading bay floor. In order to allow robust operation, the AGV must be able to adjust for not only for static variances in transport height but also dynamic variances in the transport height as the transport is loaded or unloaded. The variance in height of a particular transport as well as the variance during the process or loading or unloading may cause the height of the roof of the transport to vary relative to the loading bay floor, thereby causing a tall load to potentially contact the roof or lip of the roof at the entrance or threshold of the transport, especially when the transport is almost fully loaded. Any contact between the load and the transport will cause problems in loading of the transport. Some attempted solutions to address this variance in transport height in the prior art has been to use hydraulic or other types of jacks to stabilize or level the transport; however, this is a costly and inefficient process. Furthermore, these hydraulic or other types of jacks typically do not account for variance in height as the suspension of the trailer is compressed or uncompressed during loading or unloading of the transport.

The variability in the positioning and in particular the height of the transport may prohibit the automatic loading of the transport, and almost certainly will reduce its efficiency. For example, the most efficient loading process positions the loads as closely to each other as possible and any variability in the expected position of the transport may increase the separation of the loads.

The above listed variances as well as other variances in the positioning of the transport may cause other problems, in particularly problems in loading the last few pallets or loads into the transport. For example, due to the configuration of many loading and unloading facilities, the transport loading area where a transport is backed up against a loading bay or dock door is typically angled downward toward the loading bay doors. While the downward angle allows the lip of the transport to easily align approximately in height with the floor of a loading facility, the angle of the transport loading area causes the floor of the transport to be angled relative to the floor of the loading facility. As the height of the floor of the transport may vary between transports, a dock ramp is typically used to compensate typically for this height variance or to ease the transition between the floor of a loading facility and the floor of the transport; however, the dock ramp is many times at a shaper angle to the transport floor than the floor of the loading bay floor. Other variances in the angle of the transport relative to the angle of the loading bay floor may occur if the type of transport used is a trailer such as a semi-truck trailer. Specifically, after the transport backs against the loading bay door, the operator will typically lower a jack near the front of the semi-trailer and drive the semi-truck away from the semi-trailer. Drivers rarely position the transport jack in the same position, thereby causing a variance in the angle of the floor of the transport, in this instance a semi-truck trailer, relative to the floor of the loading bay, even if, the transport area was designed to be level and parallel to the loading bay floor.

The transition between the transport floor and the loading bay floor or dock ramp may require a steep incline or decline relative to the loading bay floor. More specifically, the transition many times requires a steep incline or decline of the dock ramp which can cause guidance difficulties and end-of-trailer loading difficulties. For example, difficulty with end-of-trailer loading may occur as the AGV is not level with the load supporting surface of the transport floor. More specifically, if the majority of the AGV is situated on the dock ramp or loading floor facility and the transport floor varies in height or in angle to either of the loading bay floor or dock ramp, it may be difficult for the AGV to lower its load to the transport floor and then easily remove its forks from the pallet pockets or to place the forks within the pallet pockets to unload the load. More specifically, if the transport floor is not aligned both vertically and angularly with the loading facility floor or dock ramp, it may be difficult to insert or to withdraw the forks from the pockets on the pallets as the tip of the fork would engage one of the top or bottom surfaces of the pallet pocket and the portion of the fork nearest to the AGV will engage the other of the top or bottom surfaces within the pallet pocket. Therefore, when the AGV attempts to back out of the transport after dropping the last load, the last load may be pulled backwards with the AGV as the forks may become frictionally engaged with the pallet.

In regards loading a transport, the angle of the two supporting surfaces, such as the load supporting surface and the AGV supporting surface, may become greater as the transport is loaded. More specifically, as described above, the more loads added to the transport, the more the suspension may be compressed. As the suspension is compressed, the height of the trailer may lower, thereby increasing the angle between the transport floor and the supporting surface of the AGV during end-of-trailer loading. In some cases, unloading the transport may also increase the angle.

As is clearly illustrated in the figures, end-of-trailer loading and unloading problems generally only occur for the last few loads inward from the trailer door or transport threshold. This is because as the AGV unloads loads further inward of the transport threshold the AGV will be predominantly resting on the transport floor and therefore predominantly on a supporting surface that is equal with the load surface. Of course, the AGV would have to be predominantly resting on the transport floor when the fork tips are removed, otherwise as it removes the fork tips, the AGV may decreasingly be resting predominantly on the transport floor. Likewise, it may be difficult to insert the forks into the pallet pockets to securely lift a load near the threshold of the transport if the AGV is attempting to unload the vehicle, if the transport floor is not vertically and angularly equal to the loading bay floor.

Despite the use of guidance systems to control the travel of an AGV and for automatic loading and unloading of transports, the process of loading and unloading transports and, in particular, the last few loads on the transport such as the loads located proximate to the threshold of the transport have not been addressed in a satisfactorily, cost effective, and efficient manner.

SUMMARY OF THE INVENTION

In view of the above, the present invention is directed to load carrying vehicles, such as material handling vehicles and AGVs capable of loading and unloading a transport and, particularly, loading and unloading loads near the end of the transport with minimal interference in a cost effective and simple manner.

While the present invention is described as being applicable to all load carrying and material handling vehicles, it is particularly applicable to AGVs. When loading a vehicle, an experienced operator of a load carrying vehicle may easily judge the angle of the transport to determine if the elevator mechanism or forks need to be tilted to easily place the load and easily remove the forks from the pallet pockets. However, operators without significant experience may be challenged to unload and load the loads near the threshold of the transport. In comparison, an AGV must use special sensor(s), processor(s) and software programs to perform the same task, which may be expensive to implement. While the present invention is useful to both operator guided vehicles and AGVs, it is especially useful with AGVs that are designed to load transports. Therefore, even though the present invention is applicable to both AGVs and operator guided vehicles, this application shall describe the invention as it relates to the problems associated with AGVs, however, the present invention and claims are to be considered as being directed to both AGVs and operator guided vehicles.

The present invention is directed to an apparatus, as well as a method and system for loading and unloading a transport by material handling vehicles and, in particular, AGVs. In the method, an AGV first engages a load. The AGV with the engaged load is then guided by a first guidance system to a known position. From this position, the AGV determines the location of the transport and then proceeds to place the load on the transport. The AGV then proceeds to the next desired location.

In another embodiment of the present invention, the AGV first engages a load. The AGV with engaged load is then guided by a guidance system to a known position. From this position, the guidance system determines the proper load position on the transport, adjusts itself to guide the AGV with the load to that position, and deposits the load. The adjusted guidance system is then used to guide the AGV back to approximately the known position described above, wherein the guidance system controls its travel to the next destination.

In regards to the apparatus of the present invention, when the AGV places the last few loads near inward of the door, the forks of the AGV are allowed to float in a limited range relative to the AGV to compensate for any angular difference between the transport floor and the predominant supporting surface of the AGV, or relative angle of support for the AGV when it spans various angled supporting surfaces, refereed to hereafter as "supporting plane." Therefore, by allowing the forks to float both up and down as well as freely tilt, the AGV may easily and efficiently adjust for both vertical and angular offset without any active movement of the mast of the AGV or forks. Therefore, the AGV may easily load or unload the transport, even if the supporting surface of the AGV (or supporting plane) is angled relative to the supporting surface of the load by allowing the forks to float within a limited range both vertically and tilt when removing the forks from or inserting the forks into the pallet pockets of a load. As the forks are allowed to float both angularly and vertically, the forks may be inserted or removed from the pallet pockets with minimal interference.

The forks may float yet provide stable support for loads by allowing at least one pair of pins that connect the forks to a fork carriage to have freedom of movement in two dimensions relative to a fork carriage and another set of pins to have only one dimension of movement. More specifically, when a load is lifted, the pins are in a fixed position and constrained from movement due to the weight of the load and the configuration of the fork carriage. However, when the weight of the load is not on the forks, the forks and pins have limited movement along a vertical axis. The fork carriage also includes a slot with angular side walls that allow at least one pair of pins to move relative to the vertical axis, in addition to movement along the vertical axis.

Further scope of applicability of the present invention will become apparent from the following detailed description, claims, and drawings. However, it should be understood that the detailed description and specific examples, while indicating preferred embodiments of the invention, are given by way of illustration only, since various changes and modifications within the spirit and scope of the invention will become apparent to those skilled in the art.

BRIEF DESCRIPTION OF THE DRAWINGS

The present invention will become more fully understood from the detailed description given here below, the appended claims, and the accompanying drawings in which:

DETAILED DESCRIPTION OF THE PREFERRED EMBODIMENT

Figure 1:
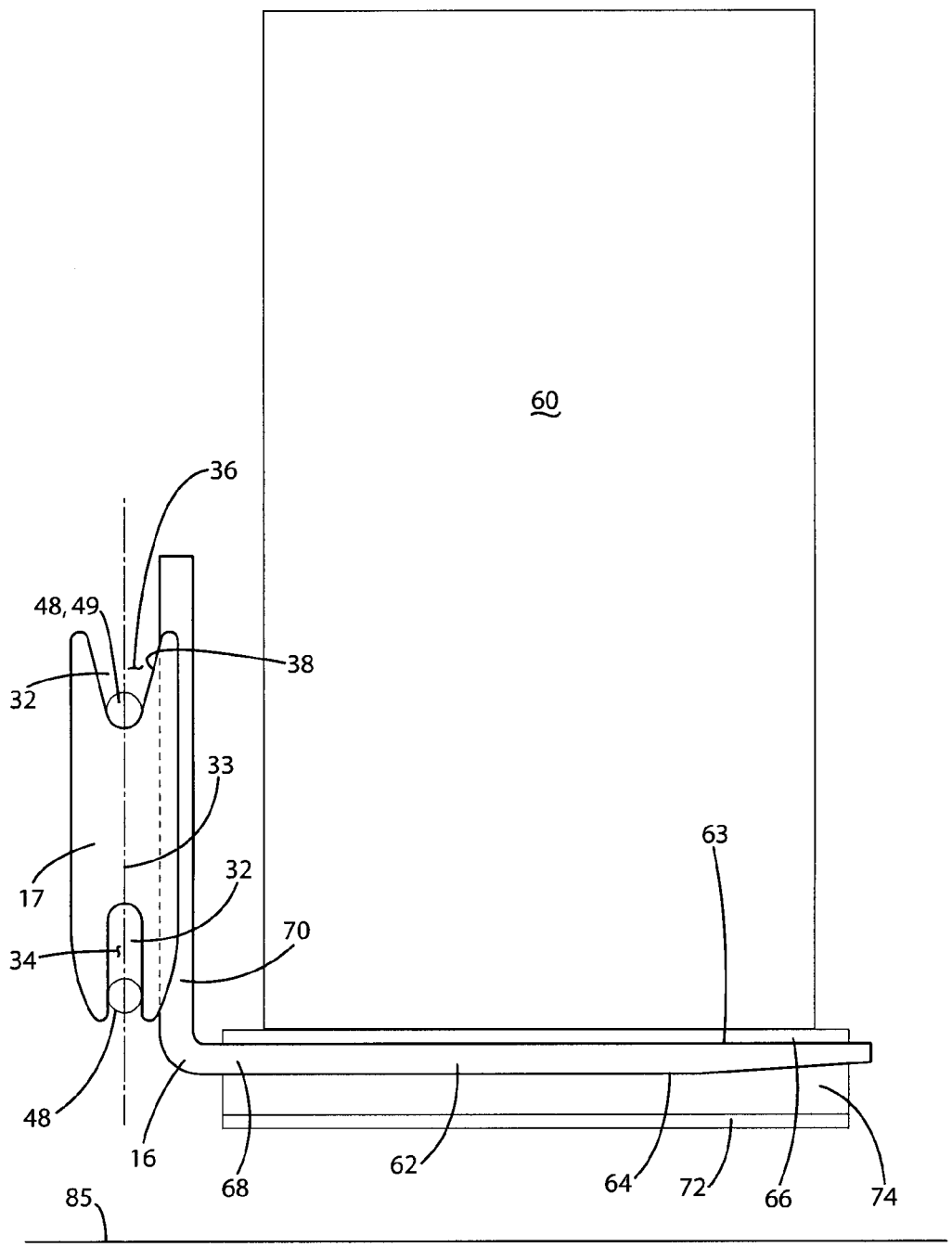
FIG. 1 is a side view of an AGV lifting a load for travel within a loading facility.
Figure 2:
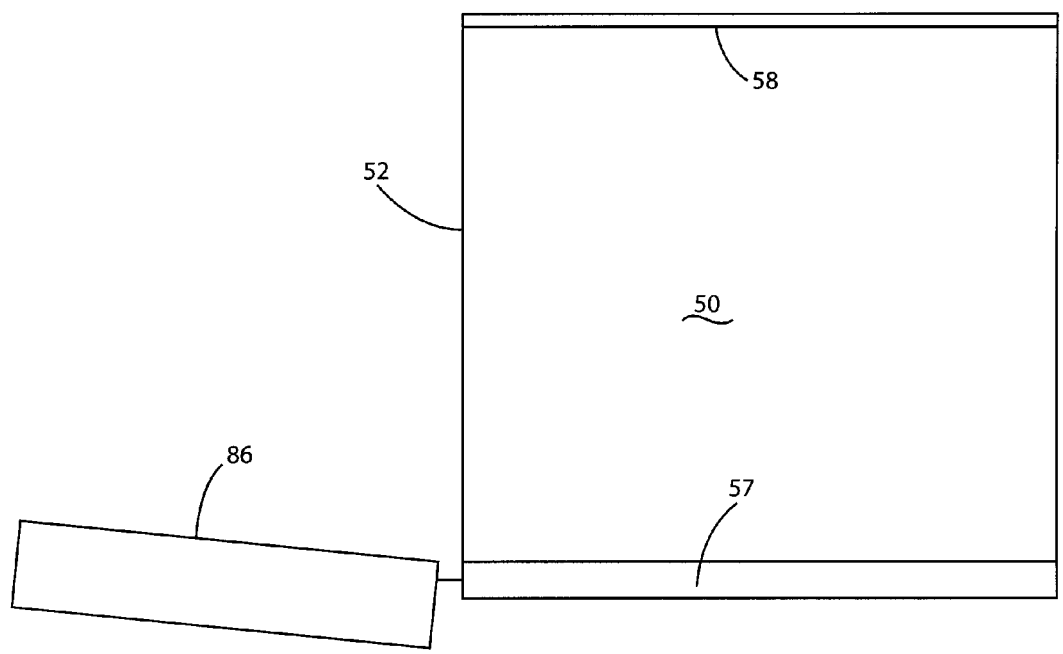
FIG. 2 is an exemplary illustration of a dock ramp being tilted relative to a transport.

An automated guided vehicle 10 according to the present invention is illustrated and described with reference to the figures. It should be appreciated that the applications for the automatic loading and unloading of a transport according to the present invention may be used in a variety of applications beyond the illustrated AGV. For example, the present invention may be used with automated guided vehicles of a variety of configurations, as well as other material handling vehicles using forks, such as hi-lows.

The AGV 10 includes a steering and drive mechanism that is used to propel and steer the AGV 10. In the illustrations shown, the steering and drive mechanism comprises drive wheels 12 and steerable wheel 14 that are coupled with a guidance system and used to propel and steer the AGV 10. The guidance system turns the steerable wheel 14 as the AGV 10 is propelled, thus steering the AGV 10. Additionally, the drive wheels 12 are preferably dual drive wheels wired in series to create an electrical differential. Different propulsion systems may also be used, for example differential or "panzer" steer with swivel casters or through the use of master/slave motor controllers for the drive wheels.

The guidance system can be one of any number of known guidance systems, even two guidance systems as more fully described below. For example, the primary guidance system may be an inertial guidance system that guides the AGV along a programmed path of travel. The position of the steerable wheel 14 is known and is capable of being maneuvered. The distance and direction traveled by the AGV 10 is measured, such as by a track wheel, optical system or other method. A system with encoders on each drive wheel and a steering encoder may be used in conjunction with or separate from the track wheel or other system to track the distance and direction traveled by the AGV 10. As the AGV 10 travels, the steerable wheel 14 is turned to certain positions at certain distances. In this manner, the AGV 10 can be used to travel over almost any surface by just specifying the position of the steerable wheels 14 and the distance to be traveled while in that position. This detailed description is given by illustration only, and the use of different types of guidance systems, for example, a laser guidance system, as the primary guidance system is within the spirit and scope of the invention.

The AGV 10 further includes a load capture mechanism, such as clamps, or, preferably, the fork pairs 16 shown in the illustrations that are used to engage a load 60. The load 60 preferably includes a pallet 72 having fork pockets or pallet pockets 74 for engaging with the fork pairs 16, as is well known in the art. In some embodiments, a double set of fork pairs may be used side-by-side to allow the AGV 10 to carry a pair of loads. Loading the trailer by pairs of loads minimizes the number of trips the AGV 10 must make and therefore reduces loading time. Any reduction in loading time may allow the system to include less individual AGV vehicles. Although the following description regarding the forks 16 and fork carriage 17 is directed to a single fork pair and illustrated in the drawings as a single fork pair, the present invention is also equally applicable to a double fork pair.

The fork pair 16, as is well known in the art, generally includes a horizontal segment 62, a vertical segment 70, and a segment formed with a transition section 68 therebetween. The horizontal segment 62 generally includes a lower surface 64 and an upper surface 63, engaging the pallet 72 when the AGV 10 lifts the pallet 72. The horizontal segment 62 also includes fork tips 66. The vertical segment 64 of the fork pairs 16 is coupled to an elevator mechanism 18 or mast. The elevator mechanism 18 allows the load 60 to be raised or lowered to a variety of heights, for example, for stacking loads onto one another. The forks 16 are generally mounted or coupled to the fork carriage 17 which is in turn coupled to the elevator mechanism 18. In a preferred embodiment, the AGV 10 further includes two sets of distance sensors, rear distance measuring devices 20, and front distance measuring devices 30. Both sets of distance measuring devices are operatively coupled to the steering and drive mechanism for use in guiding the AGV 10, as more fully described below.

Figure 44:
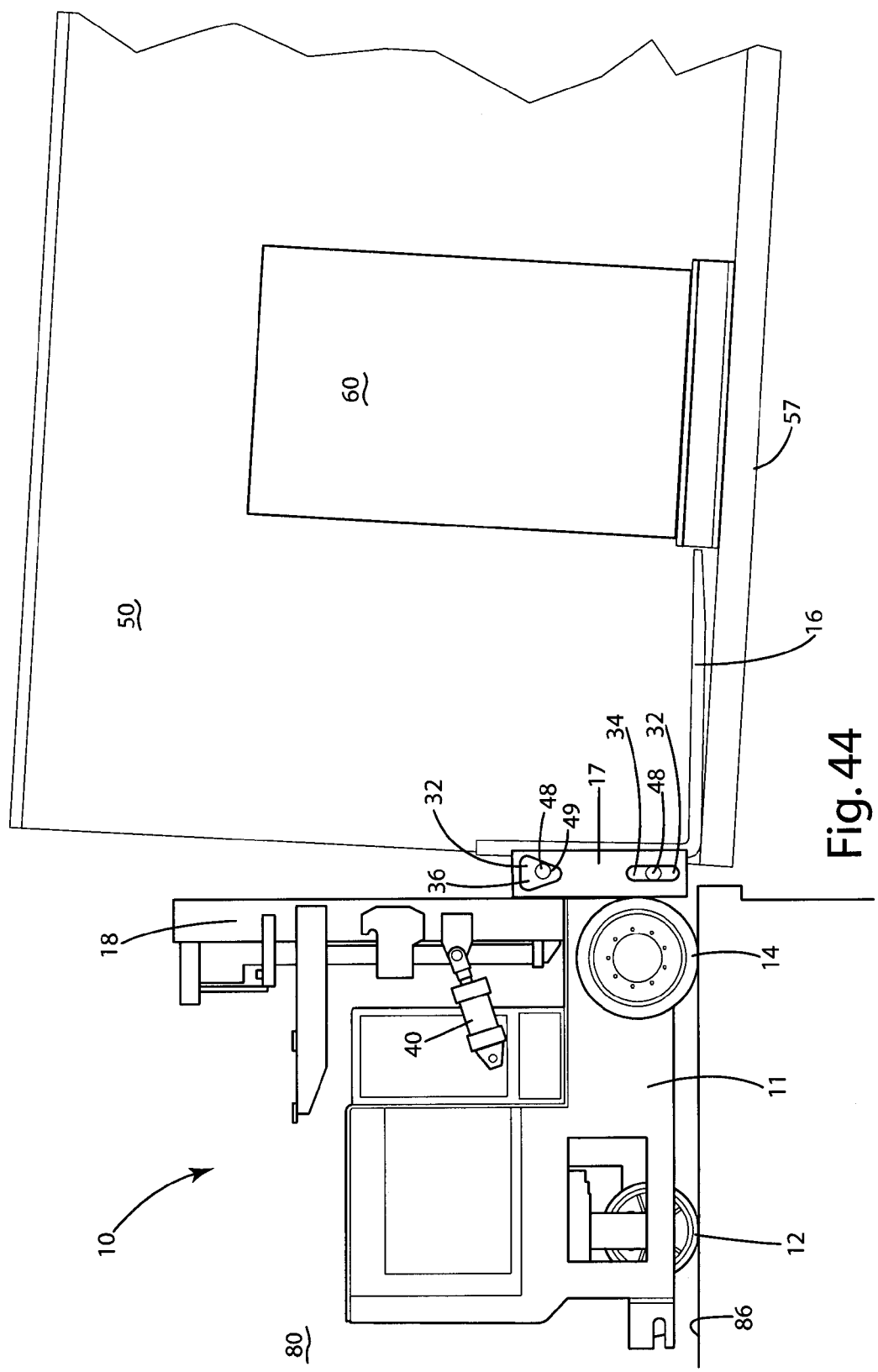
FIG. 44 is a side view of an alternative fork carriage.
Figure 45:
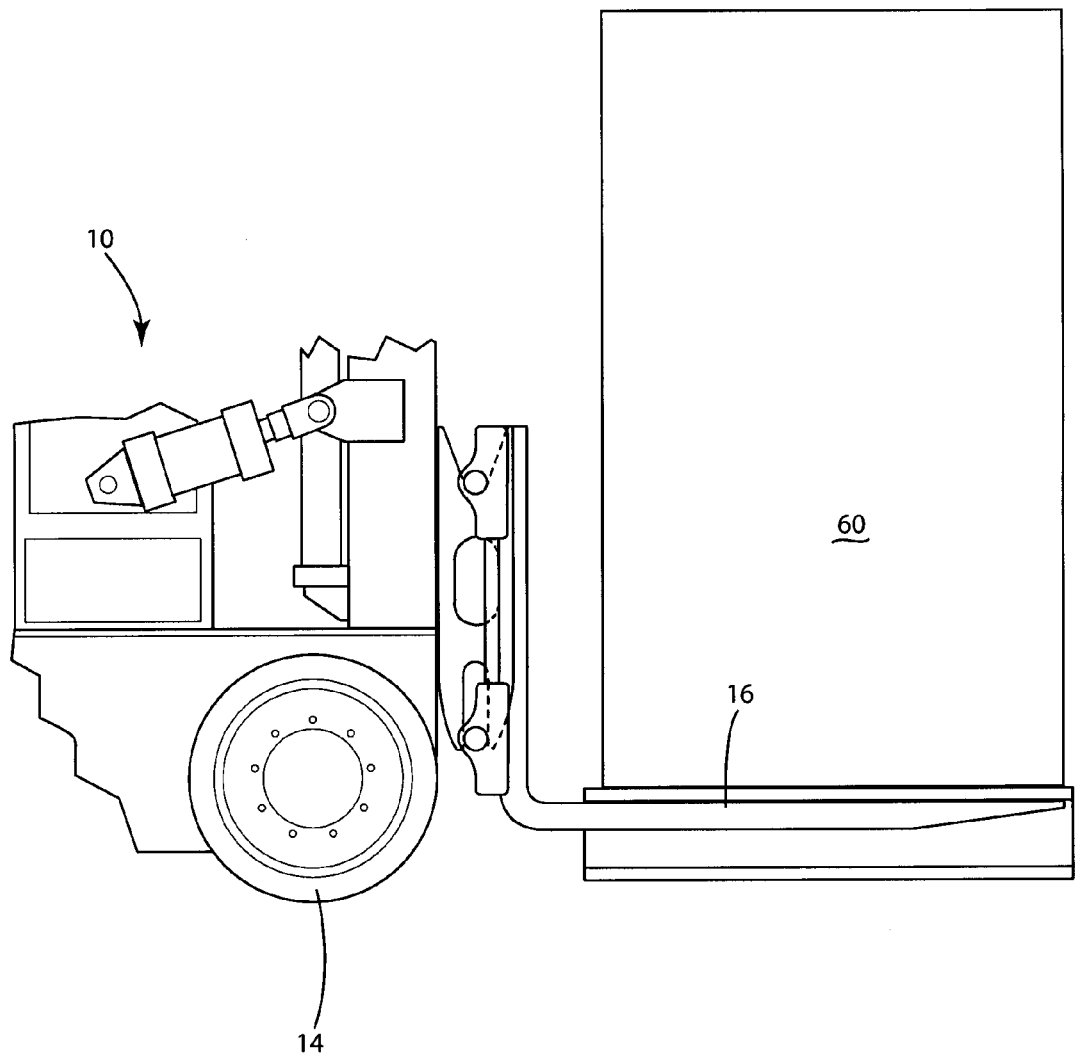
FIG. 45 is a side view detailed schematic view of the floating forks.

The fork carriage 17 includes slots 32 on each side that interact with pins 48 on the forks 16. The pins 48 moveably couple the forks 16 to the fork carriage 17. More specifically, the forks 16 include an upper pair and a lower pair, each coupled to the slots 32 in the fork carriage 17. The slots 32 include a pair of upper slots 36 and a pair of lower slots 34. Both the upper and lower slots 34, 36 allow the pins 48 to move freely up and down vertically along the axis 33 of the slots 32. At least one of the upper and lower slots 34, 36 substantially constrains movement of the pins 48 in all but the vertical direction along the axis 33 of the slots 32. The other of the upper and lower slots 34, 36 allows increasing movement away from the vertical axis 33 as the pins 48 are vertically raised along the vertical axis 33, due to interaction of the forks with the supporting surface or pallet 72. In the preferred embodiment, the upper slot 36 allows for this free ranging movement of the pins 48 by having side walls 38 that angle outwardly from vertical axis 33. More specifically, the side walls 38 extend upwardly away from the vertical axis 33. The lower portion of the upper slot 36 is formed such that when the pin 48 is at rest in the lower position, it is substantially constrained from movement away from the vertical axis 33. Therefore, while a load is lifted by the forks 16, it is secured from free movement, specifically by the slots in the horizontal direction and by gravity in the vertical direction, such as tilting or angular movement of the forks 16. As is illustrated in the figures, when the pins 48 are engaged in the lower end 46 of the slots 32, the angular side walls are what keep the pins 48 constrained from movement away from the vertical axis 33; however, as the pins 48 are lifted from the lower end 46, the further they are lifted, the more freedom of motion away from the vertical axis 33 is possible. As further illustrated in FIG. 1, it is possible for the lower slot 34 to not have a lower end 46. However, for certain embodiments, such as lifting heavy loads, and as illustrated in FIG. 44, the lower slot may include a lower end to provide additional support for the forks 16 while the load 60 is lifted. In the figures where the load 60 is lifted for carrying, it may be seen that the angled side walls 38 provide sufficient support such that the forks 16 do not move freely when a load 60 is lifted. However, when the weight of a load 60 is off the forks 16, pressure on the tips 66 of the forks 16 may easily cause the forks 16 to float. This pressure would be such as that occurring when the fork tips 66 enter a pallet pocket 74.

Figure 3:
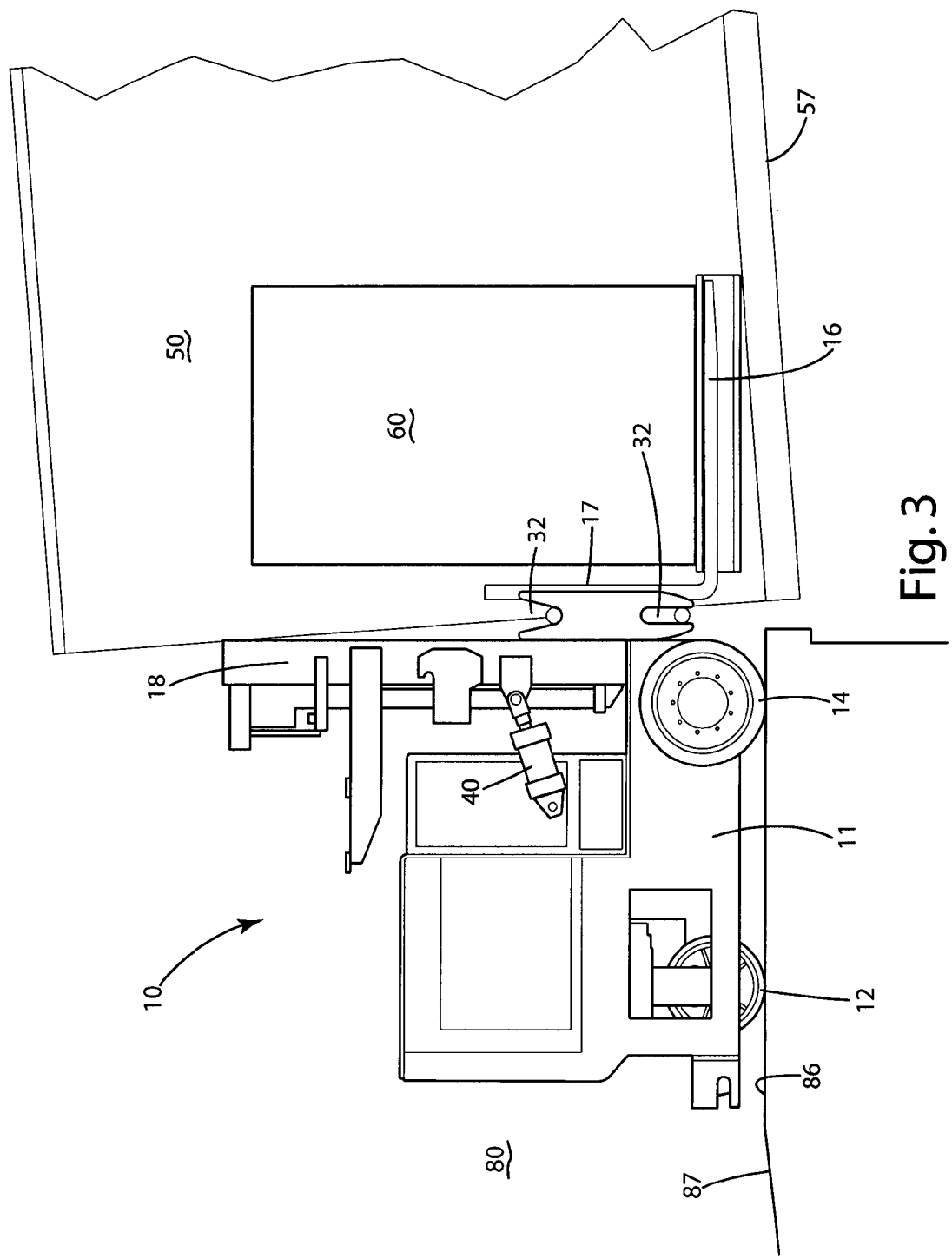
FIG. 3 is a side view of the end load being inserted into the transport.

The load capture mechanism described above may be capable of shifting the engaged load horizontally by means of a side-shifting mechanism 22. As illustrated in FIG. 3, the elevator mechanism 18 may be equipped with two fork pairs 16. Each fork pair 16 is mounted to a separate fork carriage 17, and each fork carriage 17 is mounted to the elevator mechanism 18. The elevator mechanism 18 can raise the fork carriages 17 together as needed to vertically position the fork pairs 16 and/or loads. The fork carriages 17 are also mounted on vertical slides 15, which may be equipped with hydraulic cylinders to allow up to six inches of independent lifting ability per fork pair 16, in addition to any lift capability provided by the elevator mechanism 18. This independent lifting allows the AGV to travel and position its fork pairs 16 into a pair of adjacent loads. Raising only one fork pair 16 six inches allows the AGV to pick up a single load from a pair of adjacent loads. This same operation, along with the side shifting mechanism 22, allows the AGV to place two loads side by side or in single bin storage racks. To provide the side shift capability, each fork carriage 17 may be equipped with a hydraulic motor 24 with a chain drive. The chain 25 will pull the fork carriage 17 to the desired position. In a preferred embodiment, the carriage slide rails 26 are designed to allow the fork carriage 17 to travel past center, such that the AGV is capable of dropping a load in the center position of the AGV. To do this, one fork pair 16 is shifted to one side and out of the way, thus allowing the other fork pair 16 to be positioned at the center of the AGV.

The side-shifting mechanism 22, in conjunction with the elevator mechanism 18 and the forward and backward travel of the AGV 10, allows the load to be adjusted in all three dimensions when engaged to the load capture mechanism of the AGV 10. In a preferred embodiment illustrated in FIG. 1, each of the fork pairs 16 can be independently moved horizontally, i.e., in the directions of arrow 31. Additionally, each of the side-shifting mechanisms 22 includes an encoder 23 for tracking the movement of the fork pairs 16. These encoders 23 preferably are capable of tracking both the position and rate of change in position of the fork pairs 16 in the horizontal direction. These encoders 23 are in communication with the guidance system of the AGV 10 and are used to properly position the fork pairs 16. The horizontal shifting of the fork pairs 16 is described more fully below in conjunction with the description of loading the transport 50.

The AGV 10 as described above is designed to be used in the automatic loading and unloading of a transport 50. These processes will be described in relation to an enclosed truck trailer at a loading dock location of a factory, but similar processes could be described for any similar transport 50; for example, a flatbed trailer or rail car.

In order to load a transport 50, the AGV 10 must first engage the load. In a preferred embodiment, as described above, this is accomplished by the use of fork pairs 16 of the AGV 10 that mate with fork pockets of the load, usually integral with a pallet, and by using the elevator mechanism 18 to lift the load off the ground. The mating of the fork pairs 16 to the fork pockets is a difficult operation, and requires precision. Preferably, the load is placed in a known location with a relatively high degree of precision. The guidance system of the AGV 10 may then be programmed to interact with the load at this known location, so that the fork pairs 16 and fork pockets properly mate with each other. If placing the load into a known position with precision is difficult or impractical, the AGV 10 could be modified to allow for a wider range of load positioning. For example, optical sensors could be positioned on or near the tips 66 of the fork pairs 16 and could be used to detect the fork pockets of the load. When the AGV 10 approaches the load location, these optical sensors could be switched on to find the fork pockets. Based on the detected position of the fork pockets, the AGV 10 would modify its path of travel or, preferably, the fork pairs 16 could be adjusted by means of the side-shifting mechanism 22 such that the forks 16 and fork pockets interact. While this allows more robust operation, the additional components required make this a more expensive and less desirable configuration. However, with the ability of the forks to float vertically and angularly, the AGV is allowed a grater range of error in placement of the forks while still being able to successively load the AGV.

Once the AGV 10 has been loaded, the AGV 10 will travel to the loading dock area of the factory. The transport 50 will be located adjacent to the loading dock. In some cases, a loading ramp is used in order to facilitate the travel of the AGV 10 from the dock to the transport 50. The loading ramp is designed to ease the transition for the AGV 10 between the two different surfaces. Because this transition may be somewhat uneven, the track wheel, if used, may need to be lifted and rendered inoperable to avoid it being damaged.

The AGV 10 will use its guidance system to transport the load to the loading dock and near to the transport 50. In a preferred embodiment, the AGV 10 will use its primary guidance system to move to a position near the threshold of the opening 52 of the transport 50. At this point, the AGV 10 will guide the load into the intended load position. The AGV then continues to fill the transport until it reaches the last few loads from the threshold. Any known guidance system may be used to guide the AGV 10 to the position near the threshold 52 of the transport as well as in the transport 50. The types of guidance systems used in the transport may also vary as desired. Although any type of guidance system may be used inside or outside the transport, the present invention will be described below as using a primary inertial guidance system and a secondary optical laser or ladar guidance system.

During loading, the AGV 10 is guided by the guidance system to the intended load position. If the load 60 is the first load, preferably, the intended load position is the front most unoccupied section of the transport 50; however, for heavy loads, this placement may vary depending on the desired weight distribution within the transport. In the preferred embodiment, the AGV 10 will continue forward in the approximate middle of the transport 50 until detecting the end 56 of the transport 50 or previously loaded loads on the transport 50. This detection may be accomplished by an appropriately configured pressure sensor or sensors. The pressure sensor could be positioned to be on the end of the fork pairs 16 to detect contact with the end wall 56 of the transport 50 or other load or, in a preferred embodiment, a pressure sensor could be positioned on the other end of the fork pairs 16 to interact with the load when the load itself contacts the end wall 56 or other load. In the preferred embodiment, the AGV 10 slows down to a low speed when it approaches the intended load position, and the AGV 10 detects bumping of the load with the end 56 of the transport 50 or other load by monitoring the drive current of the motor of the AGV 10. As resistance to travel increases (for example, when a relatively immovable object contacts the AGV 10), the current delivered to the electric motor of the AGV 10 similarly increases. This increase in current can be used as the indication the load has reached its intended load position.

Once the AGV 10 has reached the intended load position, the AGV 10 deposits the load 60. In a preferred embodiment, this comprises lowering the load 60 onto the transport 50 by means of the elevator mechanism 18, and then moving the fork pairs 16 out of engagement with the fork pockets. The step of depositing the load 60 can also include shifting the fork pairs 16 (with the engaged load) outward towards the side of the transport 50 by means of the side-shifting mechanism 22 before depositing the load. In a preferred embodiment, the load is comprised of two independent pallets 72, each of which is engaged with one of the fork pairs 16 illustrated in FIG. 1. In this embodiment, when the AGV 10 is approaching the intended load position in the direction of travel of the AGV 10, the side-shifting mechanism 22 begins to shift the fork pairs 16 and the engaged independent pallets, outwardly towards the sides 54 of the transport 50 and away from each other. The encoders 23 track the change in position of the fork pairs 16 during this side shifting. In a preferred embodiment, when the encoders 23 detect that the position of the fork pairs 16 is no longer changing, the load 60 is presumed to have contacted the sides 54 of the transport 50, and the AGV continues to travel in the forward direction until detecting the end 56 of the transport 50 or previously loaded loads on the transport 50, as described above. At this point, the load has reached the intended load position and the load 60 is lowered onto the base of the transport 50.

Figure 4:
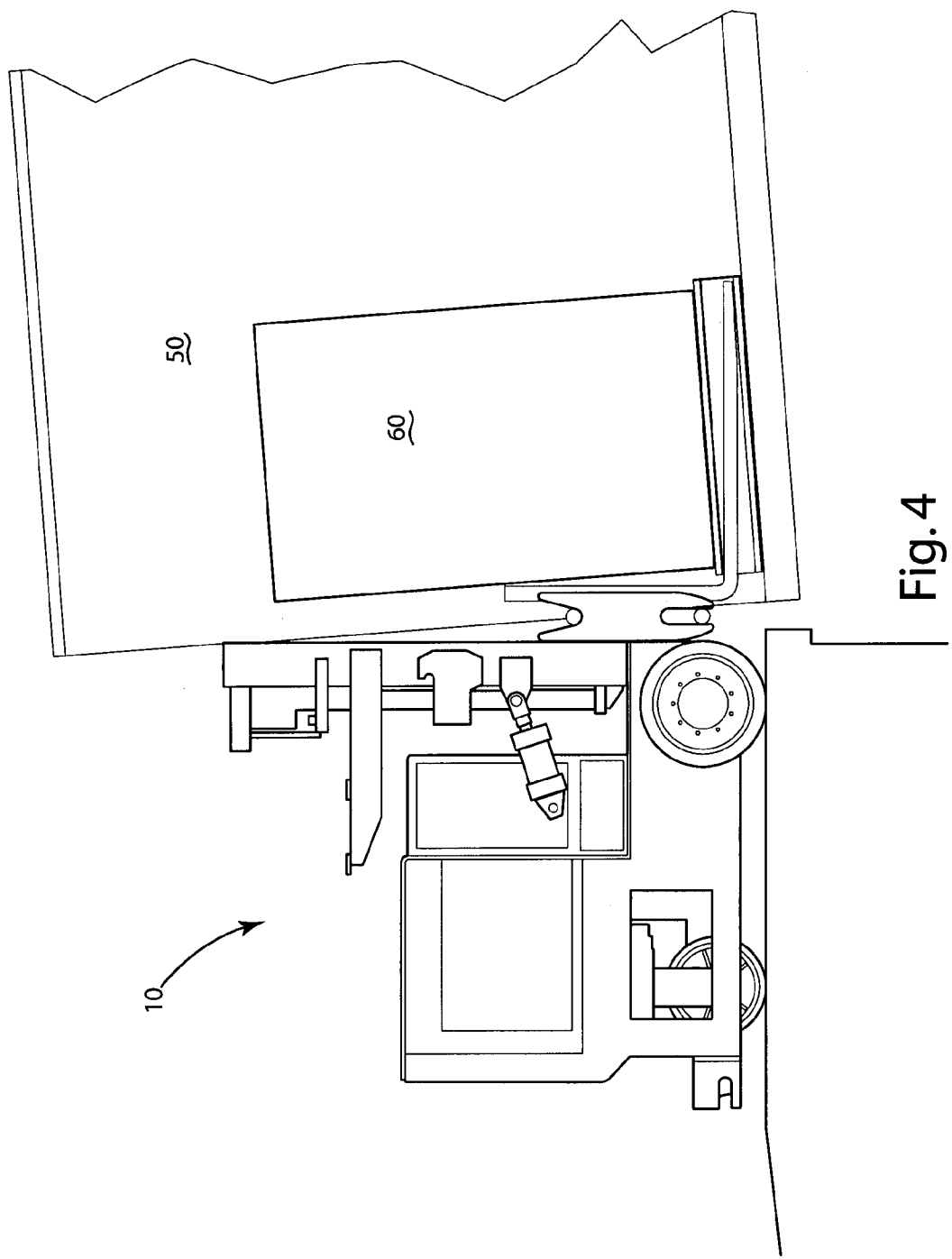
FIG. 4 is a side view of the load being placed within the transport and the contact between the pallet and the forks.
Figure 5:
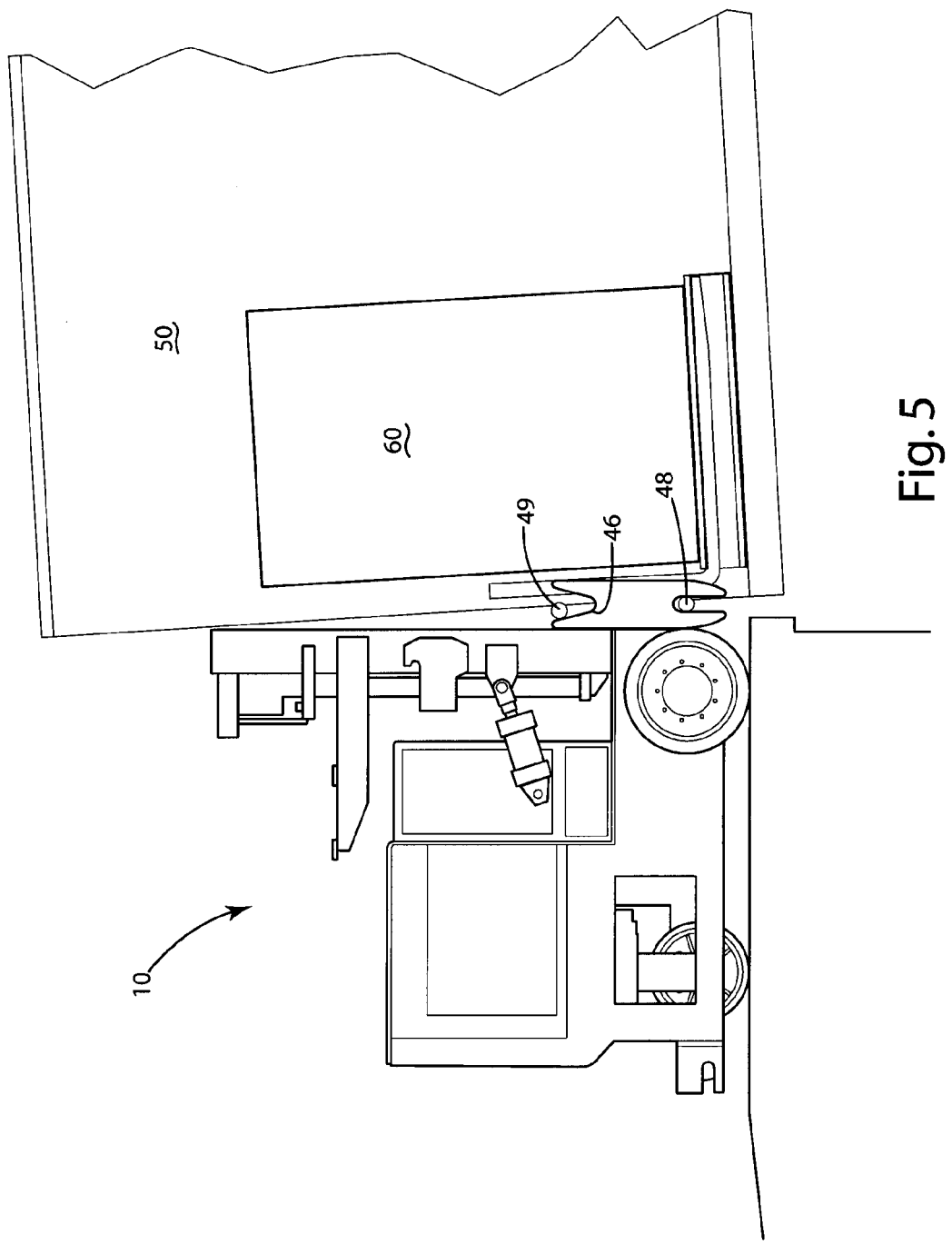
FIG. 5 is a side view of the floating of the forks during removal from the pallet pockets.

Various modifications to the embodiments described above can be made without departing from the scope of the claimed invention. For example, an AGV 10 that has only one fork pair 16 can be used with the method of the invention. In this embodiment, the fork pair 16 can be shifted by means of the side-shifting mechanism 22 such that individual loads 60 can be placed at the side 54 of the transport 50. In this manner, the transport 50 can be loaded one load 60 at a time. If desired, the AGV 10 can also alternate the side 54 of the transport 50 on which the load is deposited. Further, this invention allows the AGV 10 to load the transport 50 in any load configuration, e.g., two loads side-by-side from the front to the back of the transport 50 (as in a preferred embodiment illustrated in FIG. 4*a*), alternating rows of two side-by-side loads and one load in the middle from the front to the back (FIG. 4*b*), or any other conceivable layout. In the case of asymmetrical loads, the loads can be arranged such that some are rotated with respect to others, as shown in FIG. 4*c* (in which the loads indicated by 60' are rotated 90° from the alignment of the loads 60) and FIG. 4*d* (in which the loads 60 are arranged in a "pin-wheel" layout). In the illustrated layouts of FIGS. 4*a-d*, rectangular loads are shown; however, any shaped load may be used with the present invention.

Because of the flexibility in position for depositing the loads by the AGV 10, the optimum configuration for the loaded transport 50 can be achieved. In a common arrangement, the transport 50 is loaded such that a minimum amount of empty space (i.e., without a load) is achieved; however, for heavy loads it is possible that the weight limit of the transport 50 would be exceeded in such a configuration. In this type of circumstance, or in another event of a less than fully loaded transport 50, the layout of the loads in the transport 50 can be arranged to minimize shifting of the loads during transport 50. In each case, the AGV 10 and method of the present invention can be utilized to achieve the desired loading of the transport 50.

After depositing the load 60, the guidance system will then be used to guide the AGV 10 back to approximately the same location outside the threshold 52 of the transport 50. Once at this location, the guidance system will then be used to guide the AGV 10 on its travels; for example, to pick up another load. If a track wheel is used, as in a preferred embodiment, the track wheel is lowered to again contact the ground to be utilized by the first, i.e., inertial, guidance system.

In a preferred embodiment, the primary guidance system will continue to track the motion of the AGV 10 when it is being guided by the secondary guidance system. This continual tracking allows for a more precise resumption of guidance by the primary guidance system.

In loading the last few loads 60 on the transport 50, the present invention uses the floating forks 16 to easily place the load 60 on the transport floor 57. More specifically, when the AGV places the load 60, the forks 16 float by moving vertically and angularly or tilt relative to the fork carriage 17. By providing the angled side walls 38 of the upper slot 36, the upper pin 48 has room to move two dimensionally unlike the lower slot which only may move one dimensionally. When the forks 16 need to be tilted, the pallet pockets 74 themselves or supporting surface will force the movement of the forks 16 and will provide the correct amount of tilt as the fork pin 48 in the upper slot 36 is free to move two dimensionally in a constrained manner within certain limits allowing vertical and angular movement of the fork tips 66. In some embodiments, when the AGV 10 determines that it is placing loads 60 near the threshold 52 such as the last few loads 60 to be placed on a transport 50, the AGV 10 may add an extra step to the process. More specifically, as the AGV 10 approaches the load 60 and the forks 16, in particular the fork tips 66, enter the pallet pocket 74 on the pallet 72, the elevator mechanism 18 may lower the fork carriage 17 in a downward vertical direction such that the forks pairs 16 engage the transport floor 57 or the supporting surface of the AGV such that the fork pins 48 are raised off from the lower end 46 of the slots 32. As the fork pins 48 are raised off the lower end 46 of the slots 32, this frees the upper pin 49 to move along the longitudinal axis 11 of the AGV 10. This movement allows the fork pairs 16 not only to be raised or lowered in a floating motion, but also to tilt or angle such that the fork pairs 16 and, in particular the fork horizontal segments 62, may move to be substantially parallel the transport floor 57 even when the AGV 10 is on a supporting surface that is angled relative to the transport floor 57 where the load is to be placed or picked up, without the need to tilt the elevator mechanism 18. By substantially paralleling the forks 16 to the transport floor 57 and thereby to the axis of the pallet pockets, the fork tips 66 may easily be entered into the pallet pocket 74 with minimal interference. In some embodiments, the pallet 72 will have enough relative angle such that one of the upper 63 or lower 64 fork surfaces will engage the pallet 72 as the fork tips 66 extend all the way into the pallet pocket 74. This engagement will force the upper pin 49 to increasingly move in a desired direction such that the fork 16 tilts to minimize the frictional engagement or sometimes what would be forceful engagement with the pallet 72 without the ability to float as the forks are inserted into the pallet pocket 74. Once the fork pairs 16 are fully inserted into the pallet pocket 74, the AGV 10 may lift the load as normal and due to the angular side walls 38 of the upper slot 36, as the AGV lifts the load, the weight of the load 60 forces the fork pins 48 downward and in a particular the upper pin 49 downward such that the pins 48 are constrained from movement along the longitudinal axis 11, and in particular, the upper pin 49 is constrained from free movement relative to the axis 11. Therefore, as the load 60 is raised, the load 60, in particular the pallet 72, will equalize angularly to the supporting surface of the AGV such as the dock ramp 86 of load bay floor 85 as the angular side walls 38 force the pins 48 and thereby the forks 16 and load 60 to align with the AGV 10.

The process of unloading a transport 50 is very similar to the loading process described above. The main difference is that it is difficult to ensure that the load 10 to be picked up is in the proper position on the transport 50, and therefore the AGV 10 must be designed to compensate for this and other variability in the position of the load 60. A preferred method includes the step of guiding the AGV 10 with a primary guidance system to a position near the transport 50, most preferably at the threshold 52 of the transport 50. At this point, a secondary guidance system, guides the AGV 10 to mate with the load 60. As described above, the AGV 10 could be modified to allow for a wider range of load positioning by including optical sensors on or near the forks 16 that could be used to detect the fork pockets 74 on the pallet 72 supporting the load 60. When the AGV 10 approaches the load location on the transport 50, these optical sensors could be switched on to find the fork pockets 74. Based on the detected position of the fork pockets 74, the AGV 10 would modify its path of travel or, preferably, the forks 16 could be adjusted by means of fork shifters (i.e., the side shifting mechanism 22 and vertical slides 15 described above) that allow for movement of the fork pairs 16 independently of the AGV 10, such that the fork pairs 16 and fork pockets interact.

The process of using the floating forks 16 to unload the transport 50 is similar to the process for loading the transport 50. The forks 16 are lowered to be inserted into the pallet pocket 74. If necessary, which may be determined by the later described methods for sensing the angle of the floor 57, the AGV may lower its elevator mechanism 18 such that the forks 16 are pushed against the transport floor 57 or supporting surface of the AGV, such that the pins 48 are raised off from the lower end 46 of the slots 32. Raising the pins 48 as described above, causes the upper pin 49 to be free to move along the longitudinal axis 11 of the AGV 10. With the forks 16 free to angle relative to the supporting surface of the AGV 10, the AGV 10 may move forward toward the load 60 such that the forks 16, in particularly the fork tips 66, enter the pallet pocket 74 on the pallet 72. If the fork tip 66 such as the upper or lower fork surface 63 and 64 engage any portion of the pallet 72, the fork 16 may float thereby moving the pin 48 away from the vertical axis 33 of the slots 32 to align as necessary with the pallet pocket 74. The AGV 10 may drive forward and pick up the load 60 as normal. In picking up the load 60, the forks 16 are normalized with the AGV 10. More specifically, the pins 48 travel downward toward a supporting surface of the AGV 10 such that the upper pin 49 is forced by the angled side walls 38 to a longitudinally constrained position. In some embodiments, as described below, the AGV may further tilt the elevator mechanism 18 by using a tilt mechanism 40 and a tilt sensor 42 to provide further adjustment for extreme angles. However, in the present invention it is preferred to not tilt or measure for the angle of the floor or supporting surface and allow the fork carriage and forks interaction, in particular the angled side walls 38 perform their function, by allowing the forks 16 to float and match the transport floor surface 57. Once engaged, the load 60 could be lifted by the elevator mechanism 18 of the AGV 10. The guidance system would then guide the AGV 10 back to a position outside of the threshold 52 of the transport 50. At this point, the guidance system would then be used to guide the AGV 10 on its travels to the next destination. If two guidance systems are used, it is preferable for the guidance system to continue to track the motion of the AGV 10 when it is being guided by the secondary guidance system so that a more precise resumption of guidance by the primary guidance system is possible.

Another embodiment of the present invention allows the use of the primary guidance system to navigate within the transport 50 by determining a transport travel path before the first AGV 10 enters the transport 50. In determining the transport path, the system may determine the skew of the transport 50 in relation to the loading dock as well as any lateral offset of the center of the transport threshold from the center of the loading dock bay 82 and any vertical or angle relative to floor of the loading facility. In some embodiments, the system also determines the location and relative angle of one of the transport floor and roof. As described above, in the preferred embodiment, the AGV utilizes an inertial guidance system to guide the AGV 10 to the threshold 52 of the transport 50 to be loaded. The threshold 52 of the transport 50 is near the door 55 of the transport 50. The AGV near the threshold 52 of the transport 50, determines a transport travel path for the AGV 10 (for example, by using a sensor having a moving beam laser or optical system), to scan the transport 50 such as by determining the location of the side walls of the transport 50. In some embodiments, the sensor may also scan at least one of the transport roof 58 and transport floor 57. With the transport travel path determined, the primary guidance system, such as an inertial guidance system, can be utilized to load or unload the transport 50 in a manner very similar to that described in the examples above. Therefore the floating forks 16 allow a range of motion within needing the tilting of the elevator mechanism all but the most severe of angles. This determination can provide greater range of motion, if necessary, to the floating forks by using the information to tilt the elevator mechanism. However, in the preferred embodiment, with floating fork, the angle of the roof floor or vertical offset of the transport does not need to be determined.

Figure 8:
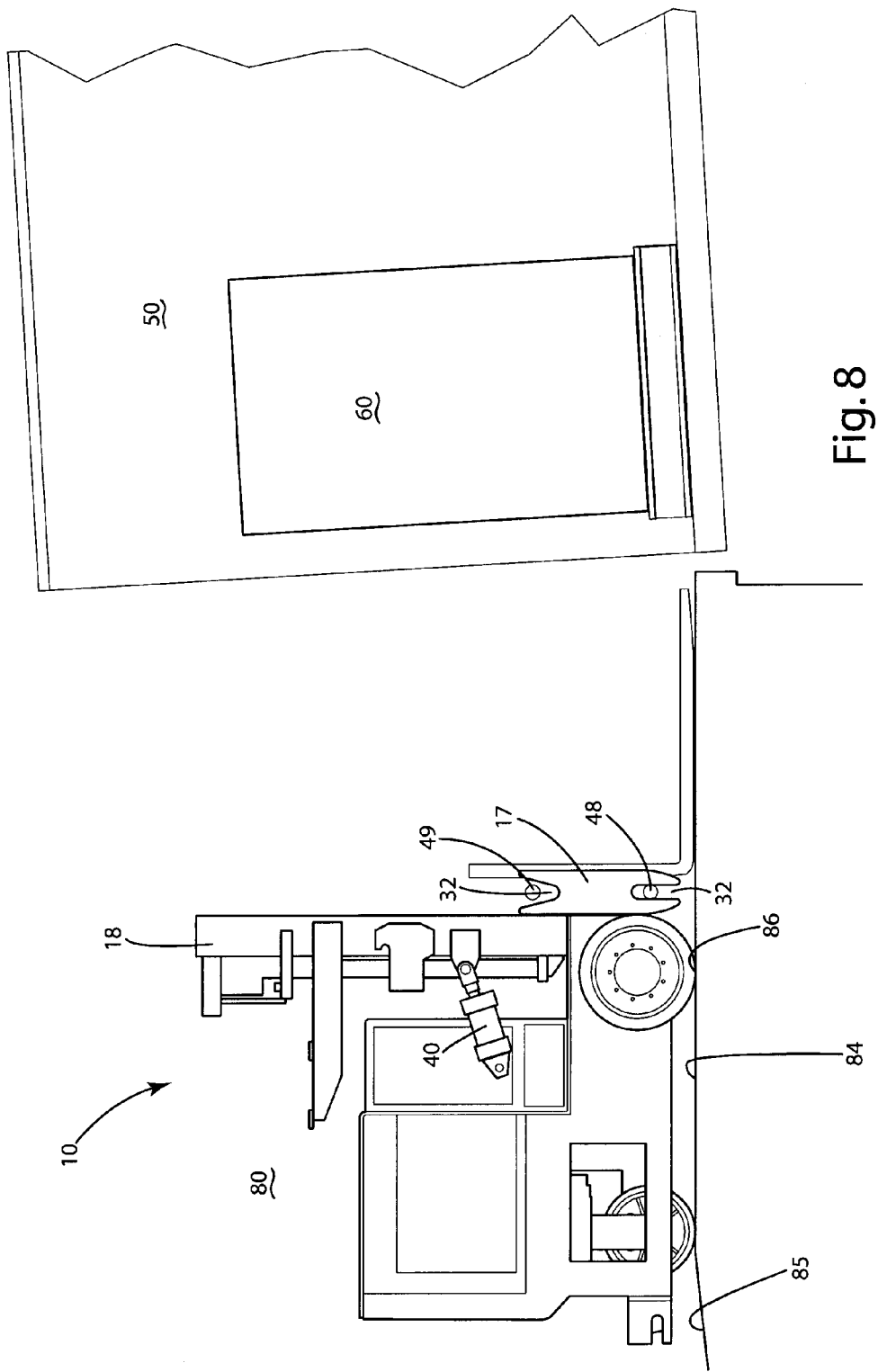
FIG. 8 is a side view of an AGV picking up the end load.
Figure 9:
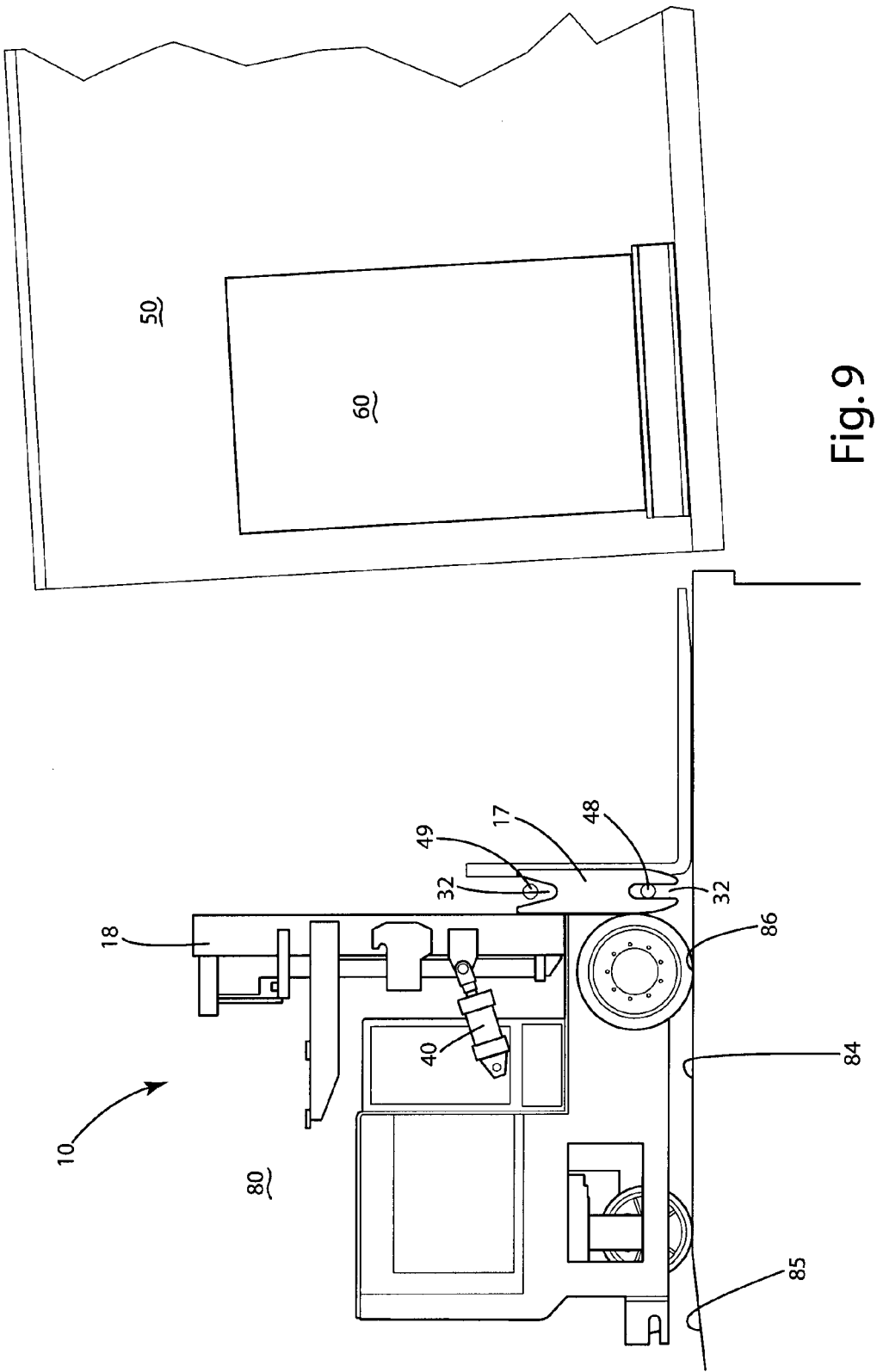
FIG. 9 is a side view of an alternative load placement.
Figure 10:
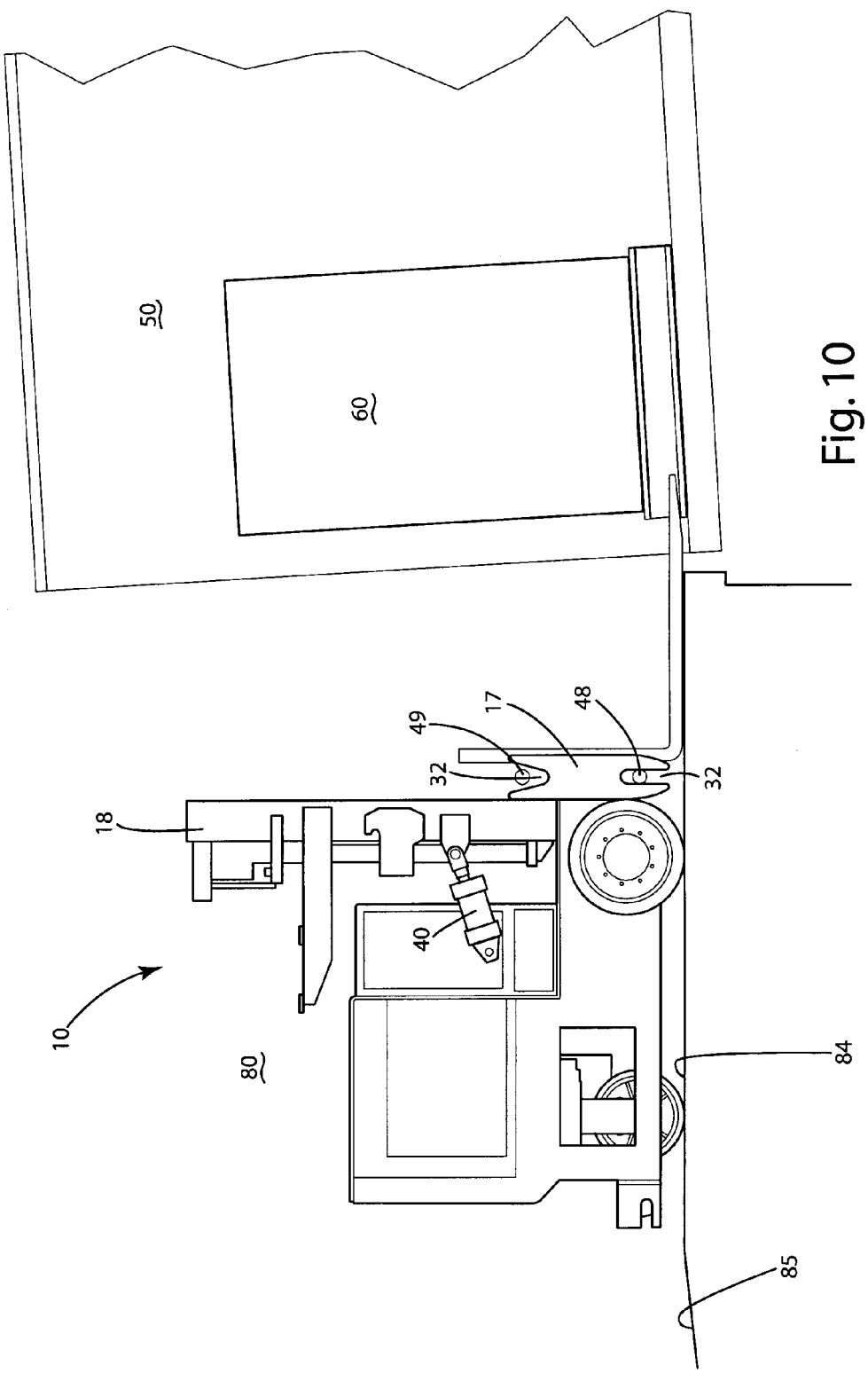
FIG. 10 is a side view of the AGV inserting forks into the pallet pockets.
Figure 11:
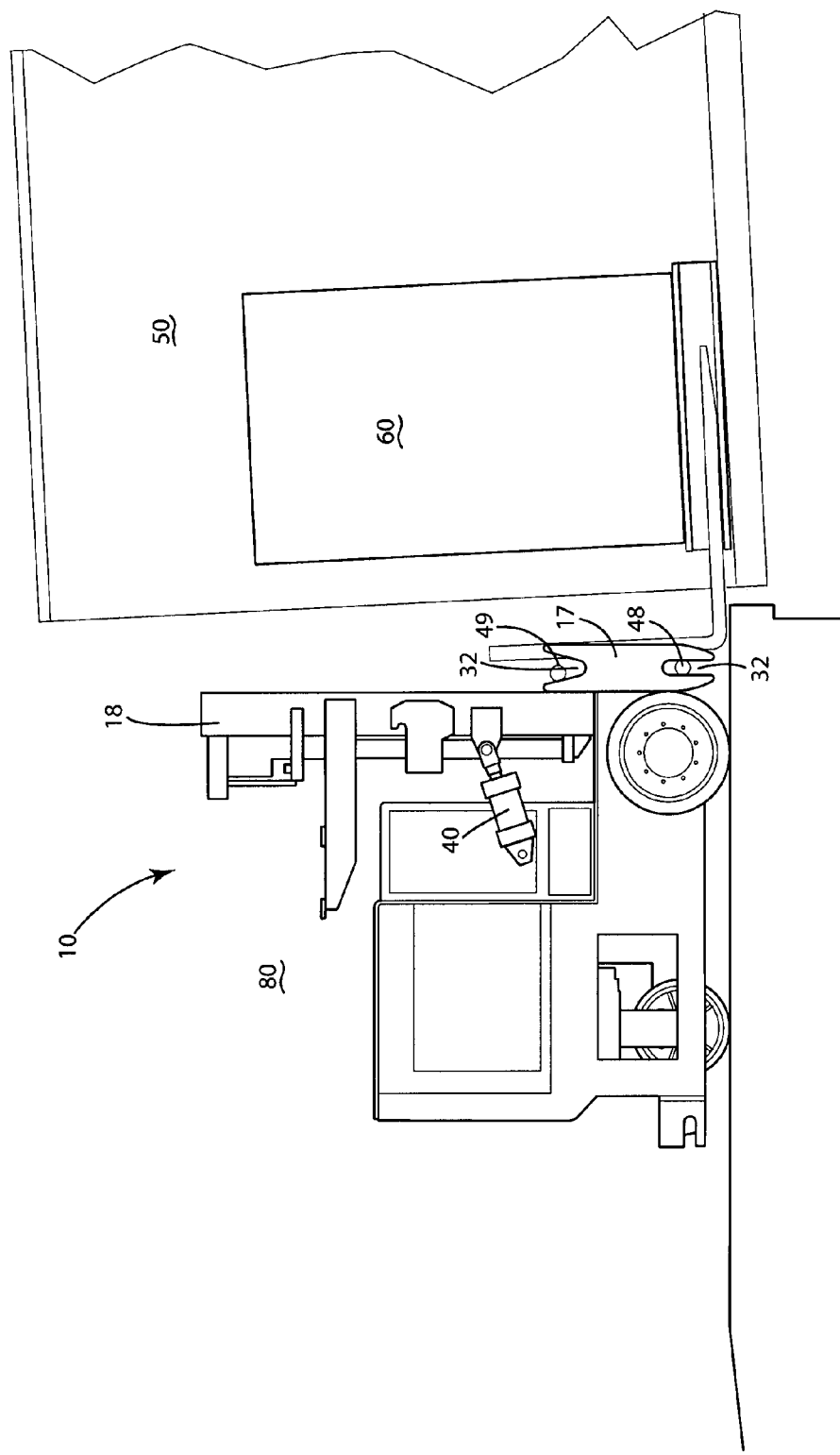
FIG. 11 is a side view showing the floating forks during insertion into the pallet pocket.
Figure 12:
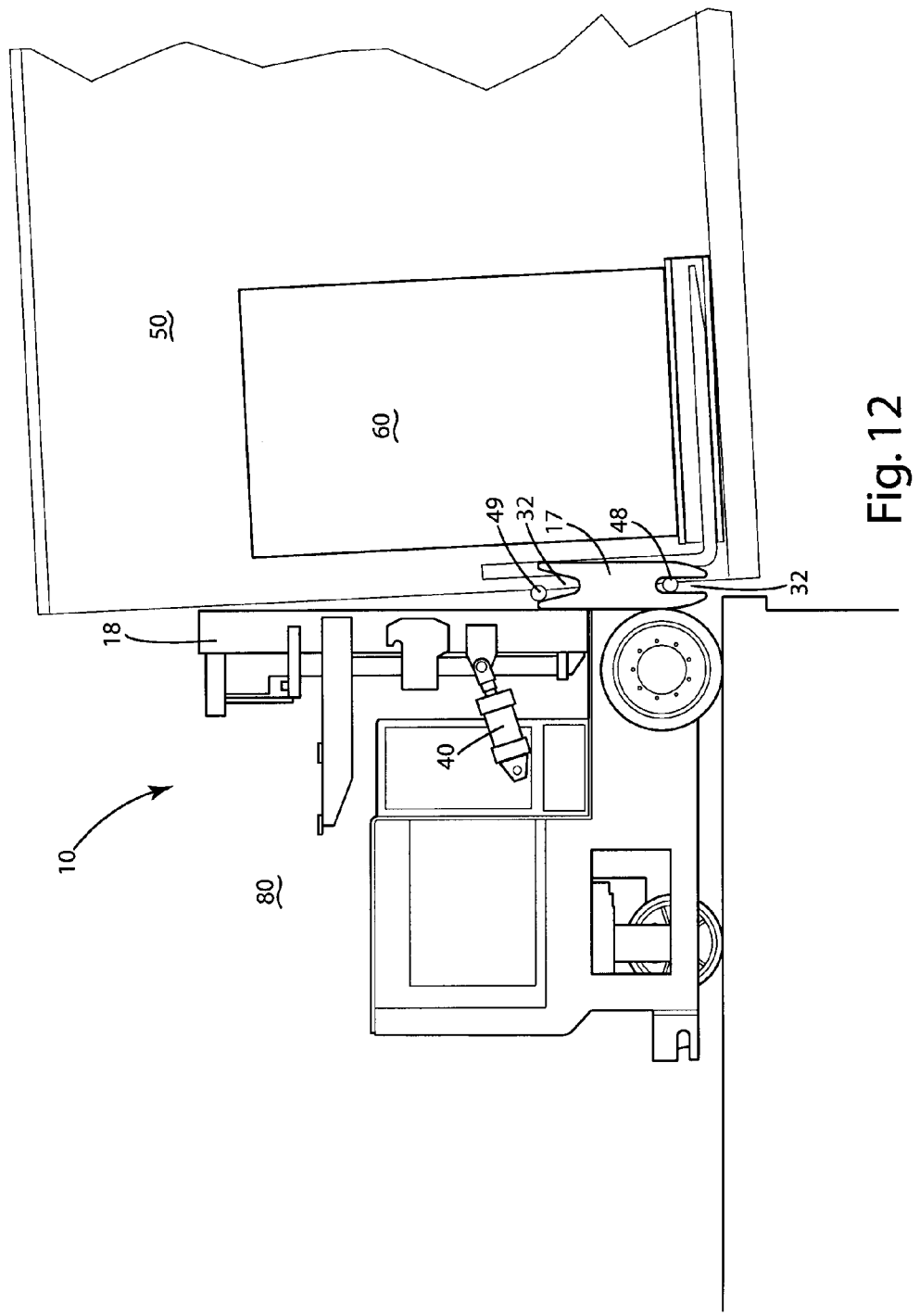
FIG. 12 is a side view of the forks fully inserted into the pallet pockets.
Figure 13:
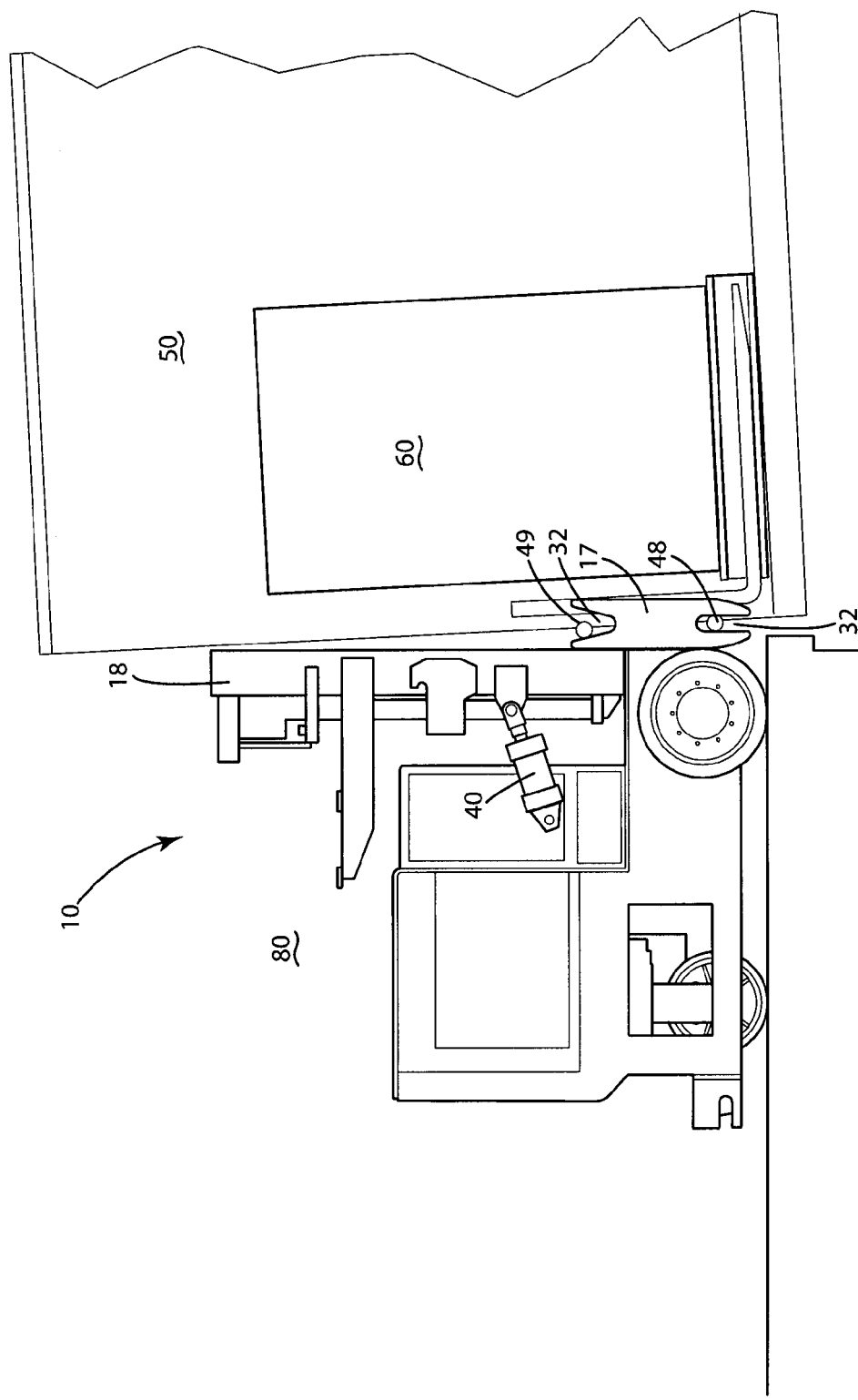
FIG. 13 is a side view of the AGV preparing to lift the load.
Figure 14:
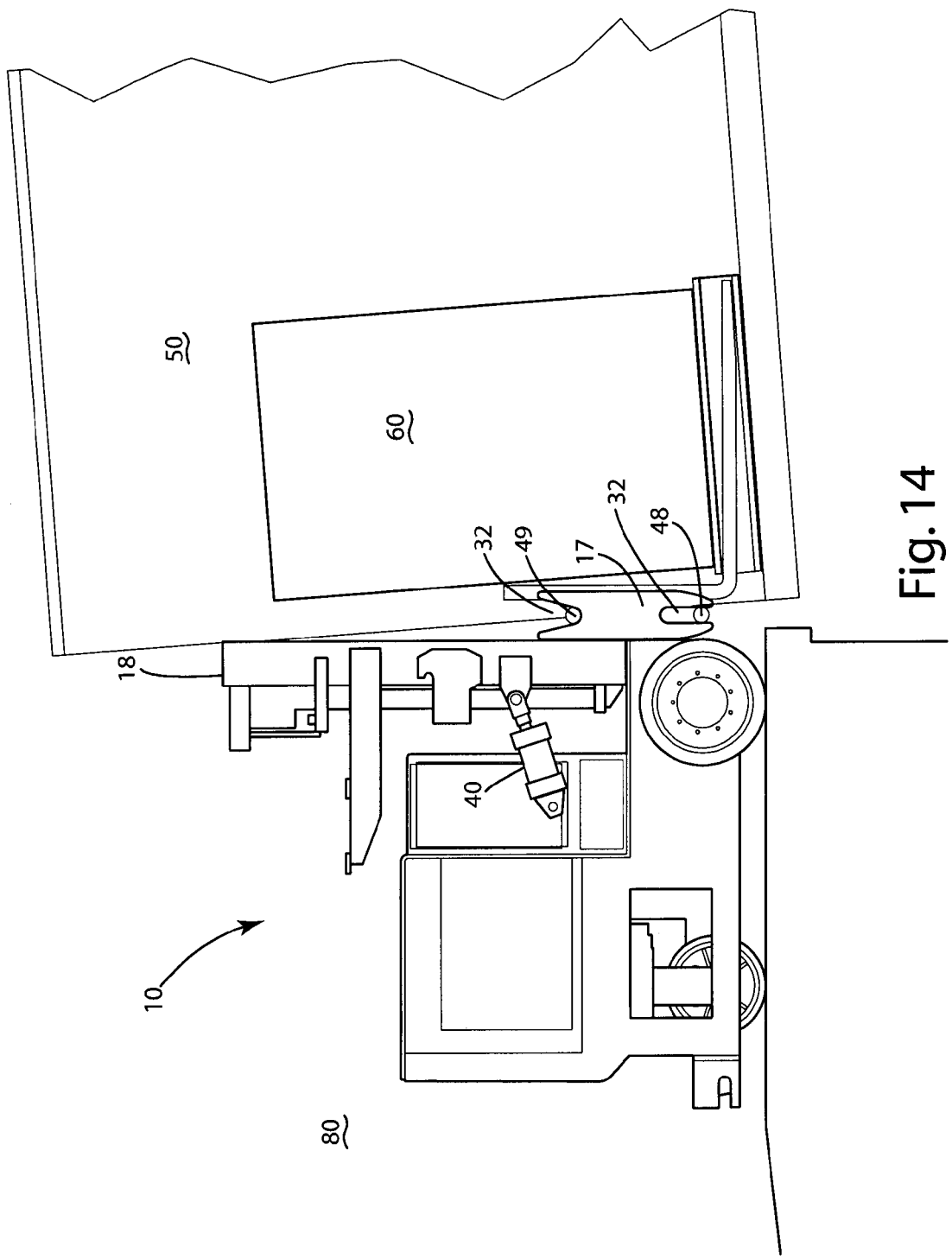
FIG. 14 is a side view of the AGV lifting the load.
Figure 15:
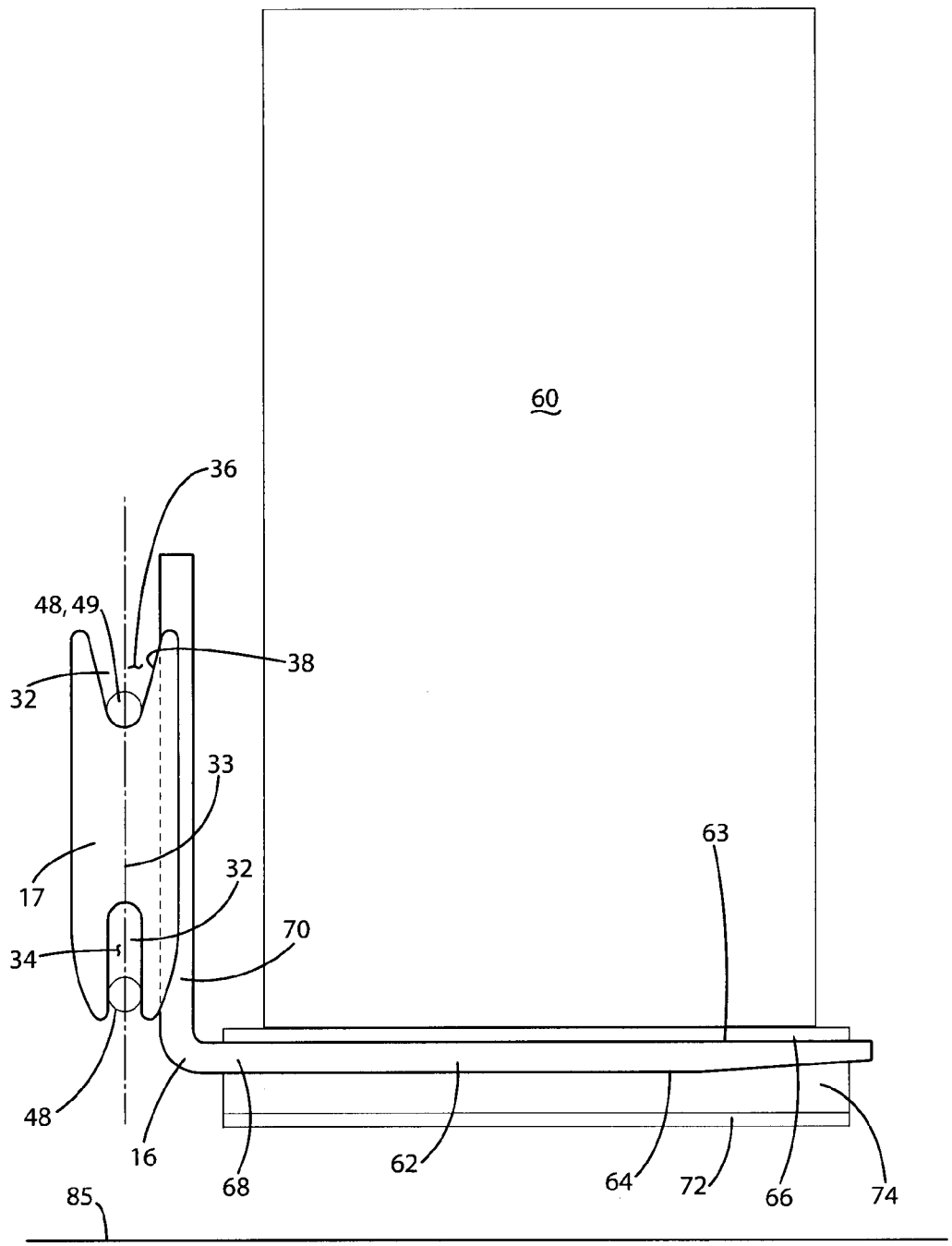
FIG. 15 is a side view of the load on the forks.
Figure 16:
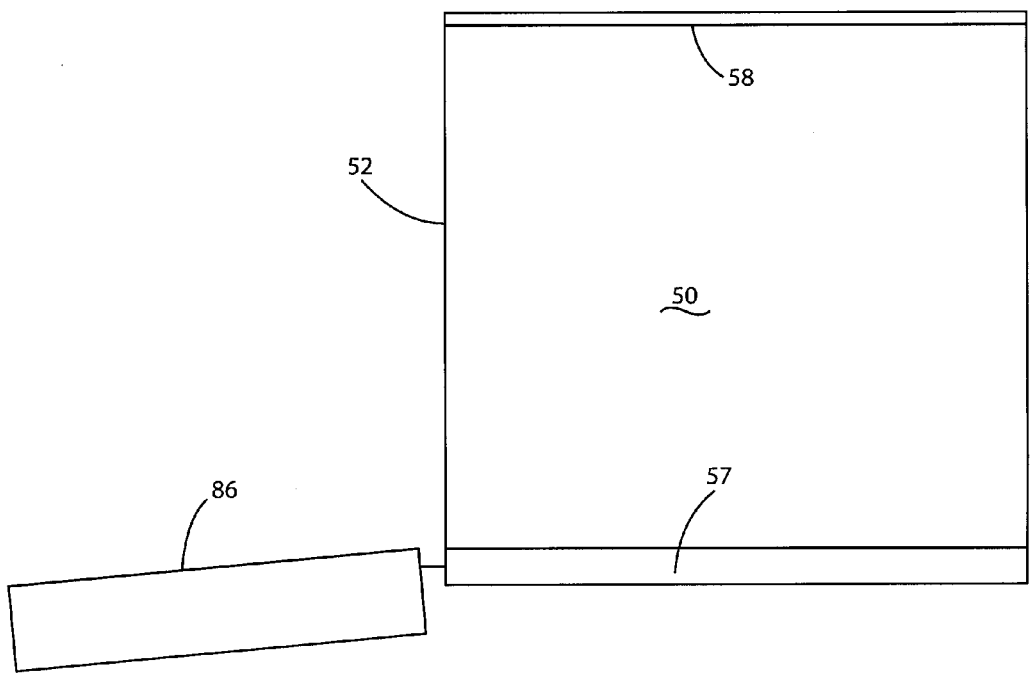
FIG. 16 exemplary illustrates the dock ramp being tilted relative to the transport.
Figure 17:
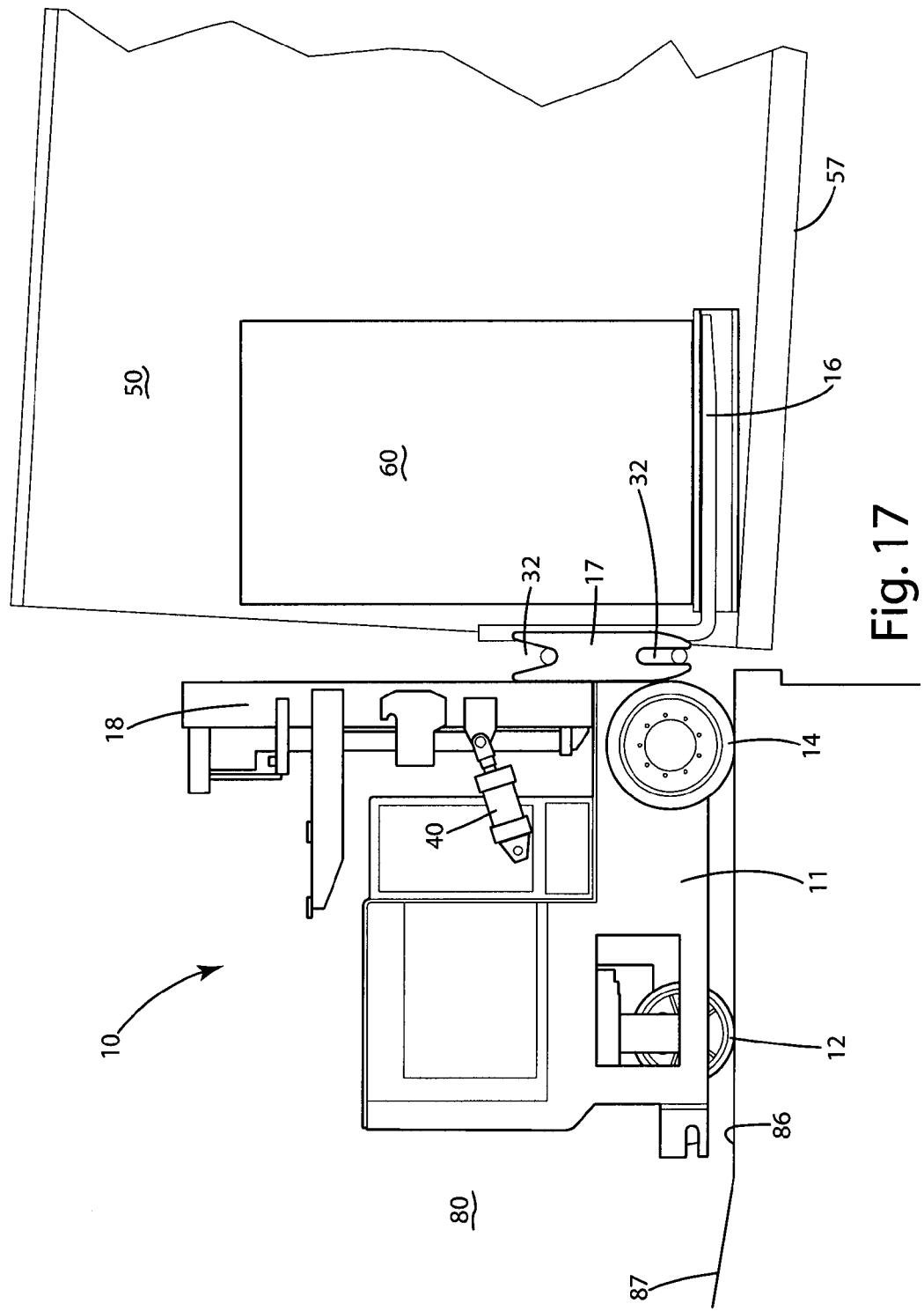
FIG. 17 is a side view of the AGV placing the load on the transport floor.
Figure 18:
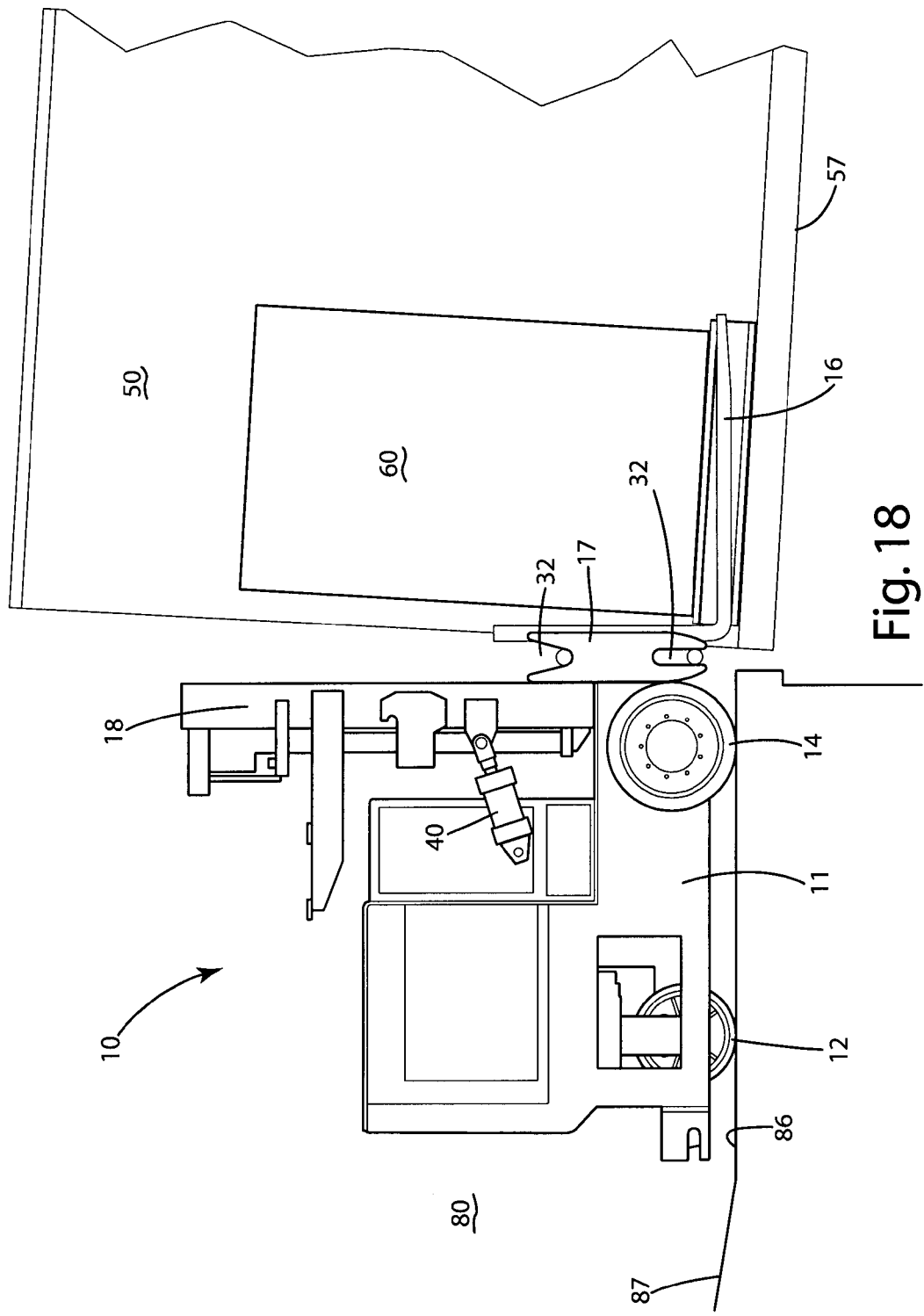
FIG. 18 is a side view of the positioning of the forks when the load is placed on the transport floor.
Figure 19:
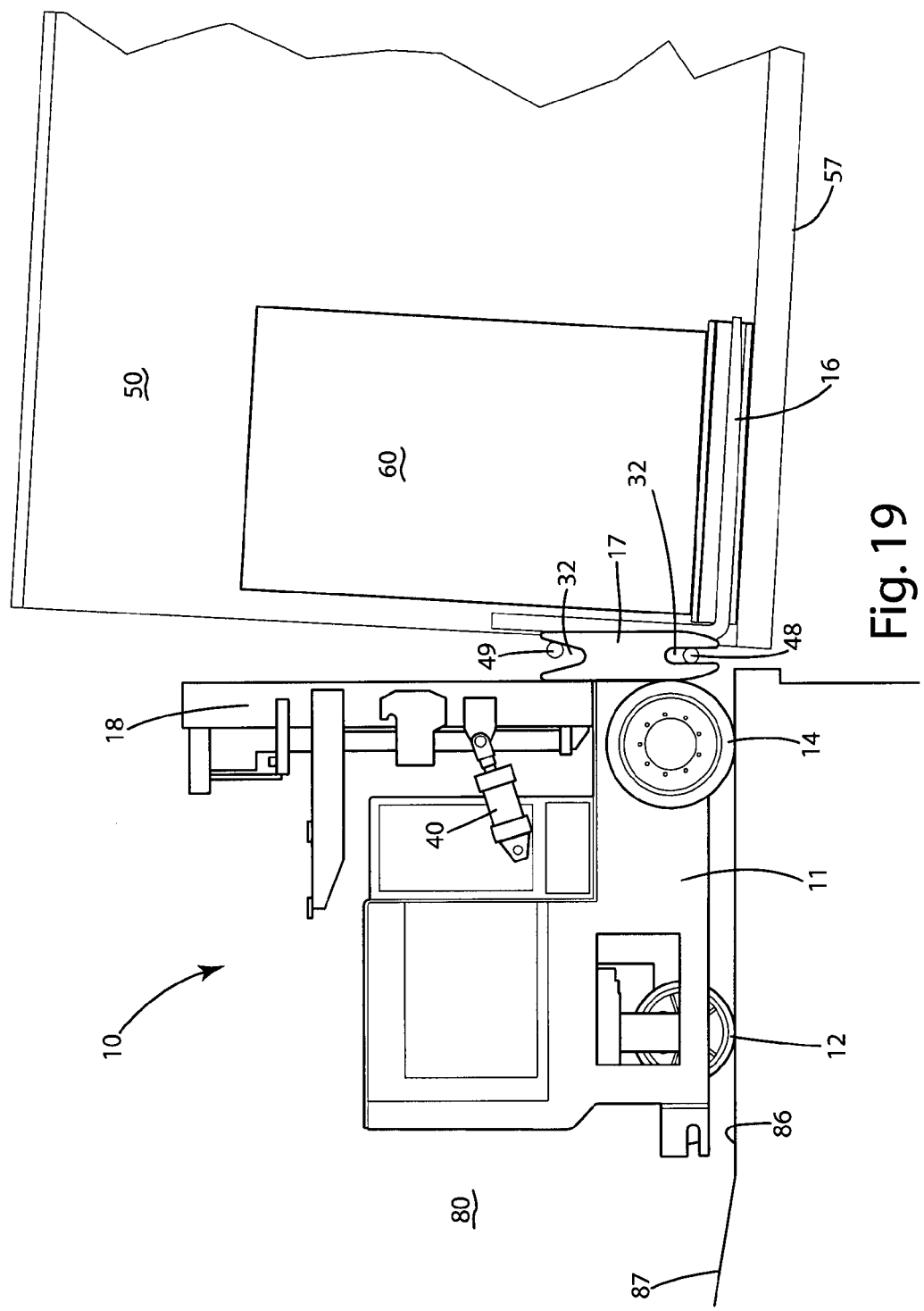
FIG. 19 is a side view of the floating of the forks in preparation for removal from the pallet pockets.
Figure 20:
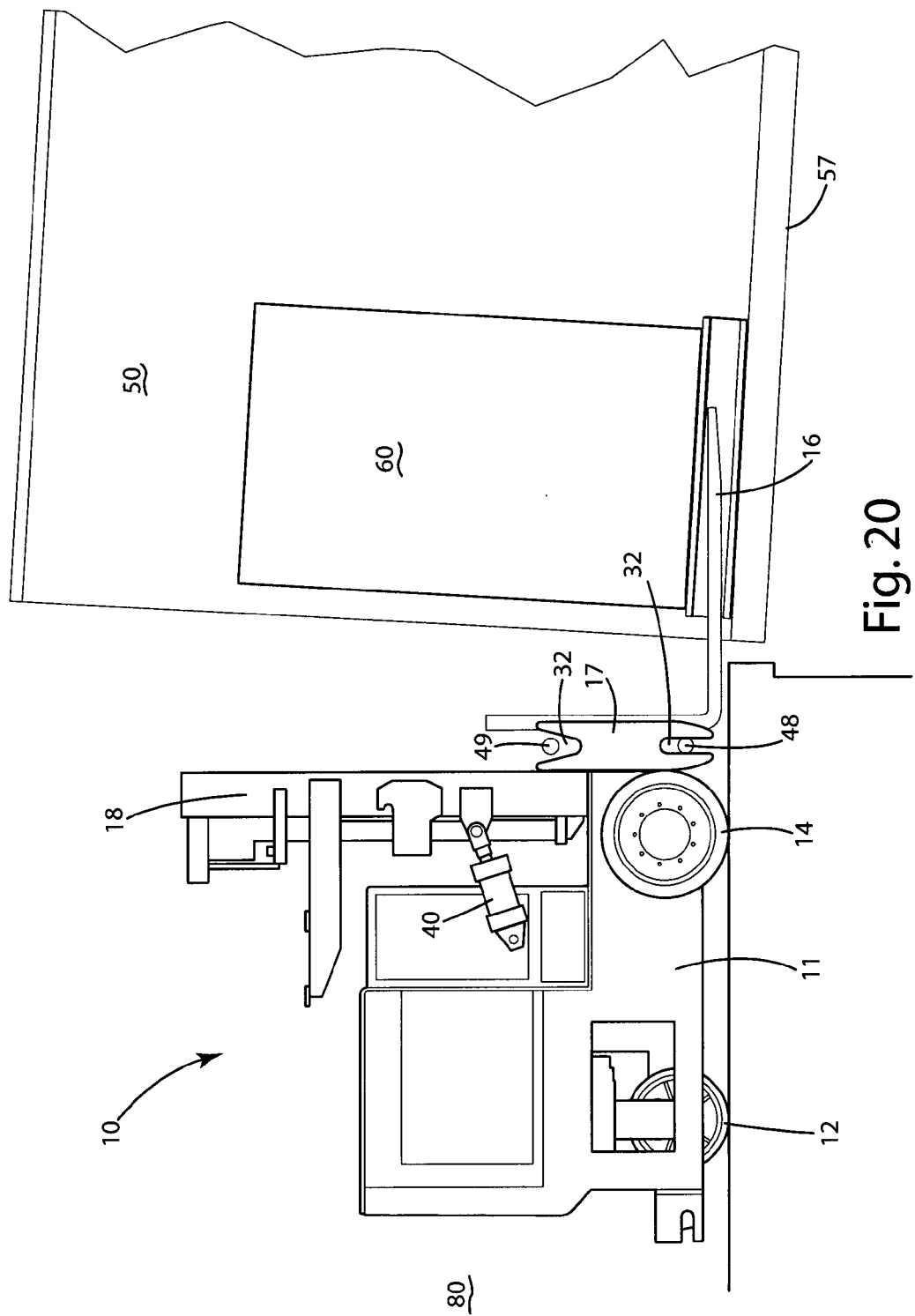
FIG. 20 is a side view of the floating of the forks during removal from the pallet pockets.
Figure 21:
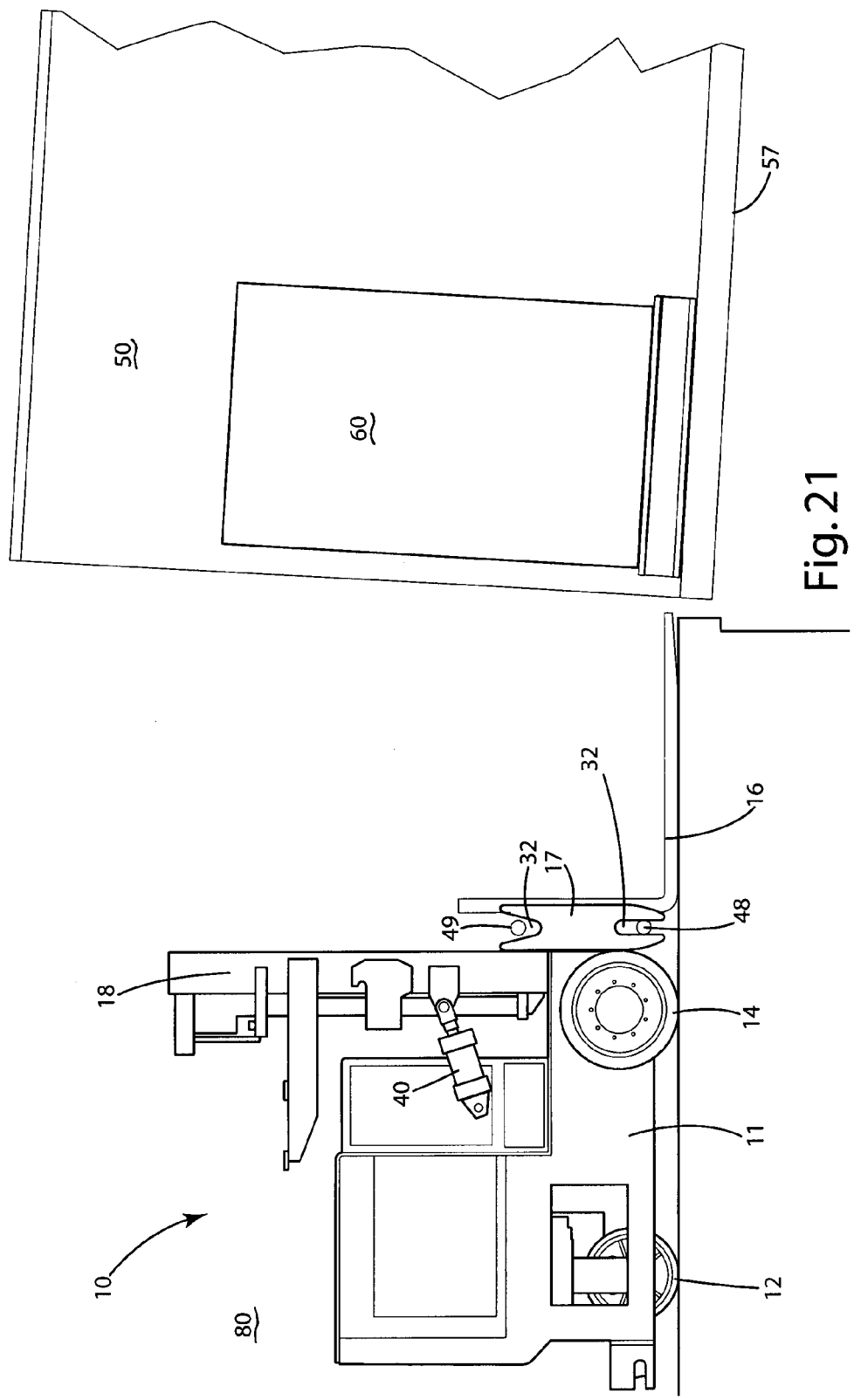
FIG. 21 is a side view of the completion of the load placement and removal of the forks from the pallet pockets.
Figure 22:
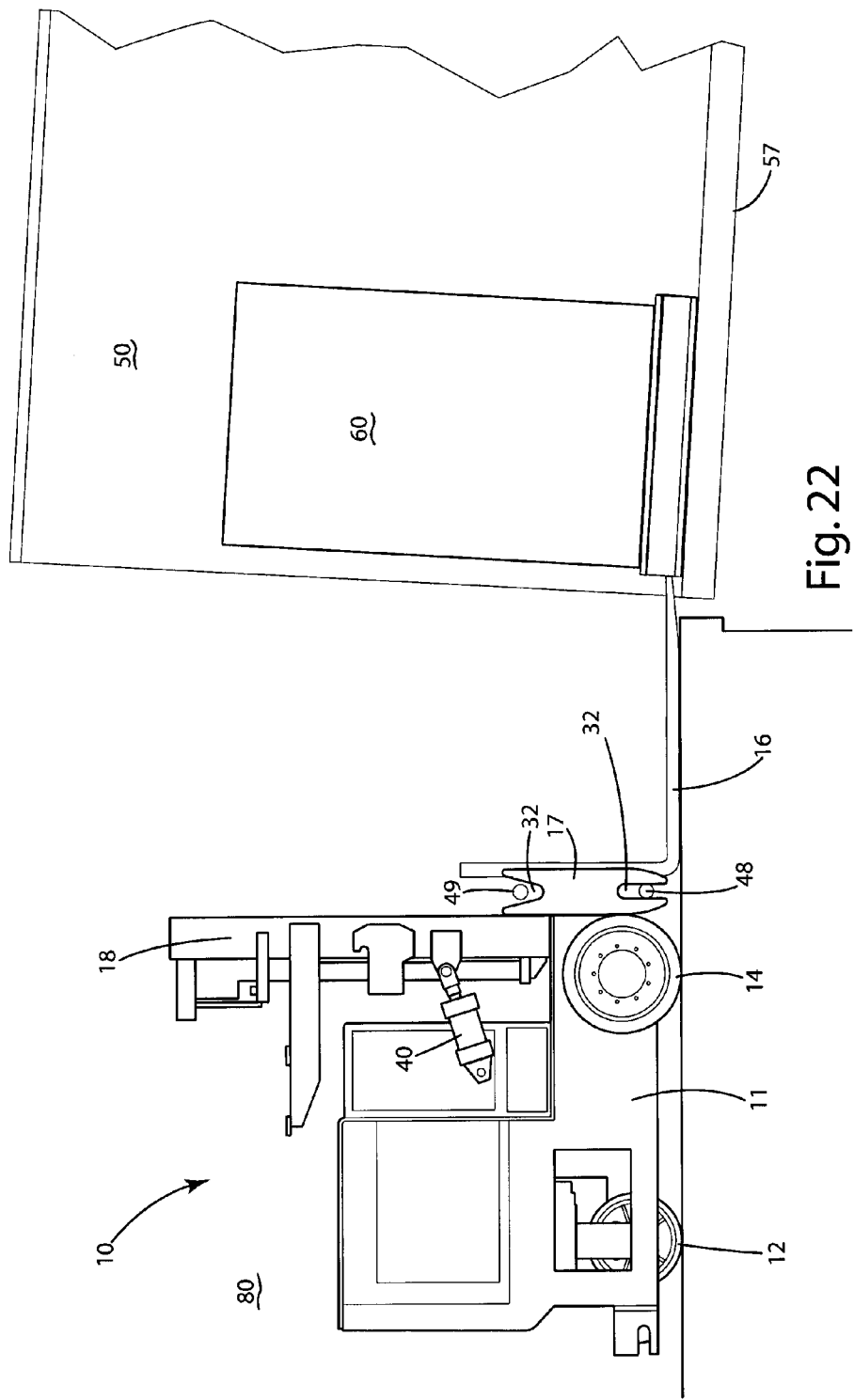
FIG. 22 is a side view of an AGV preparing to pick up a load at the end of the transport.
Figure 23:
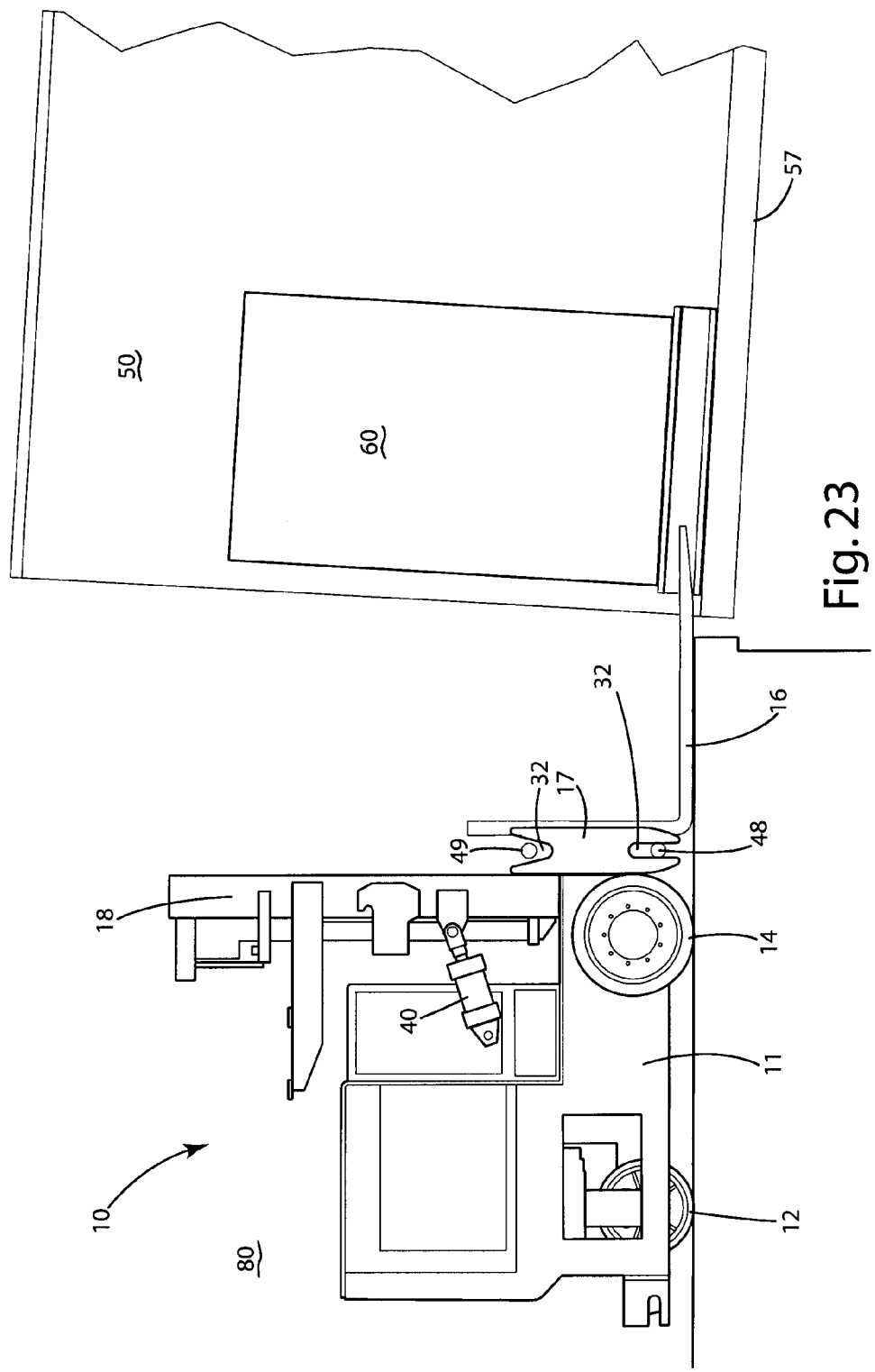
FIG. 23 is a side view illustrating pushing the forks into the pallet pockets.
Figure 24:
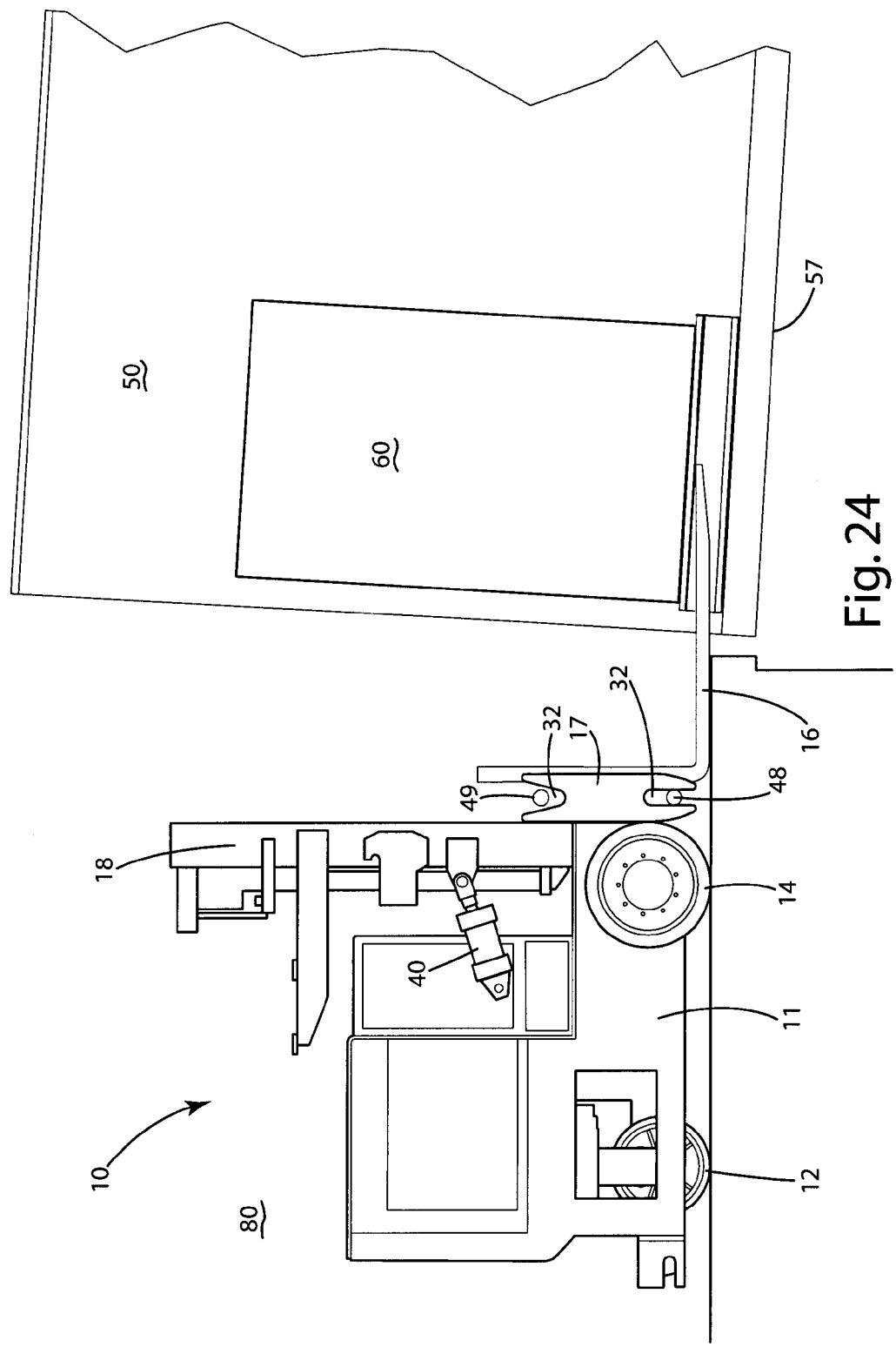
FIG. 24 is a side view illustrating the contact between the forks to the pallet before the floating of the forks.
Figure 25:
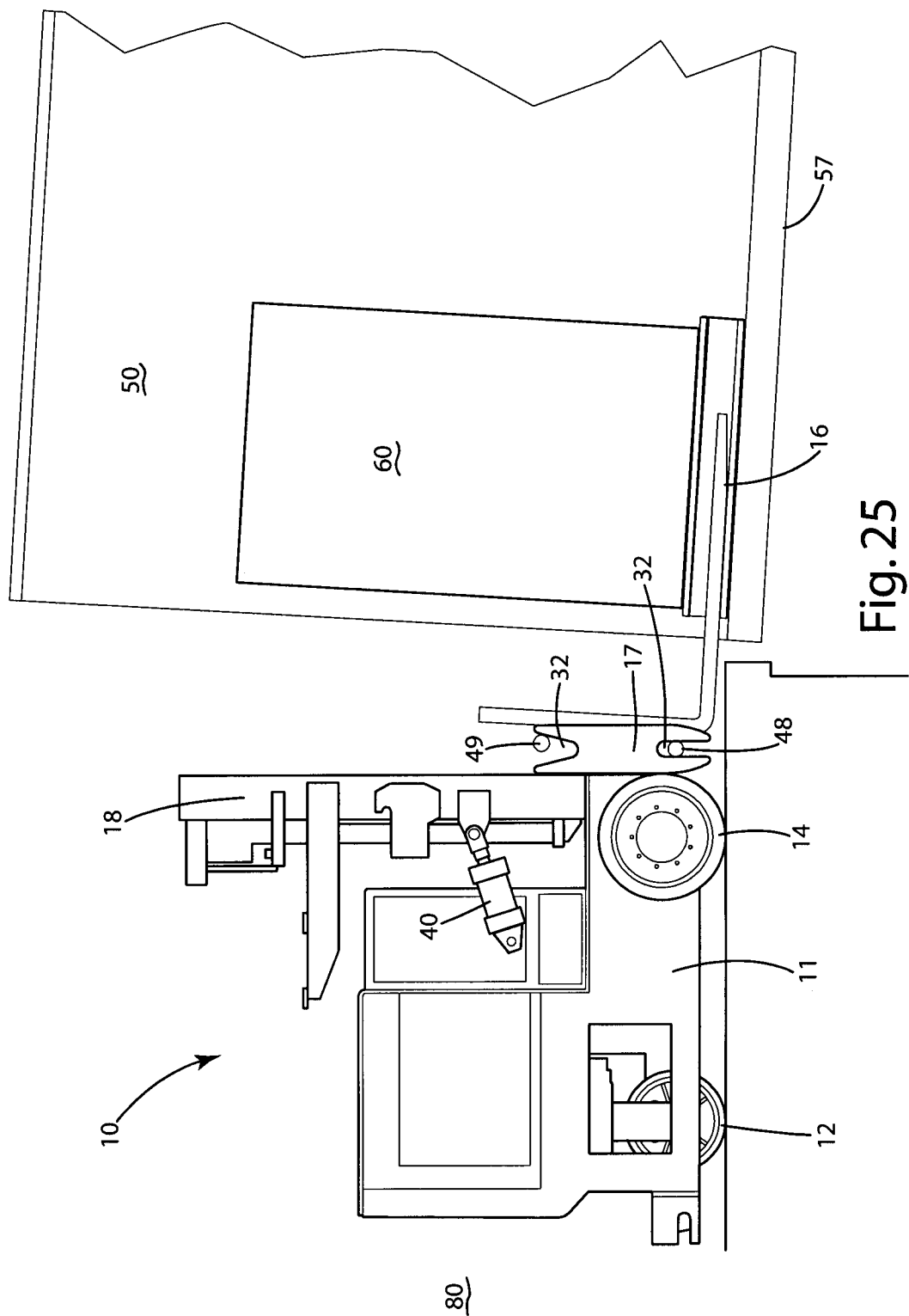
FIG. 25 illustrates the floating forks eliminating the contact of the forks against a pallet as illustrated in FIG. 24.
Figure 26:
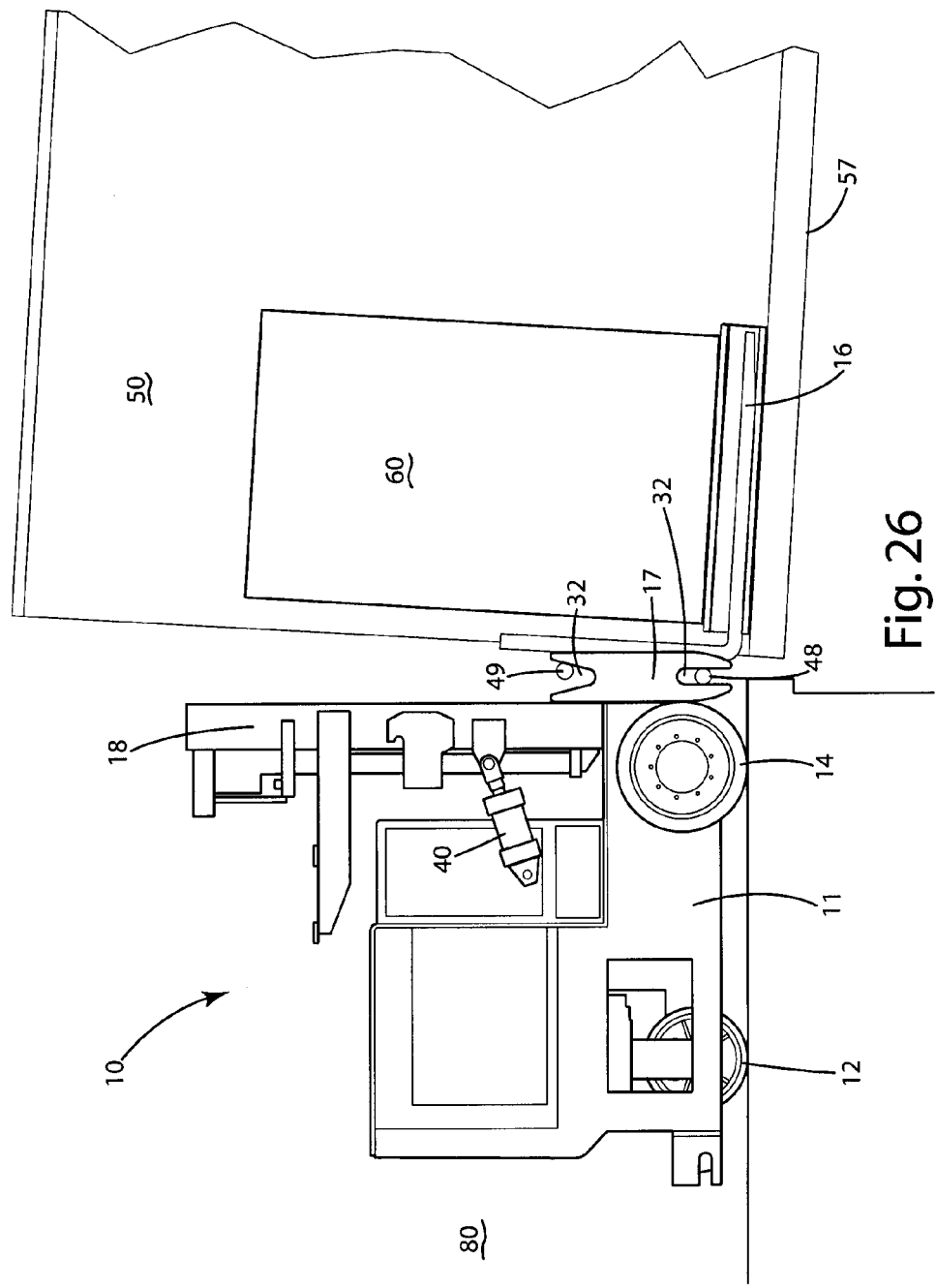
FIG. 26 is a side view illustrating the AGV preparing to lift the load.
Figure 27:
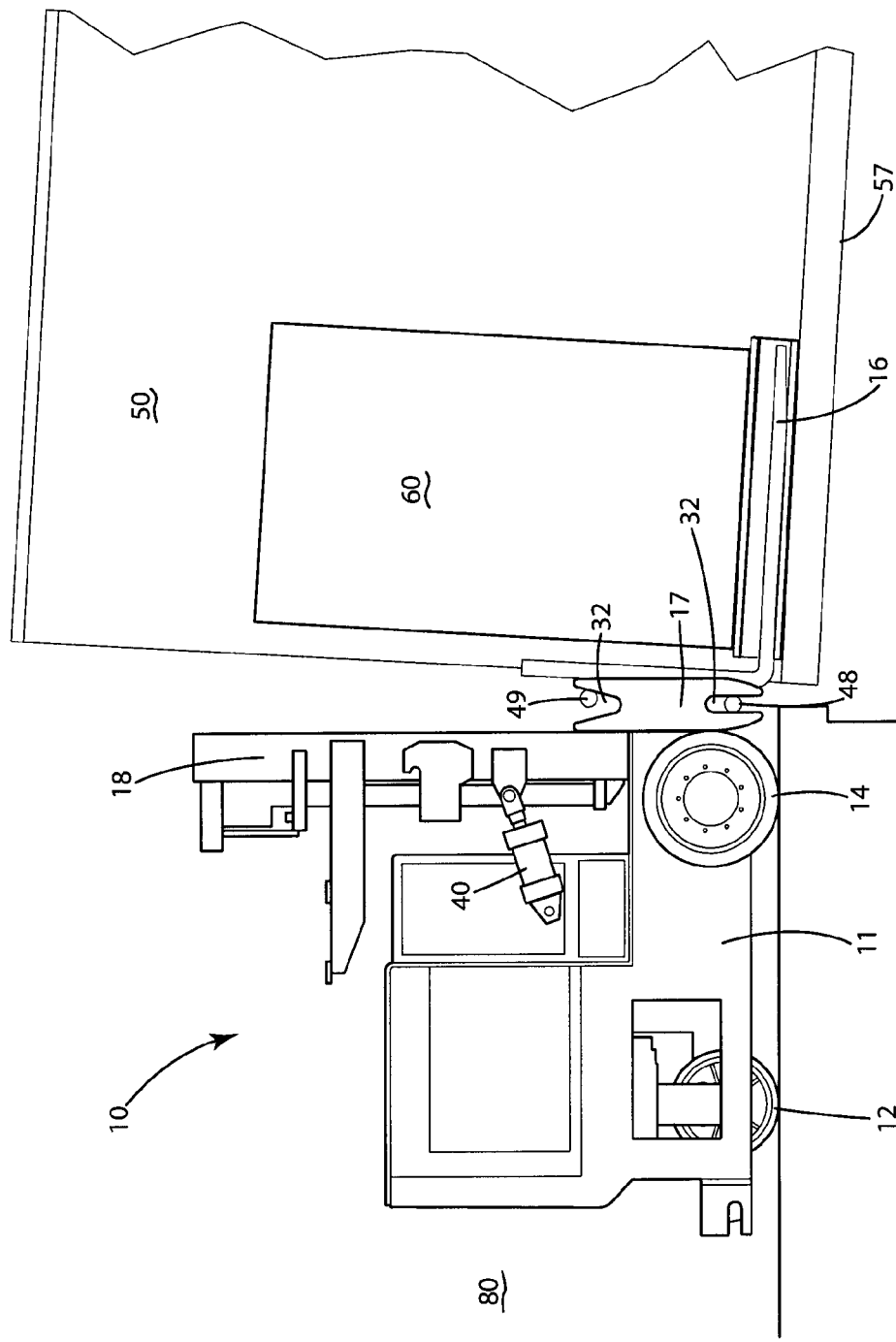
FIG. 27 is a side view of the AGV preparing to lift the load.
Figure 28:
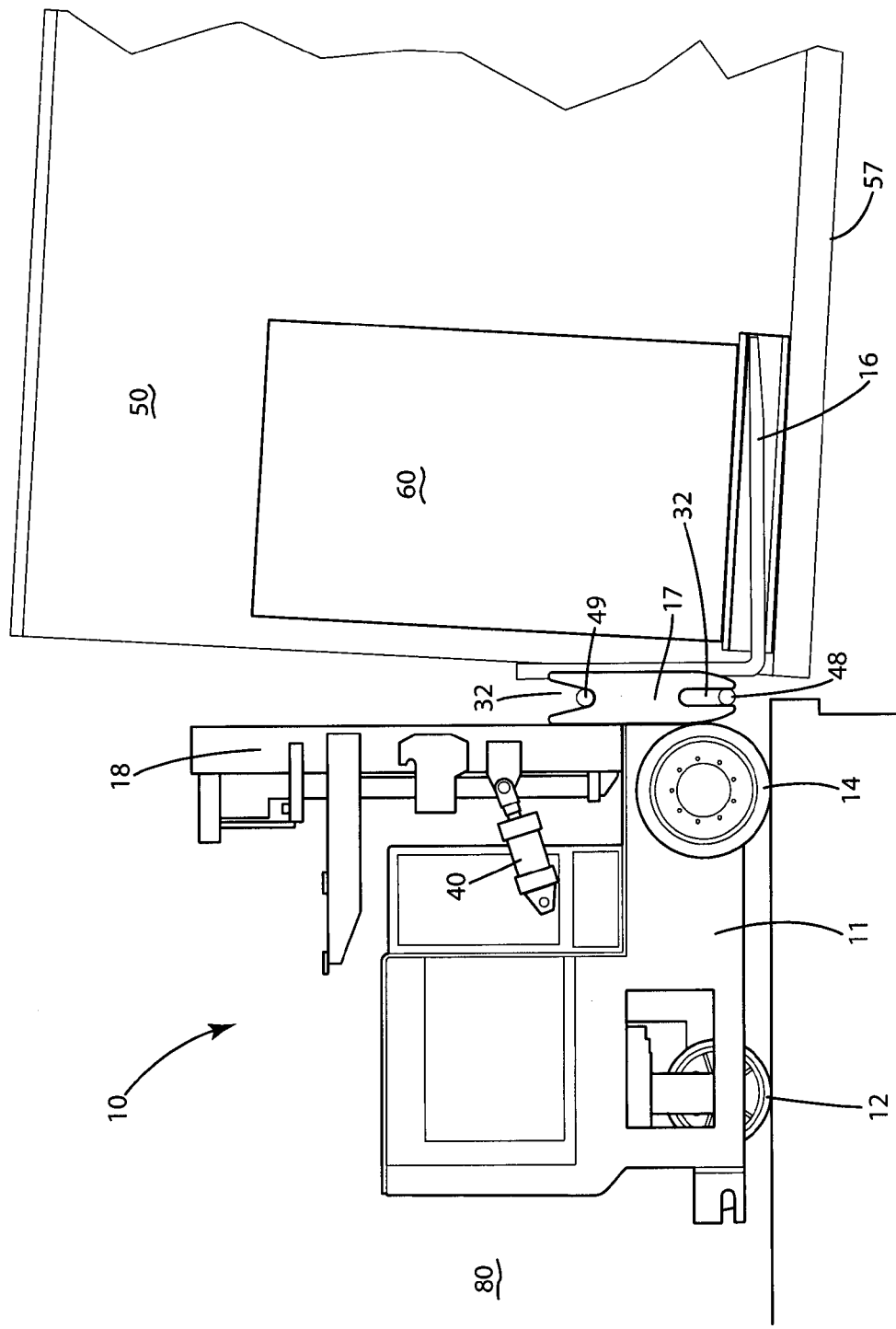
FIG. 28 is a side view of the AGV lifting of the load.
Figure 29:
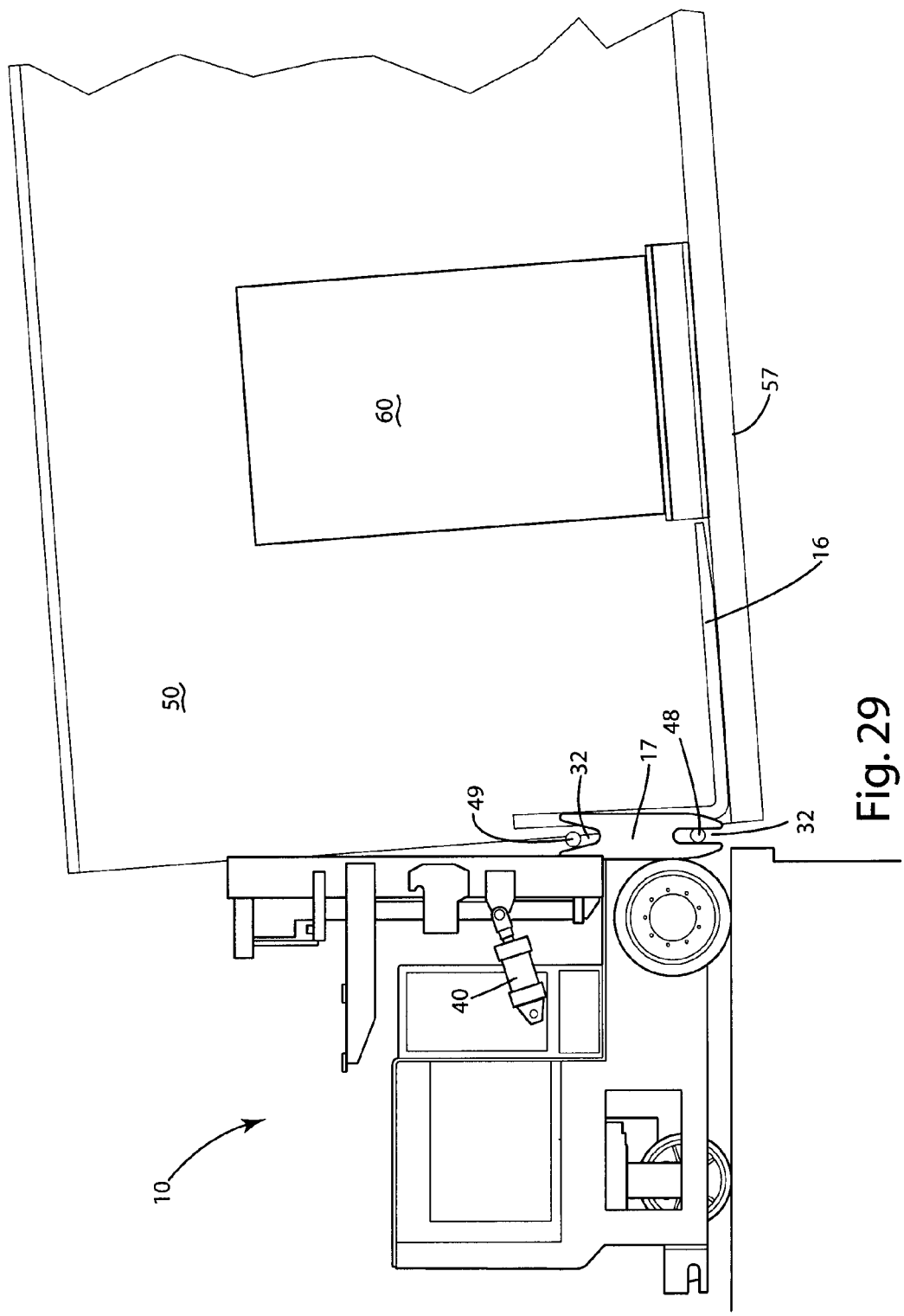
FIG. 29 is a side view of the AGV picking up the second load from the end of the transport.
Figure 30:
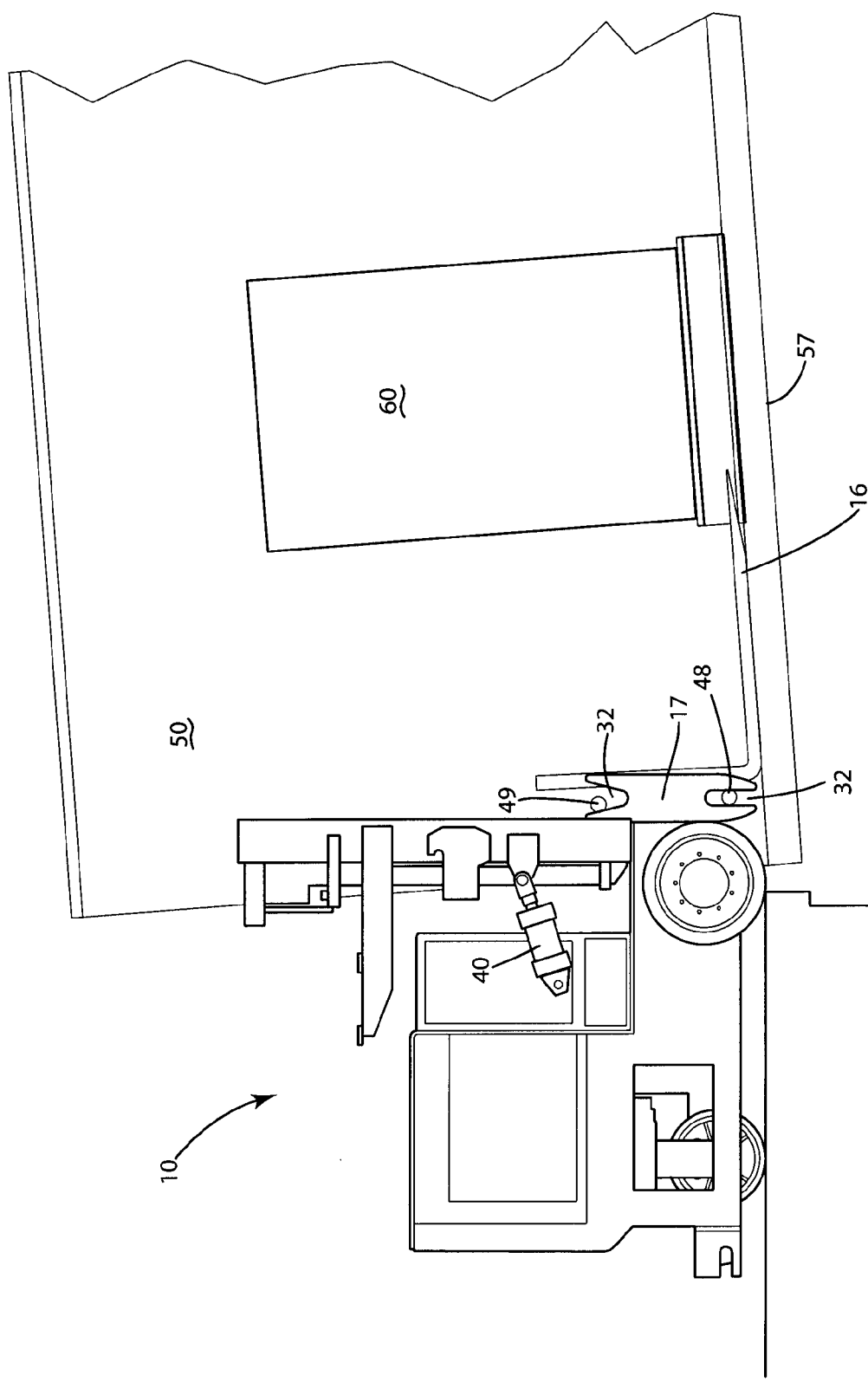
FIG. 30 is a side view of the floating of the forks for insertion into the pallet pockets.
Figure 31:
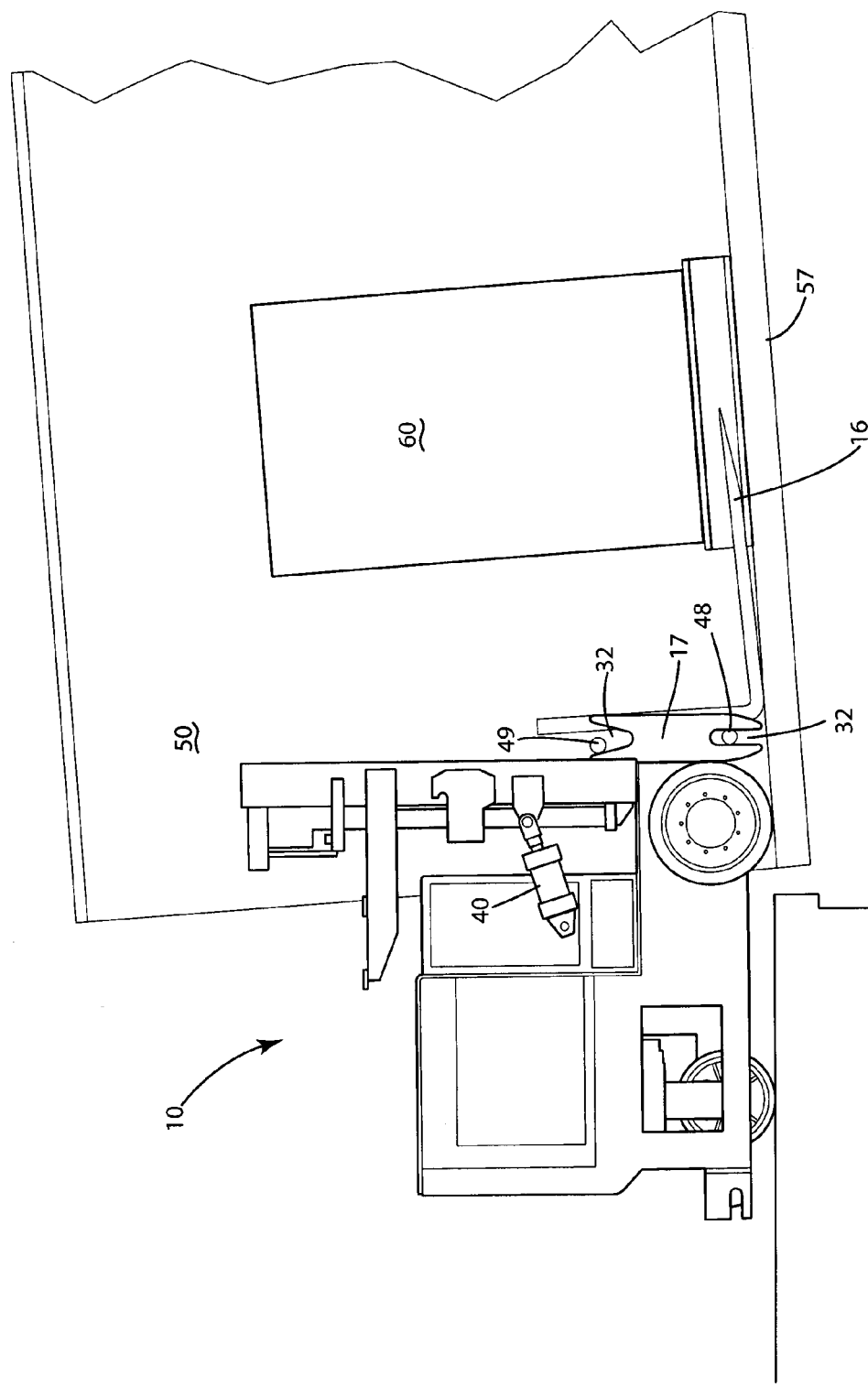
FIG. 31 is a side view of a partial insertion of the forks into the pallet pockets.
Figure 32:
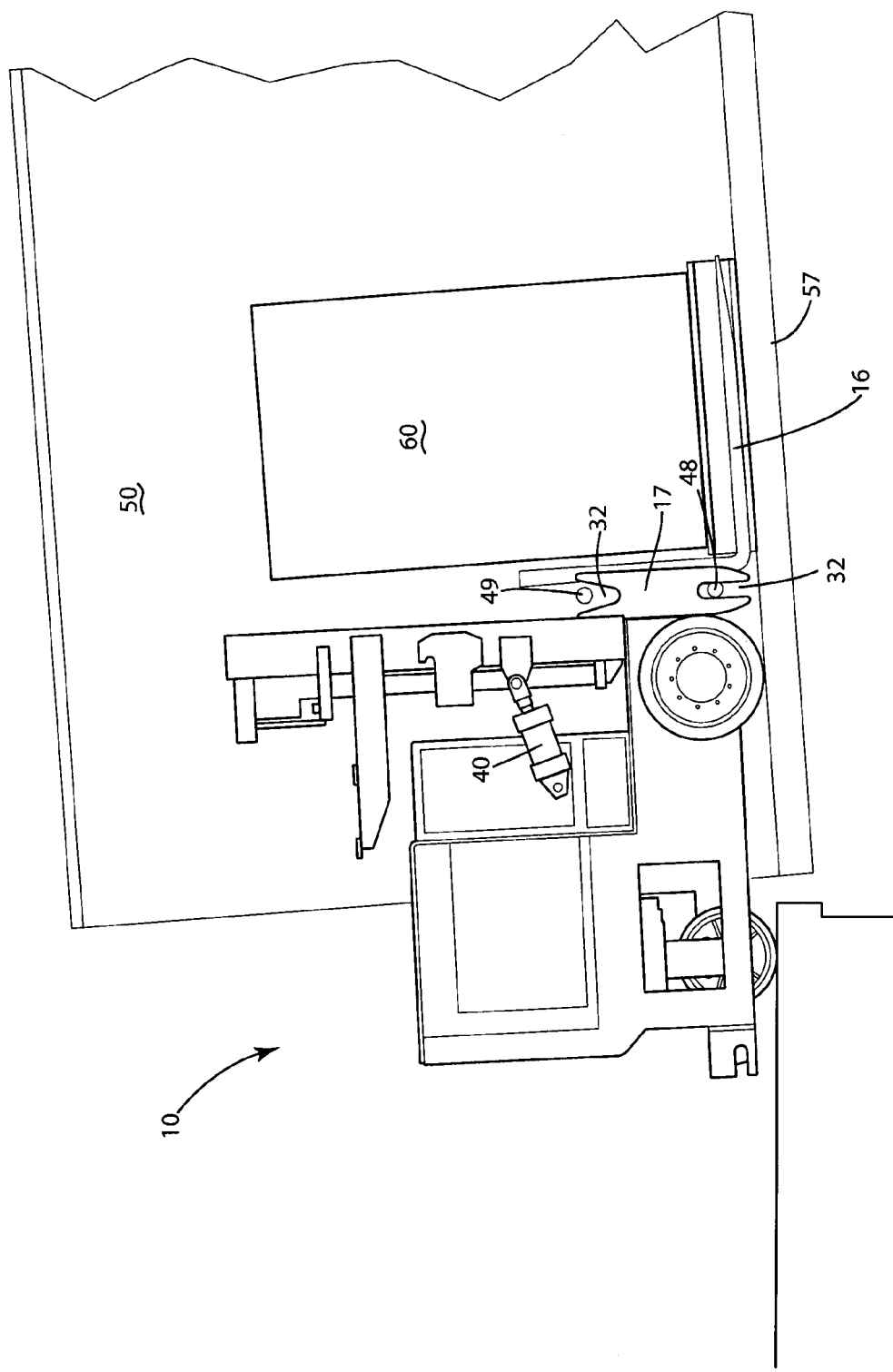
FIG. 32 is a side view of a full insertion of the forks into the pallet pockets.
Figure 33:
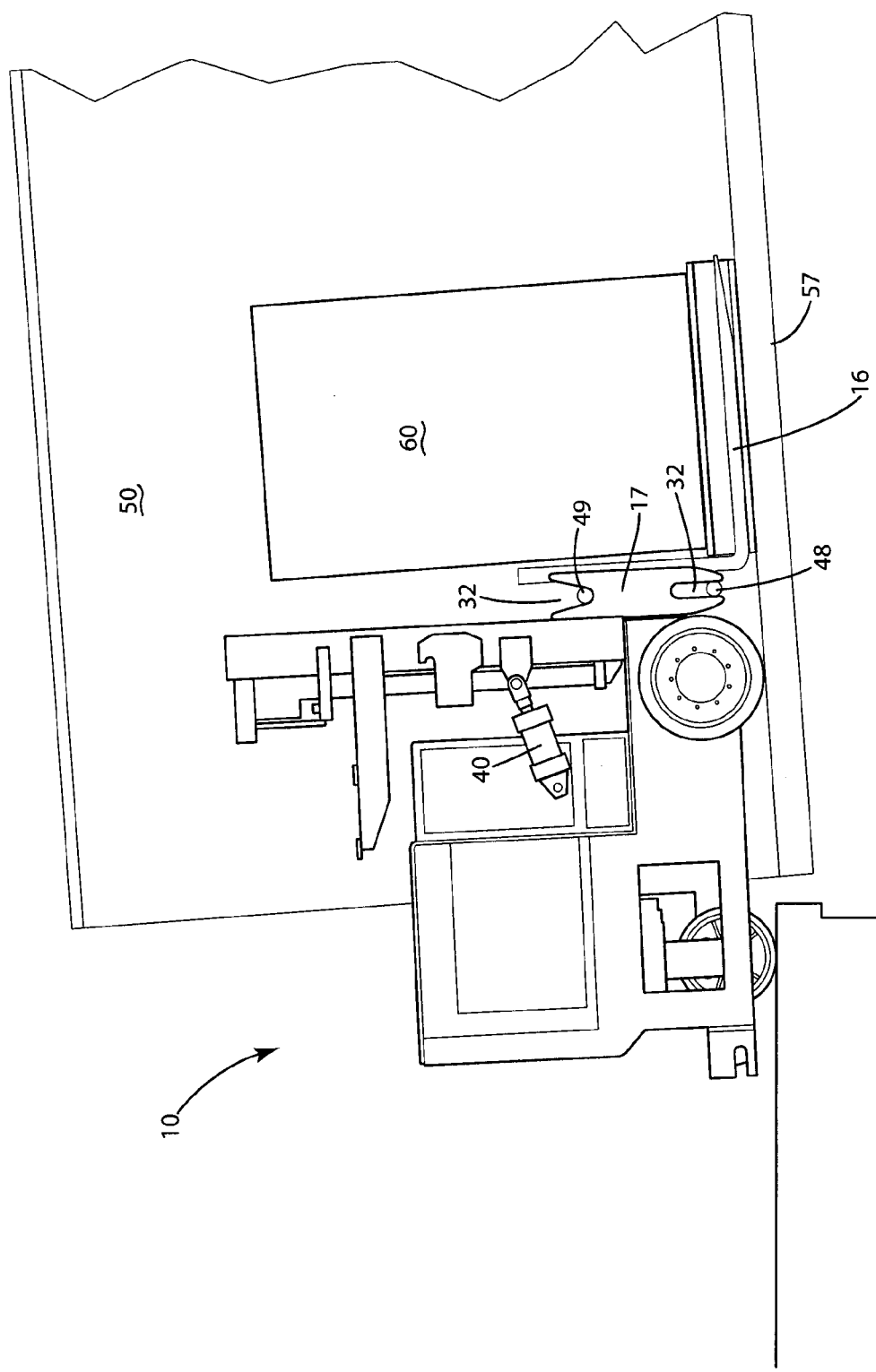
FIG. 33 is a side view of the AGV preparing to lift the load.
Figure 34:
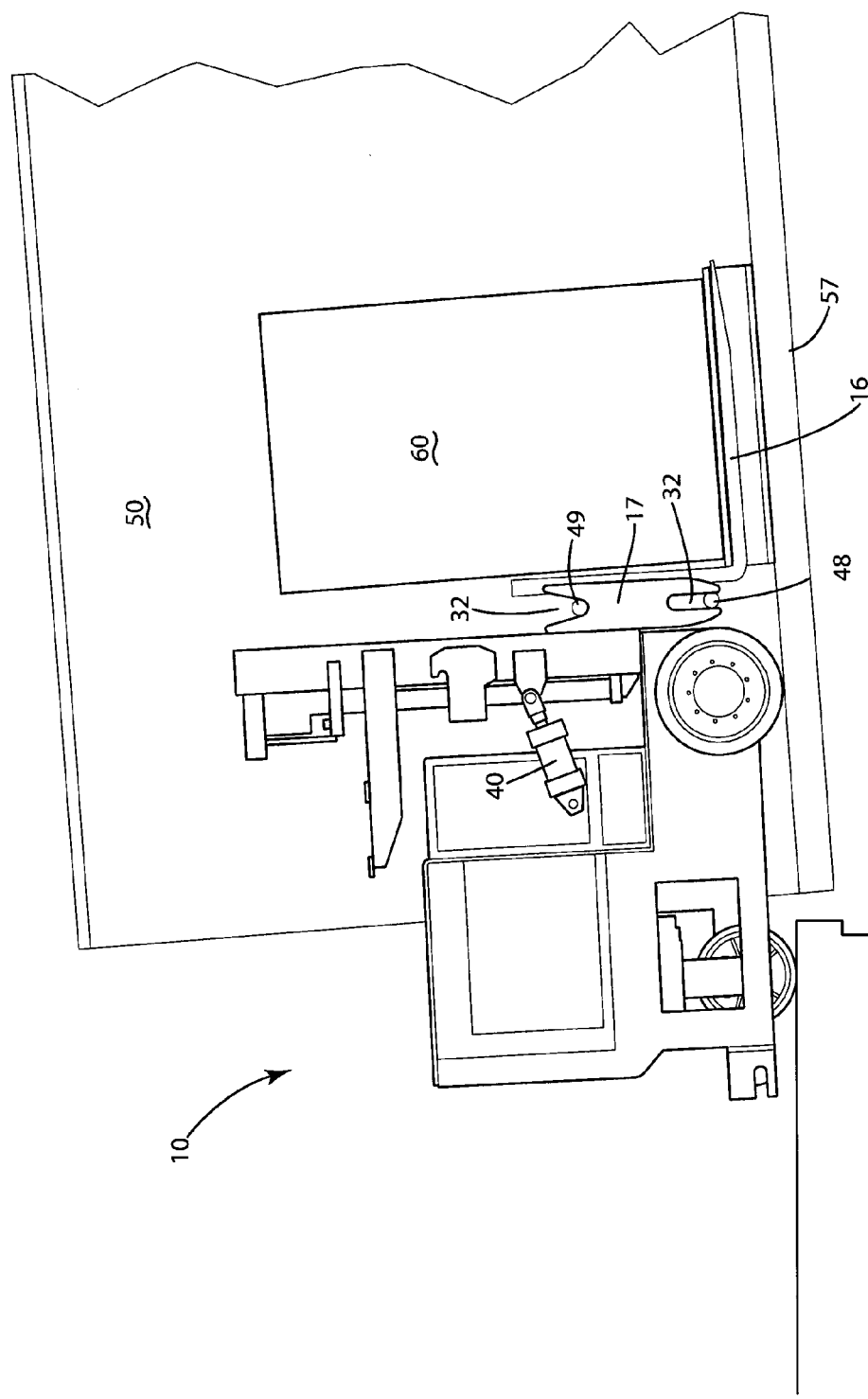
FIG. 34 is a side view of the AGV lifting of the load.
Figure 35:
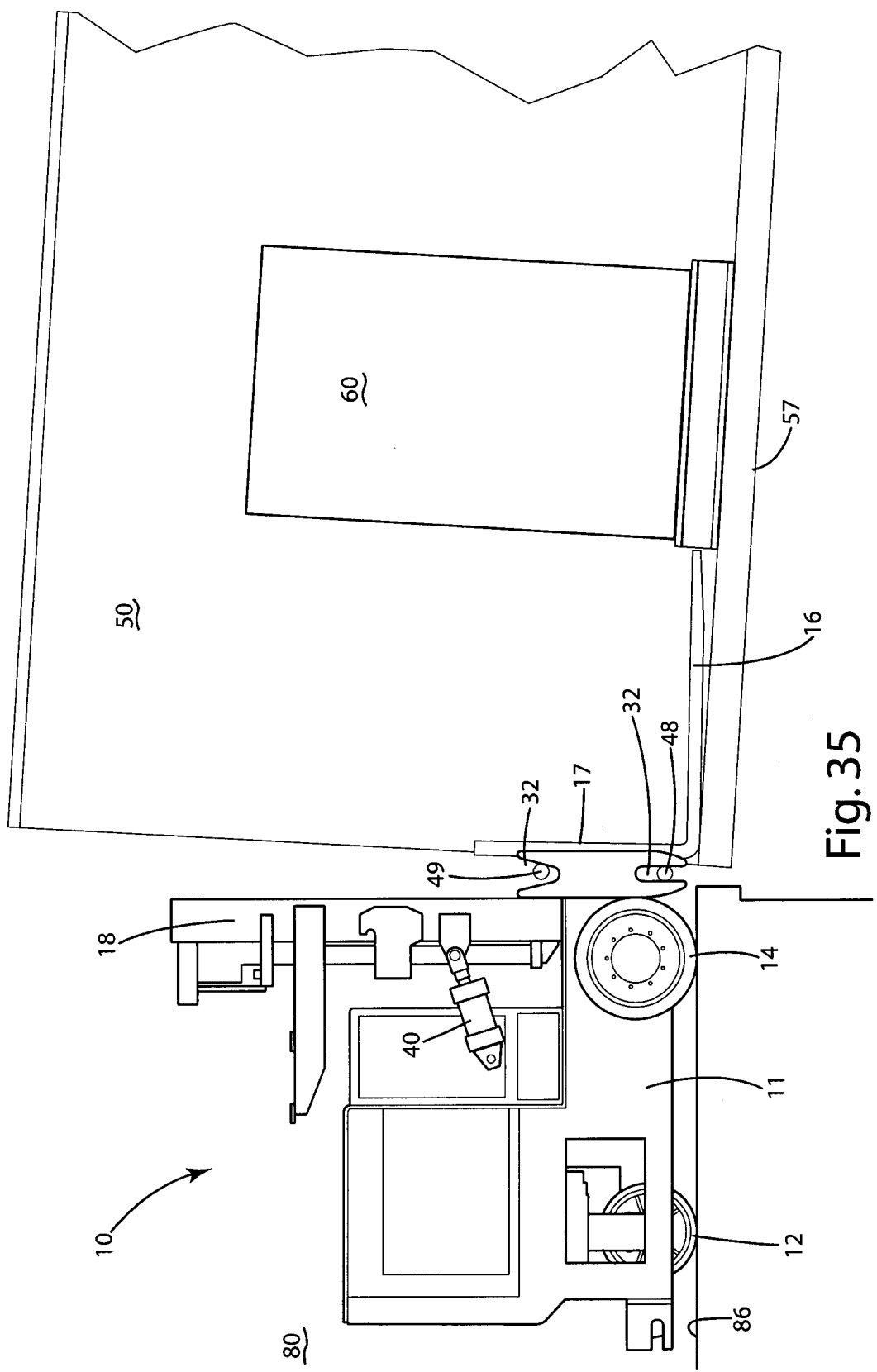
FIG. 35 is a side view of an AGV preparing to pick up the second from the end load.
Figure 36:
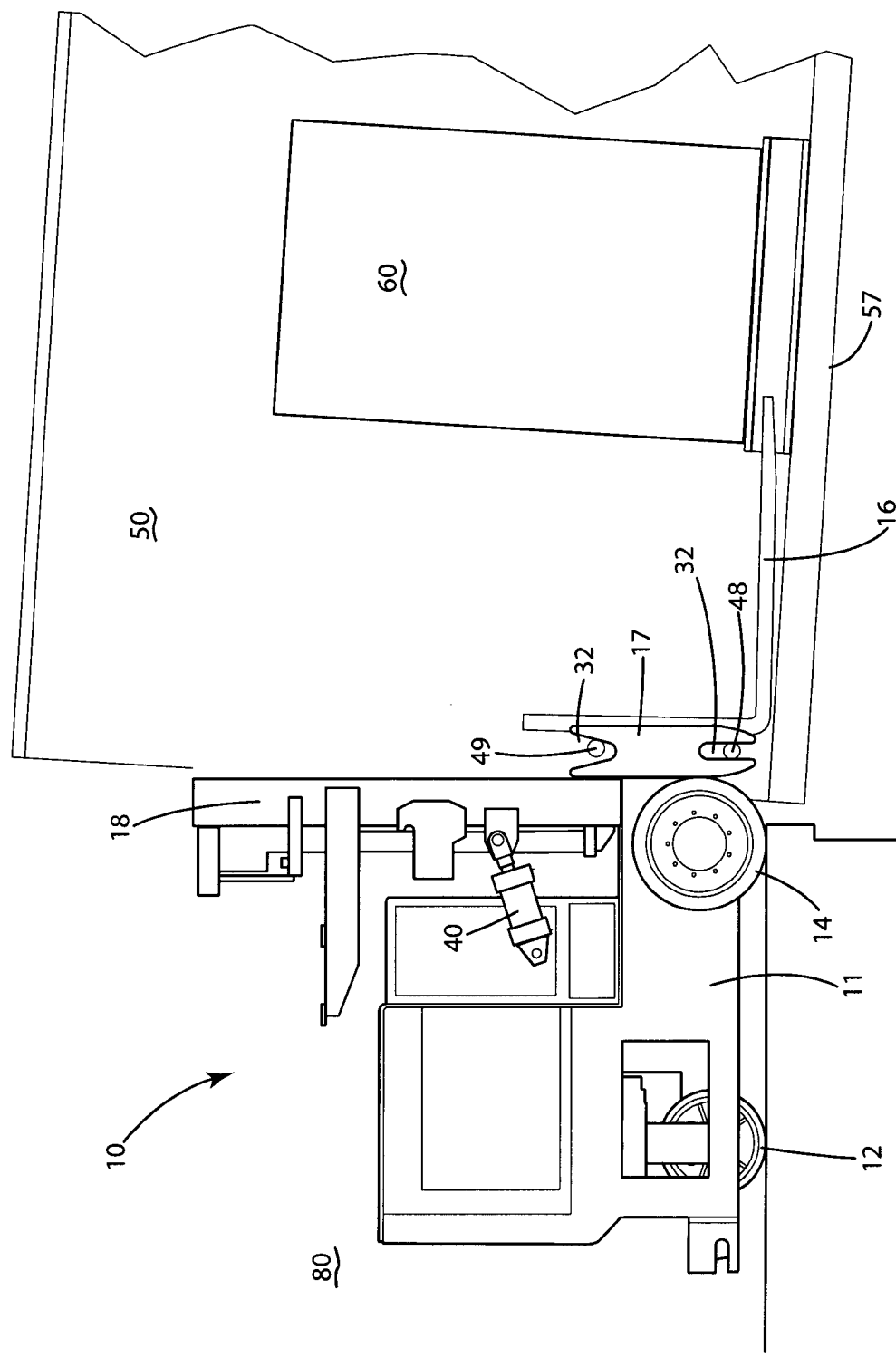
FIG. 36 is a side view of the beginning of insertion into the pallet pockets.
Figure 37:
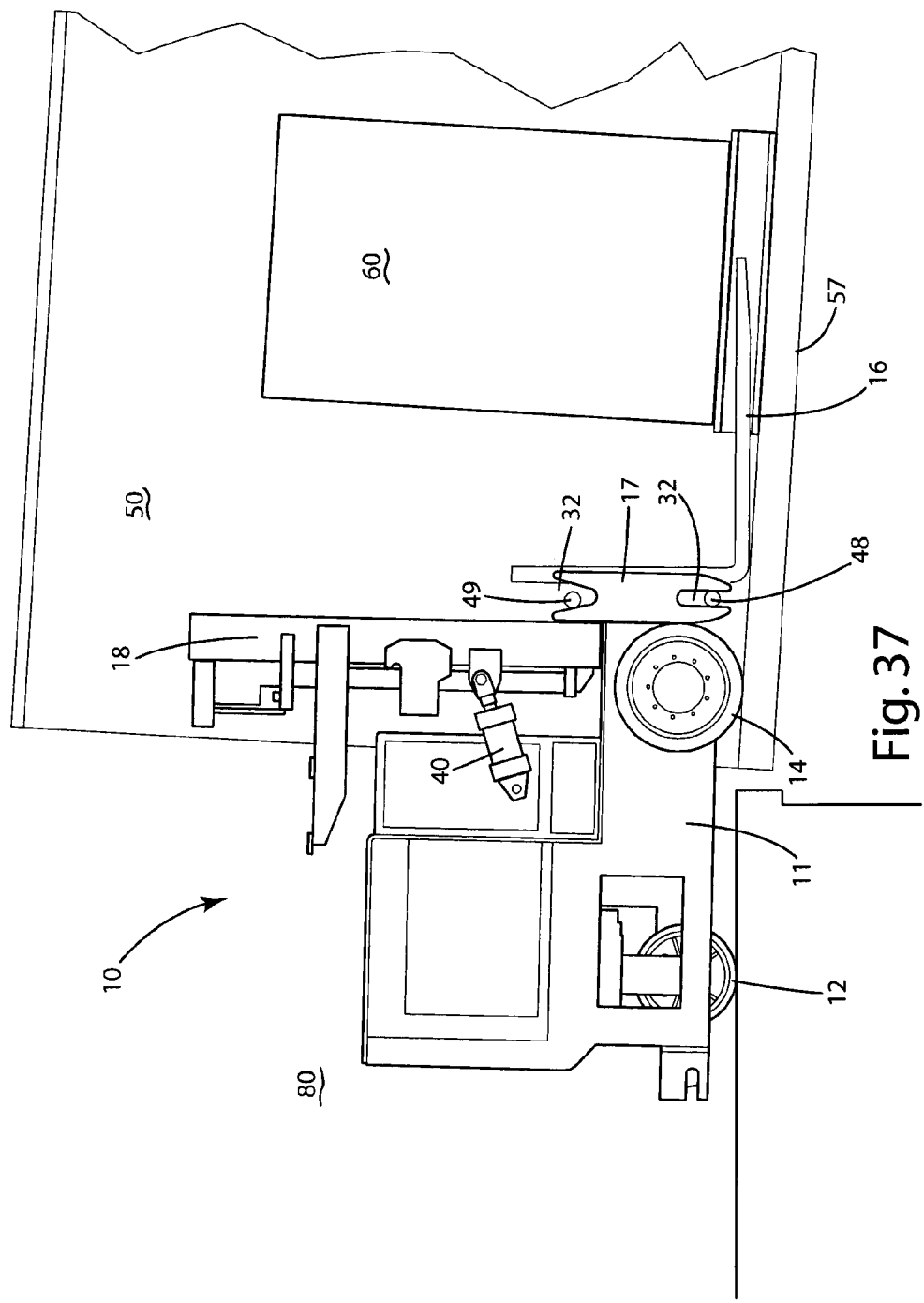
FIG. 37 is a side view of the forks being partially inserted.
Figure 38:
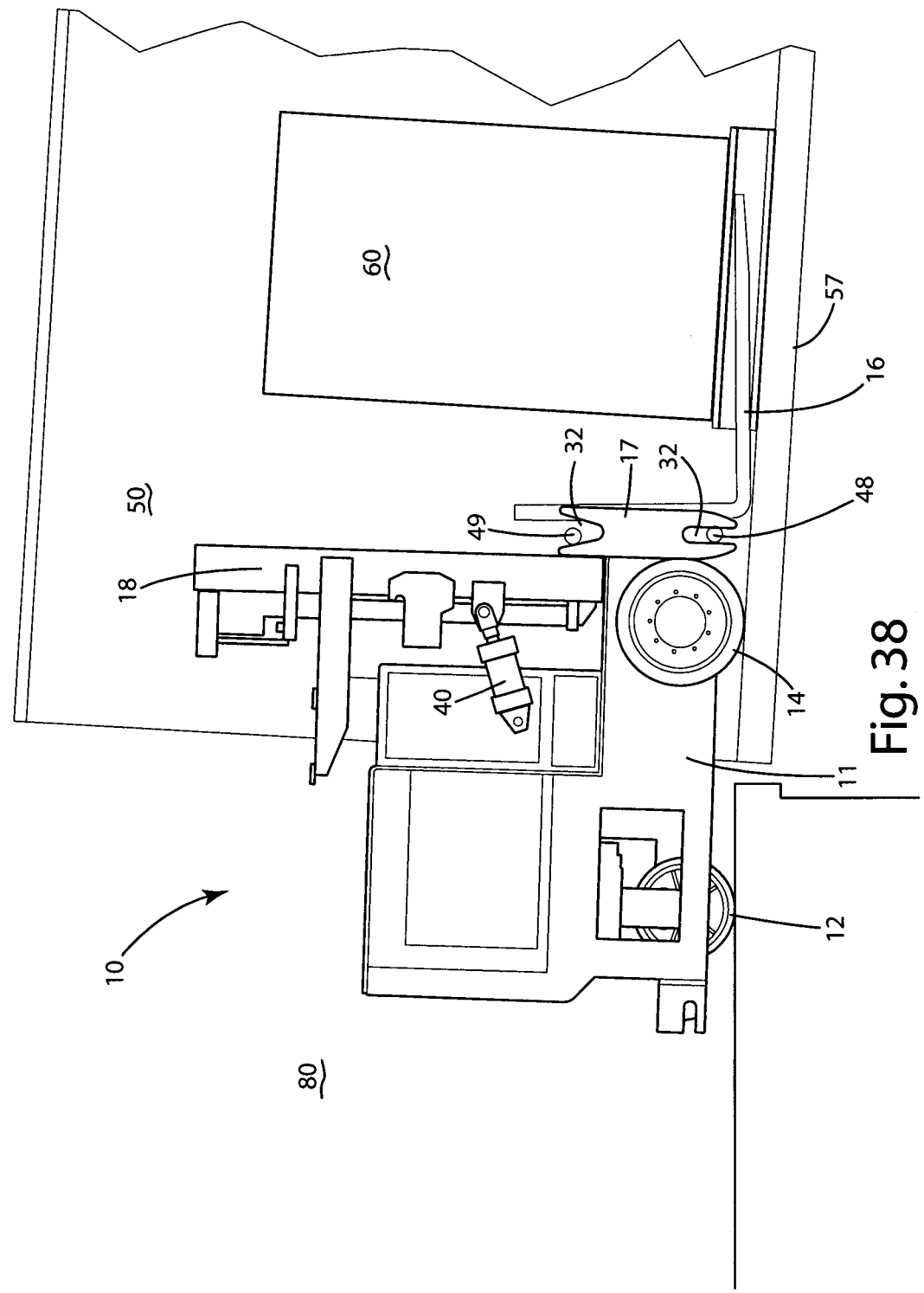
FIG. 38 is a side view of the floating of the forks to continue insertion.
Figure 39:
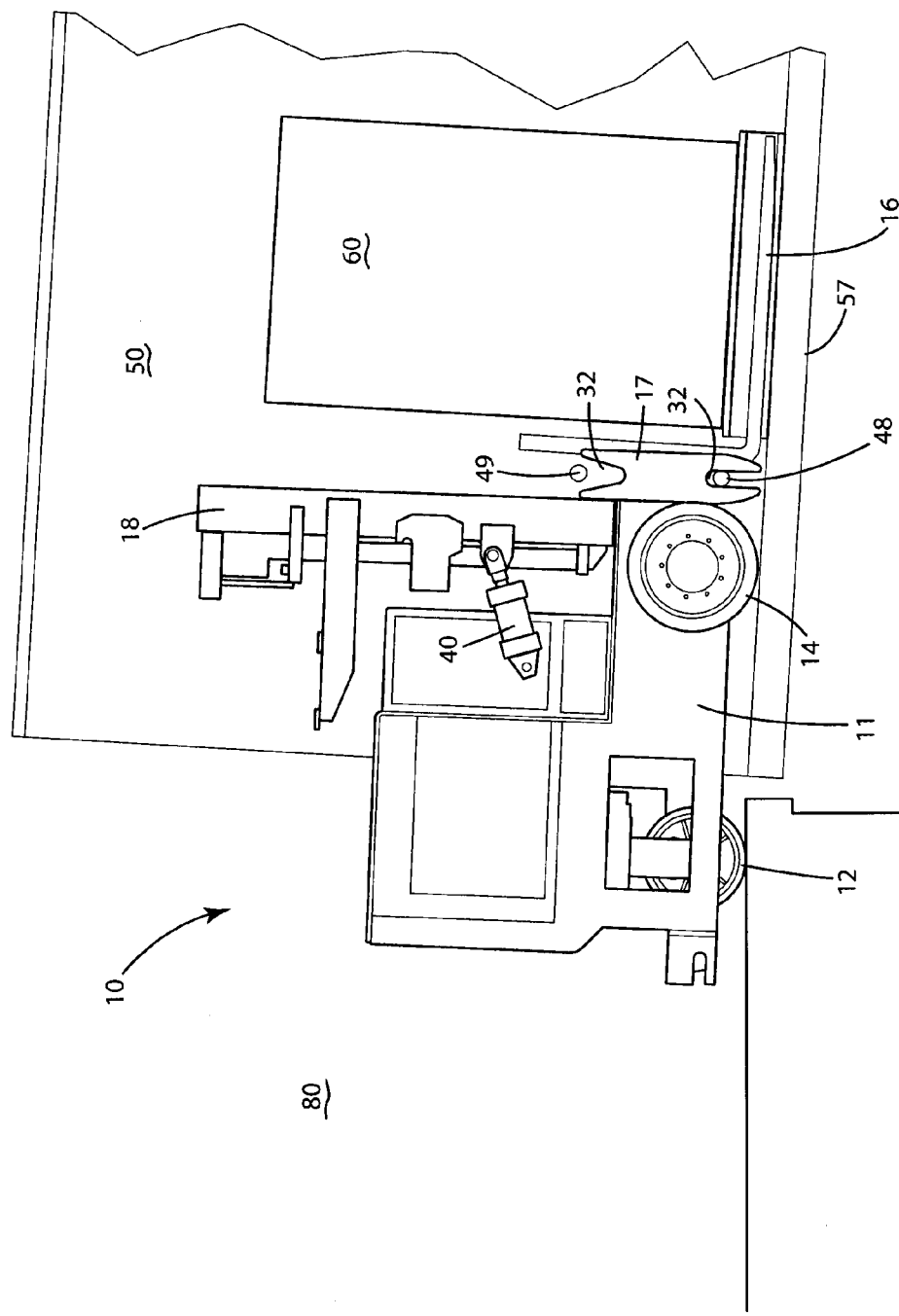
FIG. 39 is a side view of the forks fully inserted into the pallet pockets.
Figure 40:
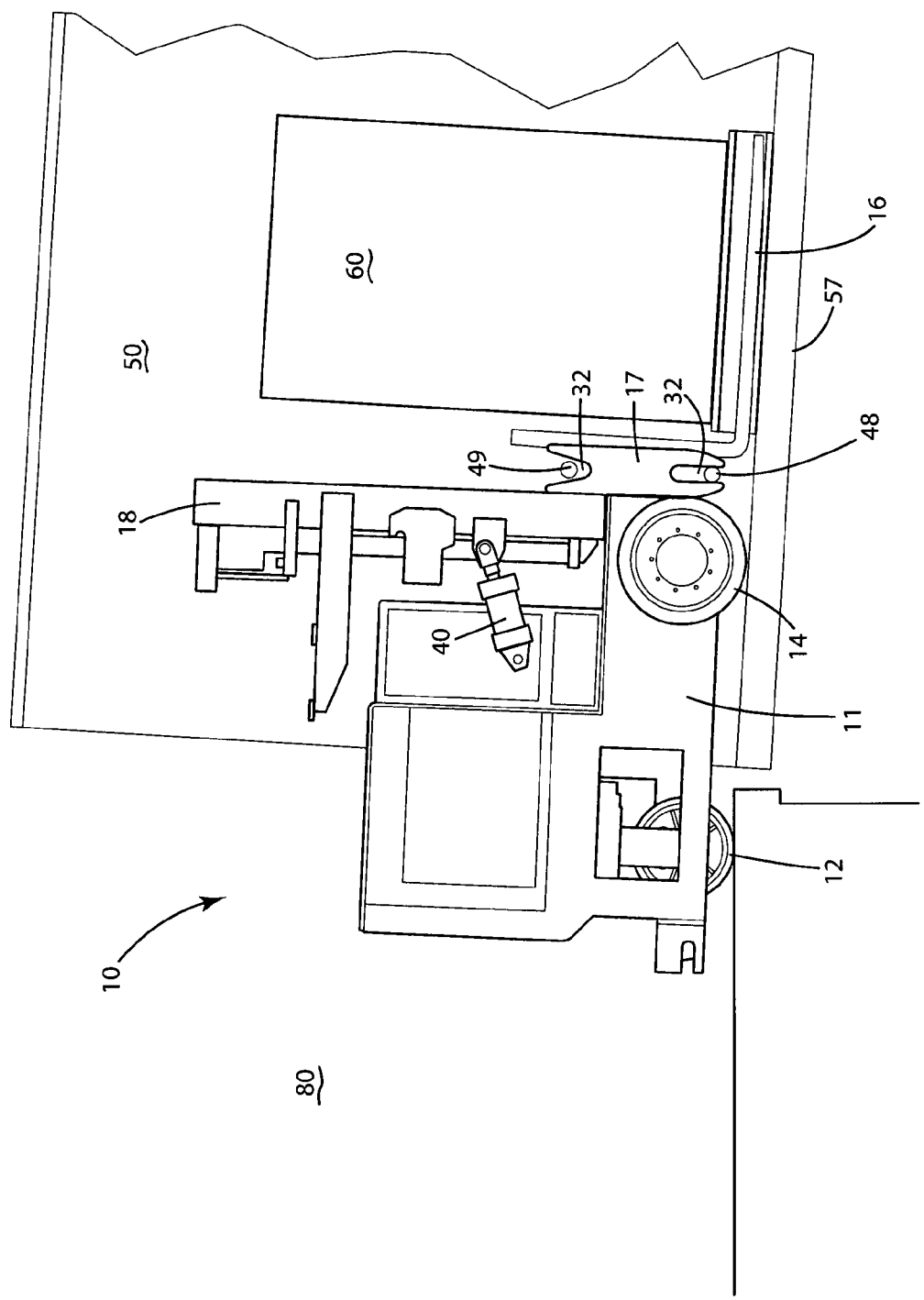
FIG. 40 is a side view of the AGV preparing to lift the load.
Figure 41:
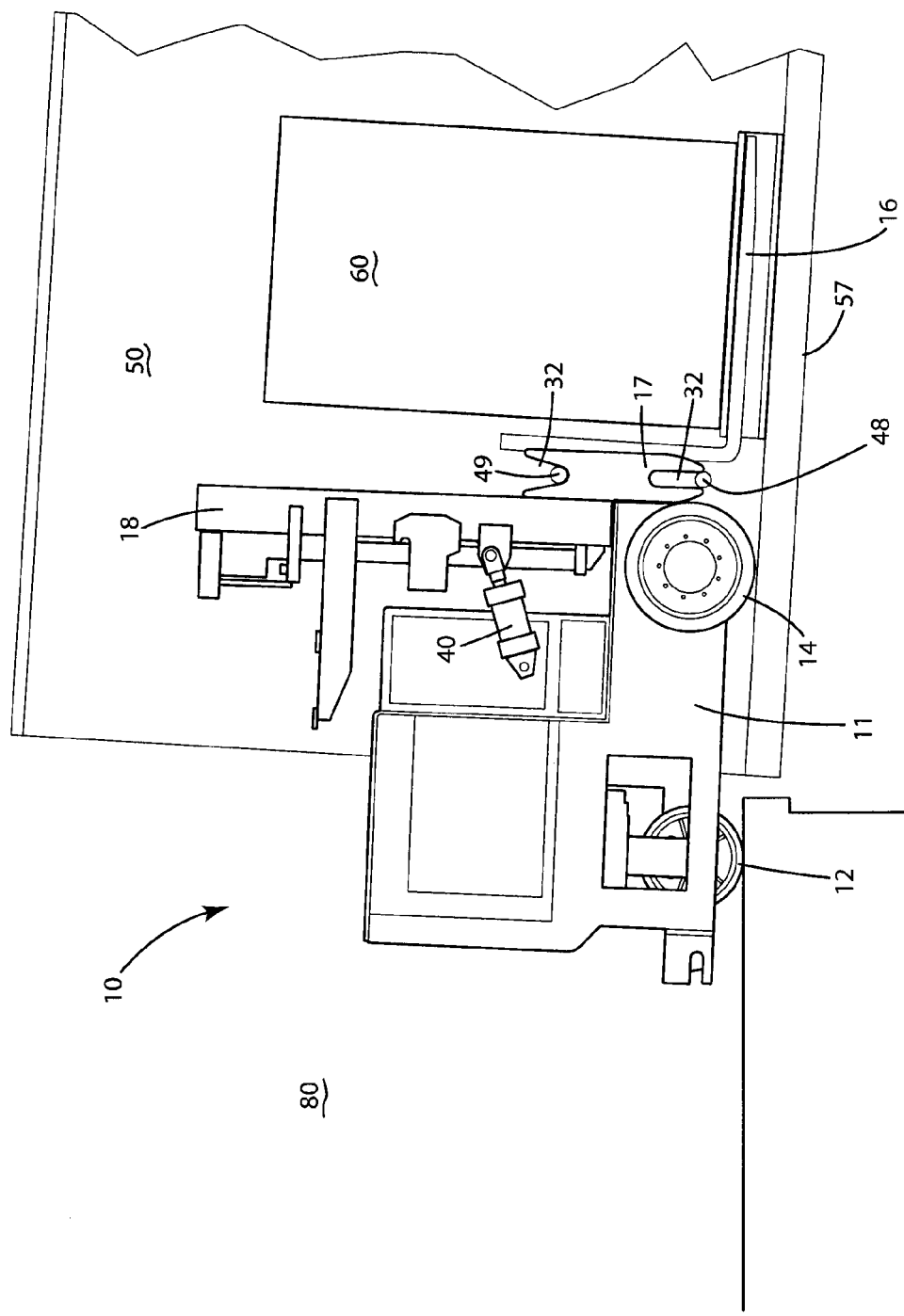
FIG. 41 is a side view of the AGV lifting of the load.
Figure 42:
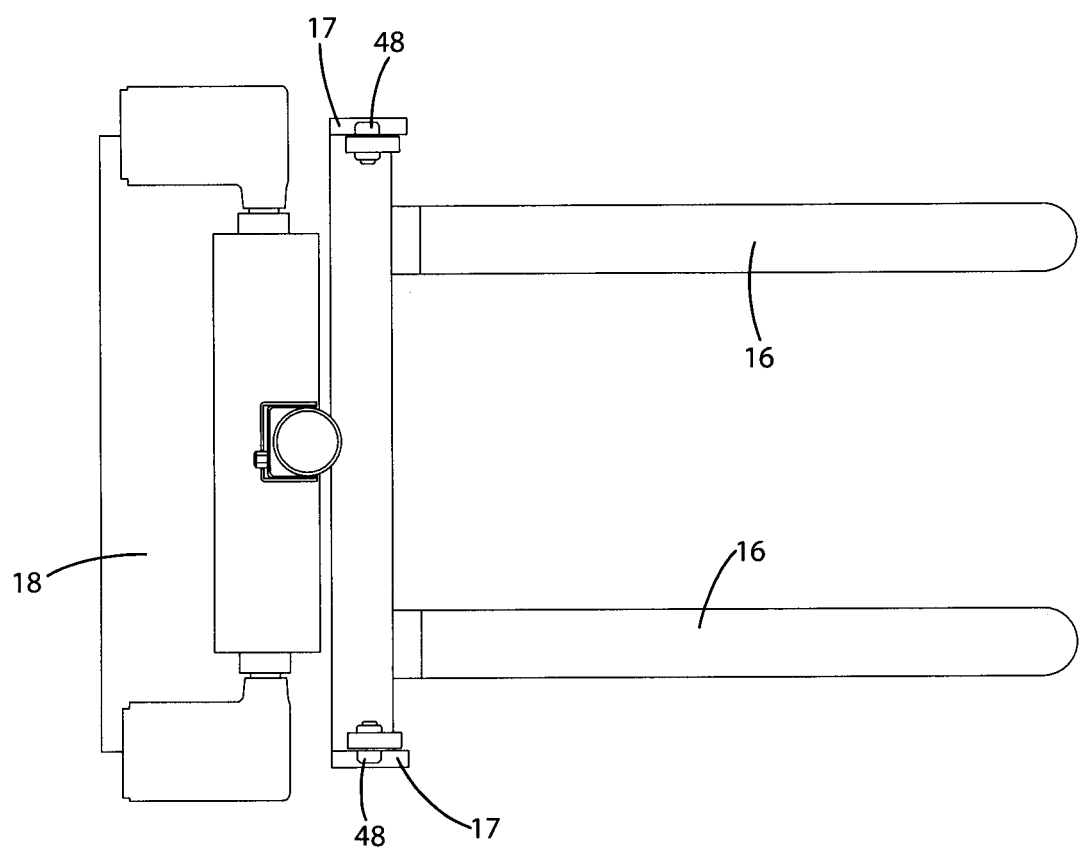
FIG. 42 is a top view of the floating forks, fork carriage, and mast.
Figure 43:
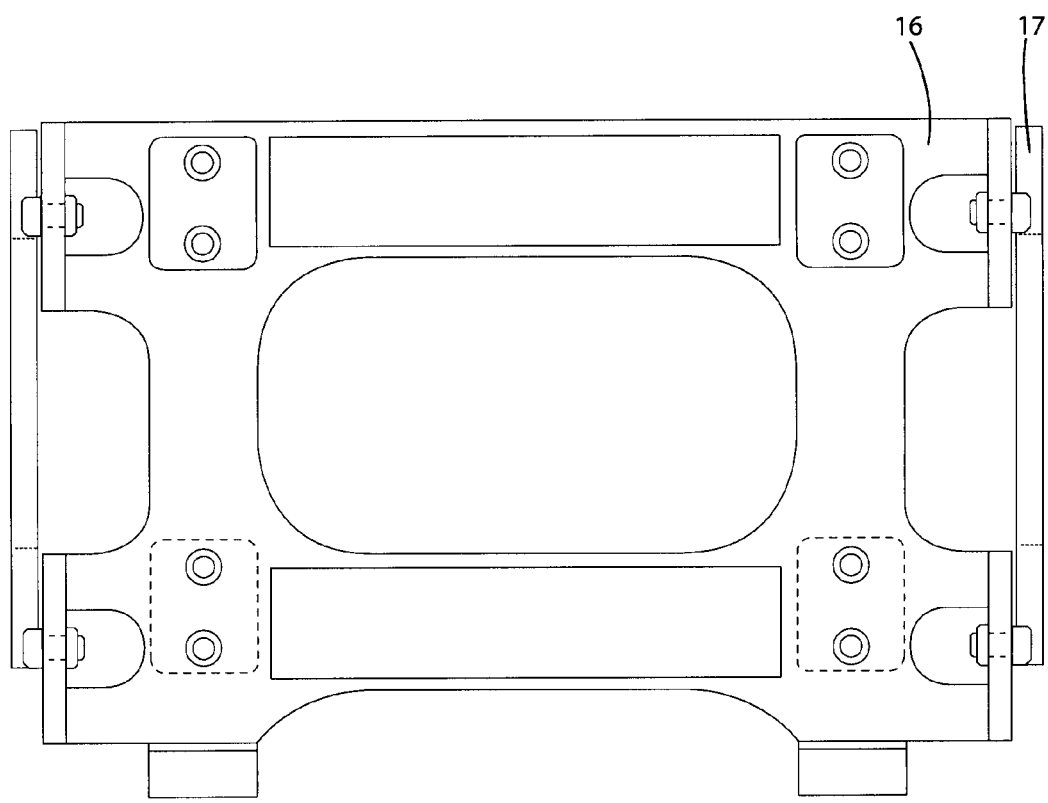
FIG. 43 is a front view of the fork carriage and partial view of the forks.

The AGV 10 may use a single sensor 100 or multiple sensors to create a data profile of the interior of the transport 50 from outside the transport 50. In this alternative embodiment, the data profile of the transport 50 is created before the majority of the AGV 10 enters the cavity formed by the transport 50 into which the loads 60 will be placed and more particularly before the load 60 enters the transport 50. Creating a data profile of the transport 50 to identify deviations from the expected placement, such as lateral displacement, skewing of the transport 50, vertical displacement, and the angle of the transport floor 57, allows the AGV 10 to easily maneuver to the best path for placement of the load 60 within the transport 50, before the AGV 10 enters the transport 50. More specifically, due to operator error, transports 50 or in particular, semi-trailers into which loads 60 are placed are typically misaligned from an optimal position when backed up to a loading area 80, and are almost never aligned exactly the same in lateral offset or skew. Loading areas or docks 80 include bay openings 82 defined by the loading dock walls 83, which are wider than the transport width to allow for this operator error. However, this allowed operator error can cause problems for AGVs 10 in systems that use loads 60 that substantially fill the width of the transport 50, as illustrated in FIG. 4e. The vertical displacement of the transport 50 relative to the loading facility floor 85 may also cause problems with tall loads for the AGV 10. The vertical displacement as well as the angle of the transport floor 57, relative to the supporting surface of the AGV, may also cause problems for the AGV with placing the loads near the threshold 52 of the transport 50. Therefore, the AGV 10 may use the sensor 100 to create a profile of the transport 50 before the loads 60 enter the transport, allowing the AGV 10 to enter the transport 50 without contacting the load against the side walls 54, even when the transport 50 is laterally displaced from the expected position, as illustrated in FIG. 8. As illustrated in FIG. 8, if the operator properly aligned the transport 50 the longitudinal axis 51 of the transport 50 would be aligned with the expected longitudinal axis 84. However, in FIG. 8, not only is the transport 50 displaced laterally from the expected longitudinal axis 84 at the opening 52 or threshold of the transport but also is skewed at an angle from the expected longitudinal axis 84. As illustrated in FIGS. 9-11, the transport may also be vertically displaced or be angled relative to the loading facility floor 85 or dock ramp 86.

The use of a sensor 100 to create a transport path for the primary guidance system to follow eliminates the need for a second guidance system in the preferred embodiment, but in some instances, a second guidance system will be used. The AGV 10 uses, in the preferred embodiment, the same navigation system to navigate to position A as well as to navigate along the transport path. As stated above, this guidance system may be any known system, such as inertial guidance, wire guidance, visual guidance, tape guidance, laser target guidance, or laser guidance, including laser guidance. However, if a wire guidance system, tape guidance, or laser target guidance is used, an inertial guidance system, dead reckoning guidance system, visual guidance system, or laser guidance system may also be included for travel in the transport. As previously described, the AGV 10 will use the primary guidance system to operate as desired in obtaining loads 60 and then guiding the AGV to a point such as illustrated position A in FIG. 8 outside of the transport 50.

For example, to allow enough maneuvering room for the AGV to align itself with a desired travel path into the transport 50 before the loads 60 cross the opening 52 or threshold of the transport 50 while optimizing the sensor position, if the loads 60 have an approximate depth of three feet and the average maneuvering space needed by the AGV 10 to properly align itself with the transport 50 is approximately three feet, the expected stop position outside of the transport 50 would be approximately six feet or slightly greater from the threshold 52. If the sensor 100 is not located on the AGV, it may be preferable to locate position A at a greater distance from the threshold to allow more room for maneuvering, which then typically allows higher speeds, as the AGV has an easier time adjusting its position and travel path to match the desired transport path before the load 60 enters the transport 50 and therefore reduces loading time.

If the AGV 10 does not have in the onboard controller or a central controller directing the AGV information regarding the transport 50 orientation as it fits within the overall system in which the AGV 10 operates, or a desired calculated transport path, the AGV 10 will create an image, map, or other data profile on the trailer from which the orientation of the transport 50 may be determined. Of importance in determining the orientation of the transport 50 is how much the opening 52, in particular the side walls 54 on each side of the opening 52, are offset from the expected position (typically the center of the loading bay 84), or more particularly, the location of the side walls 54 so that the entering load 60 does not contact the side walls 54, as well as the angle or skew of the trailer as also determined by the side walls 54. Although not required, the sensor 100 may also be used to determine the position of the end wall 56 when loading an empty transport, or if the transport arrives partially full, the distance to any pallets or loads in the transport. The position of the end wall 56 or any existing loads allows the AGV 10 or system controller to calculate how far the AGV 10 must travel into the trailer to place the first load 60. Calculation of the length of the transport path allows the AGV to travel further into the trailer before the load is lowered and then pushed to a final position in the preferred embodiment. By minimizing the pushing distance of loads in the transport, the battery charge on the AGV 10 will last longer before requiring a recharge. However, other optional methods may be used to determine how far into the trailer the AGV must travel when placing the load 60 such as the AGV 10 knowing the approximate length of the trailer and traveling.

In determining a transport path for the AGV 10 into the transport, the AGV 10 typically gathers a data profile of the transport and then analyzes the side walls 54 to determine a travel line approximately along the actual longitudinal axis of the transport. More specifically, typically the AGV 10 approaches the loading bay 82 to a position along the expected longitudinal axis 84. The laser sensor 100 then images the transport 50 to create a data profile to determine an expected travel path which is typically along the actual longitudinal axis 51 of the transport 50. This actual longitudinal axis is typically calculated by mathematically averaging the side walls 54 of the transport to create a center travel path into the transport 50.

When the AGV 10 is at position A, if the sensor 100 is on the AGV, the AGV will stop and profile the transport 50 with sensor 100 or at a position prior to position A. If position A is removed sufficiently from the transport threshold 52 such that position A is a distance greater than the minimum distance required to maneuver, before the load 60 enters the transport 50, the AGV may be able to profile the transport 50 with sensor 100 without stopping. Position A in FIG. 8 only refers to the most ideal position to sense the interior of the transport and/or switch to the AGV 10 following a transport path and where to maneuver into the correct position for following the transport path, including entry into the transport without the loads 60 contacting the side walls 54. Therefore, as compared to the previously described embodiment where the sensors 20 and 30 were inside the transport when a switch between guidance systems occurred, in the present embodiment the sensor 100 is fully outside of the transport while a new route into the transport is calculated and a switch is made to use that route. Therefore, the first AGV to position A, if the sensor 100 is on the AGV, will obtain a data profile of the transport 50. The AGV or a central controller uses the data profile to calculate an optimal route into the transport 50 (the transport path) and optimal placement of the load 60, for which type of load 60 the transport 50 is receiving. The AGV then follows this transport path into the transport 50 from position A, deposits its load 60, and then follows the transport path out of the transport 50 back to position A. At position A, it switches from the transport path to a route used in the system for the next destination.

Figure 6:
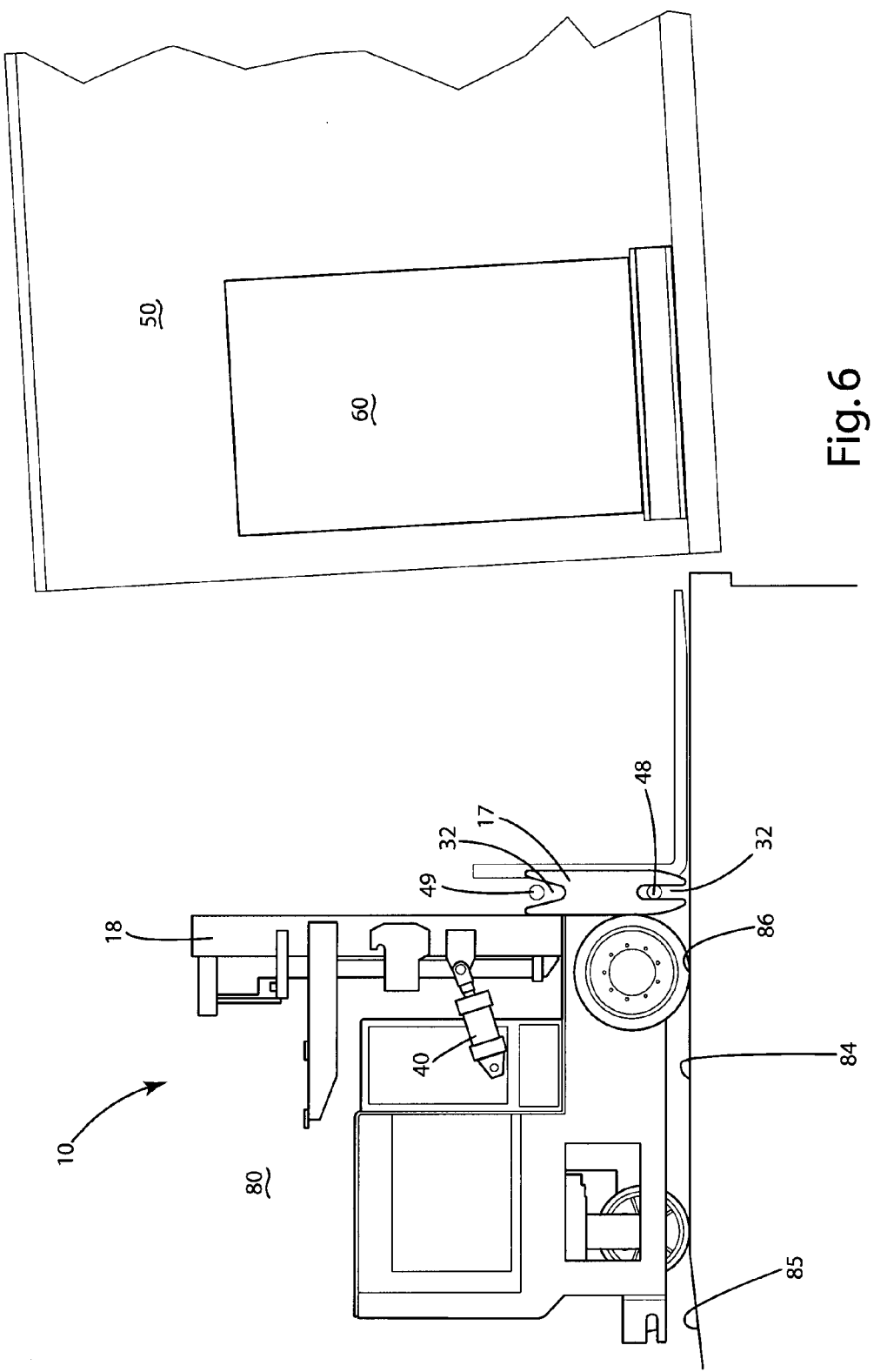
FIG. 6 is a side view of the load being placed and the AGV having its forks removed.
Figure 7:
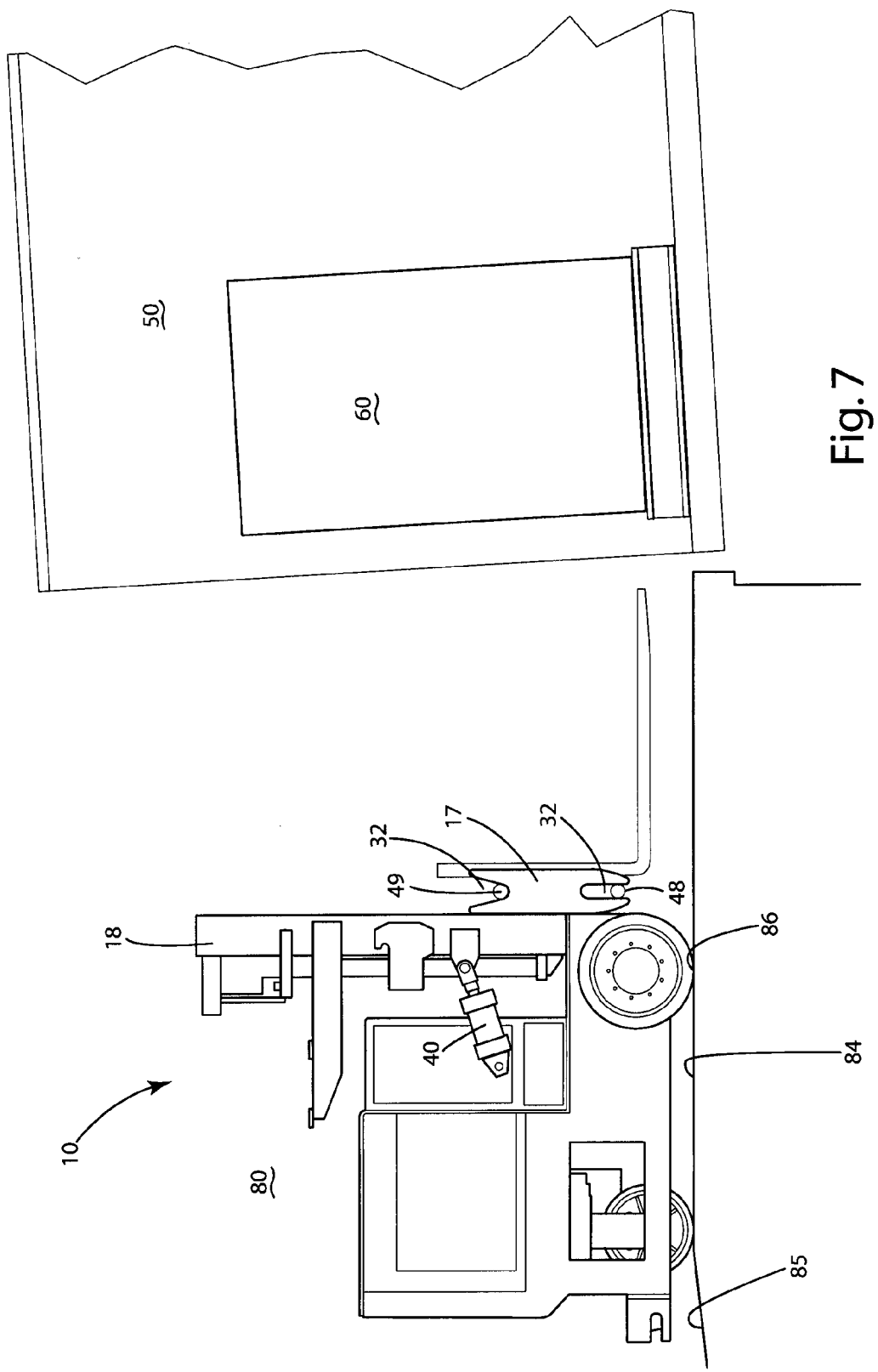
FIG. 7 is a side view of the AGV adjusting its forks to a position for movement within the loading facility.

The sensor 100 is preferably a laser sensor or any sensor capable of creating an image of the interior of the transport such as sensing the opening 52, side walls 54, and end wall 56 of the transport. In certain instances, especially when tall loads are being loaded into the transport, the sensor may also provide information regarding the roof of the transport (not illustrated) to ensure that as the AGV enters the transport with enough clearance maintained between the top of the load 60 and the roof of the transport. As illustrated in FIGS. 6 and 7, the sensor is centered on the AGV between the fork pairs 16. This placement generally would allow measurement of the side walls 54, as well as height of the ceiling of the transport 50 by seeing between loads 60. However, depending on various operational needs, the sensor 100 may be located in other positions. For example, some factories have large objects, such as tables, furniture, or other devices that use pallets that are twice as wide or long as normal. Therefore, to allow the sensor 100 to see the ceiling, if the pallet is a double wide pallet, or the side walls 54 if two double long pallets are arranged on the AGV forks, other locations on the AGV may be utilized for placement of the sensor 100.

In the preferred embodiment, the second AGV to arrive is already provided with information regarding the transport orientation within the system, or more particularly the transport path from position A into the transport and back to position A once the load is deposited. As the AGV already knows the transport path to follow that the previous AGV added to the system, the AGV may pass through position A into the transport without stopping or even sensing the transport 50 as it switches between routes that the AGV is following. To maximize efficiency, the system may switch to the desired transport path before position A to allow greater maneuvering time and typically a greater speed at which the AGV may maneuver, as it has more time and distance to match its route to the desired transport path. For example, an inertial guidance system is used to bring the AGV to position A as illustrated in FIG. 8. Before or upon reaching position A, the central controller provides the desired transport path to the AGV, which then continues to use the inertial guidance system to align itself with and then follow the transport path to enter the transport and place the load 60 in the proper position. The AGV uses the inertial guidance system to follow a reverse path back to position A, where it switches to a path for the new destination.

Of course, each AGV may include a sensor 100 and controller which, individually on the first time or each time they approach the transport, create the data profile and calculate the desired transport path, typically along the actual longitudinal axis 51 of the transport 50 for placement of the load 60. Each subsequent time an AGV approaches the transport 50 for placement of a load 60; it may either recalculate the desired travel path or may use the previously determined travel path. Having at least the first two or three AGVs calculate a transport path to follow allows averaging of transport paths and data profiles for a more accurate route. However, as the transport 50 fills with loads 60, reanalyzing each time before the AGV enters may be counterproductive as the sensor 100, when mounted on the AGV, typically sees less of the side walls and therefore has a greater chance of introducing error into the desired travel path as it is recalculated, because the data profile has less side wall length to measure.

As an optional step, when the sensor 100 scans the interior of the trailer 50, a sensor may also scan fixed objects within the loading bay area 80 to calibrate its position within the system. More specifically, the AGV 10 may travel to position A in FIG. 8, and when scanning the interior of the transport 50, determine, based upon the location of the loading dock walls 83 and loading dock bay 82, that it is ½ inch off from the position A. The AGV after traveling into the transport 50 to place the load will return to position A; however, when it returns to position A it will adjust for the previous discrepancy between the expected position and the actual position.

Therefore, the AGV 10 allows for easy recalibration of its position without additional steps or calibration at other points within the system. In the primary embodiment, once the new transport path is determined along the longitudinal axis 51 of the transport 50, the AGV uses its inertial guidance system to travel into the trailer and place the load 60. Using the inertial guidance system instead of a separate or different guidance system allows for lowering manufacturing costs in creating the AGV without giving up any benefits. However, the present system can use a number of other guidance systems such as dead reckoning, laser guidance, visual guidance, tape guidance, and wire guidance. In using the inertial guidance system, the gyroscope is keyed to motion in the horizontal plane and not to vertical motion, and therefore any vertical misalignment of the transport 50 relative to the loading dock will not affect the inertial guidance system as the AGV enters the trailer 50. One skilled in the art would recognize that in some embodiments it may be beneficial for each AGV to create its own data profile of the transport, such as to remove any calibration issues or to ensure that taller loads do not contact the top of the transport due to settling of the transport as weight from the loads is added. In some embodiments, when it is desirable to recalibrate the inertial guidance system at specified points, it may be desirable to create a data profile of the transport as well as specified fixed locations on the loading area 80 to provide a calibration of the AGV relative to the system.

One skilled in the art may recognize that the AGV generally travels forward with the forks and loads 60 located in the rear of the vehicle. Therefore, before reaching position A in FIG. 8, the AGV generally maneuvers around so that the loads 60 or forks 16 face the transport 50. The AGV then, if needed, senses the transport to create the data profile and transport path and travels into the transport 50 with the loads 60 entering first. Upon placement of the loads 60, the AGV travels from the transport back toward position A and switches between profiles or systems such that the vehicle generally does not slow down or stop as it continues to pick up its next load when exiting the transport. At some point past position A, the AGV will flip around so that the forks are to the rear of the vehicle. Of course, the sensor 100 in some instances may be located on the side opposite of the forks to allow a clear view for the sensor 100 to create a data profile of the trailer. In this embodiment, position A would be located a sufficient distance from the threshold 52 for the AGV to rotate 180°, align itself with the transport path, and enter the transport 50 with the load first, without the loads 60 contacting the side walls 54.

As the AGV loads the vehicle to maximize placement of the loads, generally the AGV will lower the load as it reaches the end of its calculated path and push the load for the remaining distance along the floor of the transport. By using a current sensor on the drive wheels it can be determined when the load has contact with the previous load and is tightly placed against the previous loads on the transport.

In some embodiments the system may not include sensors 100 on the vehicles, but instead they may be included somewhere on the loading dock when they are not in the way of the AGVs 10 while yet being able to see sufficiently inside the transports 50. For example, a sensor may be located approximately six feet outside of each loading bay facing the transport such that upon opening the load bay door and the door to the transport 50 the sensor may automatically image and create a data profile of the actual location, including offset and skew of the transport 50 relative to the expected location. This updated data profile is then loaded into the central controller, which would provide travel routes or transport paths for each AGV and therefore eliminate the step of at least the first AGV, creating a data profile of the location of the transport and then updating the central controller and determining a travel path for the AGV. Therefore, the central controller can create the desired travel path and the AGV may travel to position A using its inertial guidance system using the standard data profiles for the vehicle travel path, and upon reaching position A continue without stopping—or in most cases, even slowing down—into the transport 50 as it switches data profiles at position A from an expected travel path to the actual travel path into the transport 50. The sensor, if located external of the AGV vehicle, may be located inside of the loading bay area 80 or outside of the loading bay such as being positioned over top of each trailer or between each trailer. To provide an updated data profile for the AGV, generally only the skew of the transport 50 as well as the offset needs to be determined laterally.

While the AGV has been illustrated in the figures as being a vehicle having a double set of forks such that it may carry a pair of pallets into the transport, it some instances vehicles having a single set of forks may be used, and may determine for each different pass into the transport a new transport path for placement of the load side-by-side.

The present invention is particularly advantageous for extremely wide loads that have minimal clearance between each side of the pallets and the side walls of the transport, especially in double pallet systems. Using a calculated transport path, it is expected that an AGV 10 may enter a transport with less than ½ inch between the load and the side walls on each side, and travel to the expected position of placement of the load 60 without encountering the side walls of the transport 50.

The above described system may also be used to automatically unload a transport. The process of unloading a transport is substantially similar to the process of loading the transport described above. However, in a transport 50 which is completely full with a pallet placed proximate to the opening of the transport 50, the AGV may unload this pallet without sensing the transport 50 to create a data profile. Once the first pallet is removed or the transport 50 does not include a full load, the AGV may sense side walls of the trailer and location to determine the skew and lateral offset of the transport 50. As loads 60 are continually taken off the AGV, each subsequent AGV may create a data profile of the trailer to reduce error in the data profile due to the limited amount of transport side walls that may be measured initially by the sensor 100 on a partially loaded transport. As each pallet or load 60 is removed from the transport 50, more portions of the side wall 54 are visible to the sensor to create a more accurate data profile. Once the error between the previous and subsequent data profiles is beneath a threshold level, the system may determine the skew and offset of the transport, as well as the desired transport path for each subsequent AGV. To fine tune alignment once within the trailer due to misplacement of pallets on the trailer, any type of pallet pocket sensing system known in the art may be used to align the forks to fit within the pallet pockets. In the embodiments where the sensor 100 is located remote from the AGV, such as being hung from the ceiling of the loading area 80, in unloading a transport the sensor 100 may be able to see over the tops of the loads 60 to create a complete data profile with minimal errors of the interior of the transport to accurately determine the skew and lateral offset of the transport even for fully loaded transports. Locating the sensor off of the AGV vehicles for unloading a transport provides for a more efficient system, as each AGV does not need to create a data profile of the transport 50.

When the sensor 100 is located on the AGV, it is preferable to place the sensor in a position such that the sensor may see either under or over the loads 60. As the types of loads 60 may vary between installations, it is preferable to place the sensor lower on the vehicle to see under the load 60 and to sense the interior of the transport 50. Typically this type of placement would be approximately at least four to six inches off of the ground, with an expected preferred position of approximately in the center of the AGV (from side to side), on a dual fork AGV, and approximately seven and a half inches off of the ground. Of course, the sensor can be located anywhere it would receive an acceptable reading of the location of the side walls 54 of the transport 50, preferably including the end walls of the side walls, defining the opening to the transport 50. With the sensor 100 placed under the normal carrying position of the loads 60, the AGV may create a data profile of the trailer 50 while the AGV vehicle is moving, and therefore may switch to an updated travel path determined by the new data profile provided by the sensor at position A, without stopping the AGV.

As described above, using the sensor 100 to determine the relative positioning of either the transport floor 57 or transport roof 58 allows additional options with end-of-transport loading, such as the last couple of pallets or loads 60 inward from the threshold 52 of the transport 50. While the above methods for loading and unloading a transport 50 work well for all types of transports, sometimes the loading and unloading of the loads 60 near the end of the transport 50 may be difficult. More specifically, as illustrated in FIGS. 11-19, if the supporting surface on which the majority of the AGV 10 rests is angled relative to the surface on which the load 60, specifically the pallet 72, is to be placed or removed, difficulty may occur due to the pallet forks 16 on the AGV 10 interfering with the pallet 72 as the forks are removed from or inserted into the pallet 72. The pallet 72 includes a pallet pocket 74 into which the forks 16 are inserted to lift the load 60. After the load 60 is brought to the desired position, the forks 16 are removed from the load 60 after the load is placed. When the load 60 is at rest on a surface, such as the transport floor 57 that is angled relative to the surface on which the AGV 10 rests, such as the loading bay floor 85 or dock ramp 86 as illustrated in FIGS. 11-19, the AGV may have difficulty in precisely placing the load and then ensuring that the load remains in the placed position as the AGV removes the forks from the pockets, or when unloading the transport 50, difficulty in inserting the forks into the pocket to pick up the load 60. The pallet pockets 74 are narrow, so even at slight differences between surface angles, the fork tip 66 may engage one of the upper or lower surfaces of the pallet pocket 74 while the portion of the horizontal segment 62 nearest to the transition section 68 engages the other of the upper or lower surface of the pallet pocket 72. It may be easily understood from the above description and the illustrated figures that this engagement may cause problems during operation at the threshold or end 52 of the transport 50. More specifically, the loads further in the transport are less of a problem because as the AGV enters the transport, the wheels 12 and 14 become positioned on the transport floor 57 and therefore the AGV supporting surface is the same as the load supporting surface. Therefore, it may be seen from the illustrations that the pallets one or two pallets inward of the door 55, or threshold 52, may have problems as the AGV is attempting to place a load on the transport floor 57 while the AGV 10 remains on the dock ramp 86 or loading bay floor 85, which may be angled relative to the transport floor 57.

As described above, when the AGV reaches position A, the sensor 100 may scan the transport to determine at least one of the transport floor 57 or transport roof 58. As the transport roof 58 and transport floor 57 are generally parallel, generally only one of these surfaces needs to be determined for the AGV to determine the relative height of the transport floor 57 to the loading bay floor 85 as well as relative angle of the transport floor 57 to the loading bay floor 85. In addition, when the sensor 100 scans a position of the transport 50, it may determine the relative position of the transport 50 to the loading bay opening 82 or the dock walls 83. This determining of the position of the transport 50 relative to the dock walls 83, in conjunction with the relative angle and height difference to the loading bay floor 85 of the transport floor 57, allows the AGV 10 or a system controller to determine the relative angle of the dock ramp 86 extending into the transport 50. The AGV may further determine, if desired, how far the dock ramp 86 extends into the transport. Therefore, to place loads 60 near the end of the transport 50, the system would follow the above described guidance systems and determine the relative angle and relative vertical displacement of the transport floor 57 to the load bay floor 85. If needed, the AGV also determines the relative position and angles of the dock ramp 86.

With this relative positioning of the transport 50 determined by the AGV 10, the AGV 10 may enter the transport 50 with a load 60 lifted to the desired height to ensure that the pallet 72 does not contact the transport floor 57 or transport roof 58, as the AGV 10 is situated on an angle on a supporting surface that is angled relative to the transport floor 57. With the load 60 in the desired position, the AGV 10 may tilt one of the elevator mechanisms 18 or fork carriage 17 using the tilt mechanism 40. A tilt sensor 42 may also be included to determine the relative tilt of the elevator mechanism 18 or fork carriage 17. FIGS. 11-19 illustrate the elevator mechanism 18 being tilted, however, as one skilled in the art would recognize, the elevator mechanism 18 may remain stationary while the fork carriage 17 is tilted. By tilting the elevator mechanism 18 or fork carriage 17, the AGV 10 may compensate for the differences between the relative angles of the supporting surface of the AGV 10 and the supporting surface of the pallet 60. This compensation allows the AGV to place the load securely on the transport floor 57 and then remove the forks 16 with minimal interference such that the removal of the forks 16 from the pallet pockets 74 is substantially free of interference, such that the load 60 is not substantially shifted out of position.

In placing a load 60 in the transport 50, for severe relative angles between the supporting surface of the AGV 10 outside of or partially in the transport 50, to the relative position of the transport floor 57, multiple adjustments may be required in tilting the elevator mechanism 18 or fork carriage 17 by the tilt mechanism 40. More specifically, such as for high loads that have minimal clearance to the transport roof 58, multiple angular adjustments of the tilt mechanism 40 may be required in coordination with the movement of the AGV along the longitudinal axis of the transport. For example, as the AGV 10 enters the transport 50, the tilt mechanism 40 may be required to have a coordinated tilting motion specifically coordinated with the forward motion of the AGV 10. Therefore, for loads of minimal clearance, the pallet 72 makes an approximately arcuate motion such that the load does not become engaged against either the transport roof 58 or transport floor 57. Therefore, as the AGV 10 extends forward into the transport, the tilt mechanism 40 incrementally angles the load 60 so that the front edge of the pallet 72 does not contact the transport floor 57. The pallet 72 is then placed in the desired position on the transport floor 57. The forks 16 are then lowered during placement of the load 60 and the AGV reverses its course of direction out of the transport 50. Due to the minimal clearance within the pallet pockets 74, the forks 16 generally are also incrementally tilted as the AGV exits the transport to ensure that the forks 16 do not become engaged against the pallet pockets 74. Once the forks 16 are substantially free of the pallet pockets 74, the AGV may continue back to position A, and at the same time return the tilt mechanism 40, and specifically, one of the elevator mechanism 18 and fork carriage 17 back to its substantially vertical position.

As described above, the fork carriage 17 may include slots 32, as illustrated in the figures, which allow the forks 16 to float up and down as well as tilt. Combining the above described floating forks with the above described tilting method to place loads provides additional range of motion. Allowing for some float in the forks 16 may reduce the number of adjustments required to smoothly remove the forks 16 from the pallet pockets 74. As the forks 16 are free to float vertically and tilt for a limited distance, the AGV may not need to make any elevator adjustments, but only tilt adjustments.

As discussed above, the controller on the AGV or system controller may measure the relative angles of the AGV supporting surface and transport floor 57 to determine the required tilting of the load 60 or forks 16 as the AGV moves in and out of the transport 50 and, if necessary, the coordinated motion of the forks 16 with the movement of the AGV. This ensures that the end-of-transport 50 loading or loads nearest to the threshold occurs smoothly and efficiently and prevents displacement or misalignment of the placement of the loads as the AGV 10 loads the threshold 52 of the transport 50. The above described system may also be reversed as illustrated in the figures to improve unloading of transports 50. More specifically, as the AGV extends its forks 16 to the pallet pockets 74 on at least the first load 60 at the threshold 52 or end of the transport 50, the AGV may use the determined relative positioning of the transport 50 to align the forks 16 using the tilt mechanism 40 to prevent interference of the forks 16 within the pallet pockets 74. The AGV may also coordinate the motion of the forks 16 as they enter the pallet pockets 74, to ensure as the AGV moves forward that the forks 16 do not contact the pallet 72. It is expected that when the sensor 100 measures the transport 50 that is loaded with loads at the position A, the sensor will need to measure the transport roof 58 as the loads 60 may interfere with measuring the transport floor 57. Of course, in some embodiments, sensors may be placed outside of the loading bay doors or outside the loading facility extending over the transport loading area 87 and determine the relative positioning of the transports 50, thereby eliminating the need of individual AGVs 10 to scan the transport. A sensor 100 within the facility and not on the AGV 10 may also measure one of the transport 50 floor or roof and communicate that to the AGV or system controller. The use of these outside scanners may communicate with a central controller, which determines the position of the transport relative to the loading bay facility and updates the AGV with the necessary information to both properly place the loads as well as load and unload the loads closest to the threshold 52.

The foregoing discussion discloses and describes an exemplary embodiment of the present invention. One skilled in the art will readily recognize from such discussion, and from the accompanying drawings and claims that various changes, modifications and variations can be made therein without departing from the true spirit and fair scope of the invention as defined by the following claims.

What is claimed is:

1. A material handling vehicle having a longitudinal axis, said vehicle comprising:

a fork carriage defining an upper slot and a lower slot, each having a longitudinal axis and wherein said upper slot is further defined by side walls that are each angled upwardly and outwardly relative to the said longitudinal axis of said upper slot; and a pair of forks including pins coupled to said fork carriage with one of said pins in each of said upper slot and said lower slot, and wherein said forks are capable of moving both vertically and angularly relative to said fork carriage.

2. The vehicle of claim 1 wherein said forks are free to move both vertically and angularly without input from the vehicle.

3. The vehicle of claim 1 wherein said angular movement is free from input from the vehicle.

4. The vehicle of claim 1 wherein said forks are free from direct interaction with the vehicle.

5. The vehicle of claim 1 wherein said fork carriage includes an upper wall further defining said upper slot and wherein said side walls and said upper wall have a triangular shape.

6. The vehicle of claim 5 wherein said upper slot includes a lower end having a radius and wherein said fork includes a fork pin fitting within said slot and wherein said fork pin has a radius that is substantially similar to the radius of said lower end.

7. The vehicle of claim 1 wherein said side walls device a v-shape.

8. The vehicle of claim 1 wherein said fork carriage includes sidewalls defining said lower slot and wherein said side walls defining said lower slot are substantially parallel to a lower slot axis and wherein said lower slot has a width.

9. The vehicle of claim 8 wherein said forks include a pin fitting within said slot and wherein said lower slot width is configured to allow said pin to slide freely along said axis and substantially constrains said pin from movement away from said axis.

10. The vehicle of claim 1 wherein said upper slot includes an upper slot axis located approximately along the line formed by the midpoint between the upper side walls and wherein said fork carriage includes a lower slot having side walls that are substantially parallel and a lower slot axis along the midpoint between the lower side walls and wherein said upper axis and said lower axis are parallel.

11. The vehicle of claim 1 wherein said vehicle includes a mast for vertical displacement of the fork carriage from the supporting surface of the AGV and wherein when the forks are sufficiently displaced from the supporting surface of the AGV, the upper pin is constrained from moving vertically and angularly relative to the fork carriage.

12. The vehicle of claim 1 wherein said vehicle includes a mast for vertical displacement of the fork carriage from the supporting surface of the AGV and wherein when the fork carriage is sufficiently vertically lowered, the pin is vertically displaced away from a lower surface on the upper slot and is capable of moving angularly relative to the fork carriage.

13. The vehicle of claim 1 wherein said fork carriage includes a lower slot having a lower axis and said forks include a lower pin and wherein said pin is substantially constrained to only move vertically within said lower slot and wherein said slot includes an upper end that limits vertical movement of said pin along said lower axis.

14. An Automatic Guided Vehicle (AGV) comprising:

a fork carriage defining an upper and lower slot, each of said slots having a longitudinal axis and wherein said fork carriage has angled sides further defining said upper slot and wherein said angled sides extend upwardly and outwardly away from said longitudinal axis; and a pair of forks having a vertical segment and a horizontal segment, wherein said vertical segment is coupled to said fork carriage and wherein said forks are capable of both angular and vertical movement relative to said fork carriage.

15. The AGV of claim 14 wherein said angled sides of said upper slot are closer to the longitudinal axis at the lower end of the upper slot.

16. The AGV of claim 14 further including forks coupled to said fork carriage and said forks include pins fitting within as said slots and as said AGV lifts said forks, said slots and pins cooperate to increasingly constrain said forks from angular movement relative to said fork carriage.

17. A fork carriage for a material handling vehicle, said fork carriage comprising a pair of sidewalls defining a lower slot and a pair of angular sidewalls defining an upper slot and wherein said angular sidewalls have a v-shape and wherein each of said lower and upper slot includes a vertical axis and wherein said pair of sidewalls defining said lower slot are space an approximately equal distance from said vertical axis and wherein said extend upwardly away from said vertical axis.

18. The fork carriage of claim 17 further including a pair of forks including pins for coupling said forks to said fork carriage, and wherein said pins are displaced into said upper and lower slot and moveably coupled within said slots to allow vertical movement and limited angular movement.

19. The fork carriage of claim 18 wherein as a load is applied to said forks, said forks are constrained from angular movement by said angular sidewalls of said upper slot.

20. The fork carriage of claim 17 wherein said pins are movably coupled within said slots, and wherein said vertical axis of each of said upper and lower slots are aligned.

* * * * *